United States Patent
Katayama et al.

[11] Patent Number: 5,939,112
[45] Date of Patent: Aug. 17, 1999

[54] METHOD FOR PRODUCING A PROCESSED MEAT PRODUCT BY TREATMENT WITH A SALT AND/OR ALKALI SOLUTION AND PRODUCT

[75] Inventors: Hiroshi Katayama; Taro Katayama, both of Kitakyushu, Japan

[73] Assignee: Kabushiki Kaisha Katayama, Fukuoka, Japan

[21] Appl. No.: 08/997,062

[22] Filed: Dec. 23, 1997

Related U.S. Application Data

[62] Continuation-in-part of application No. 08/690,977, Aug. 1, 1996, abandoned, which is a continuation-in-part of application No. 08/669,540, filed as application No. PCT/JP95/00118, Jan. 30, 1995, abandoned.

[30] Foreign Application Priority Data

Jan. 31, 1994 [JP] Japan ...................................... 6-29023

[51] Int. Cl.$^6$ ..................................................... A23L 1/314
[52] U.S. Cl. ................................. 426/74; 426/72; 426/89; 426/92; 426/302; 426/303; 426/331; 426/332; 426/534; 426/641; 426/644; 426/645; 426/646; 426/647; 426/649; 426/650; 426/652; 426/442
[58] Field of Search .................................. 426/72, 74, 89, 426/92, 302, 303, 331, 332, 534, 650, 652, 656, 442, 281, 641–647, 649

[56] References Cited

U.S. PATENT DOCUMENTS

| 3,556,807 | 1/1971 | Woo .......................................... 99/107 |
| 5,344,665 | 9/1994 | Kanayama et al. ..................... 426/643 |

FOREIGN PATENT DOCUMENTS

| 0 209 268 A2 | 1/1987 | European Pat. Off. . |
| 54-80456 | 6/1979 | Japan . |
| 62-29953 | 2/1987 | Japan . |
| 2-308774 | 12/1990 | Japan . |
| 3-180138 | 8/1991 | Japan . |

*Primary Examiner*—Milton Cano
*Attorney, Agent, or Firm*—Foley & Lardner

[57] ABSTRACT

Processed meat is prepared by impregnating raw meat with a solution of a salt and a solution of an alkali in a concentration of 1.0 mole to 7.0 mole or a solution containing the salt and the alkali or by physically applying external force to the meat in the salt solution and in the alkali solution in a concentration of 0.1 mole to 4.0 mole or in a solution containing the salt and the alkali or while injecting the meat with the salt solution and in the alkali solution in a concentration of 0.1 mole to 4.0 mole or in a solution containing the salt and the alkali.

57 Claims, 7 Drawing Sheets

(A)

(B)

(C)

Cracks (D)

(A)

(B)

(C)

(D)

Experimental Example 1-1

Experimental Example 1-4

Experimental Example 1-5

METHOD FOR PRODUCING A PROCESSED MEAT PRODUCT BY TREATMENT WITH A SALT AND/OR ALKALI SOLUTION AND PRODUCT

CROSS-REFERENCE TO THE RELATED APPLICATIONS

This is a continuation-in-part application of U. S. patent application Ser. No. 08/690,977 filed Aug. 1, 1996, which is a continuation-in-part application of U.S. patent application Ser. No. 08/669,540 filed Jul. 12, 1996, which in turn is the national stage application of PCT/JP95/00118 filed Jan. 30, 1995.

This application claims the priority of PCT application No. PCT/JP95/00118 filed Jan. 30, 1995, which is incorporated herein by reference.

BACKGROUND OF THE INVENTION

1. Field of the Invention

The present invention relates to processed meat, meat products prepared using the same, and a method for the production of the processed meat and the meat products. The processed meat and the meat products prepared from the such processed meat by the production method have the meat tissues, such as the perimysium, myofibril, sarcolemma, collagen and lipids in the skeletal muscles of the flesh, fats, and the cell membranes and collagen in the fat tissues thereof, solubilized by a salt, thereby assisting the action of an alkali in gelling or emulsifying the meat tissues and as a result providing the processed meat with improved water retention capability or water-binding characteristics and cohesive or meat-binding properties. They are further provided with the properties of preventing meat juice (drip) from flowing out from the meat during freezing or thawing or upon cooking, preventing denaturation of the meat due to the softening or gelatinization of the flesh fibers and fats or due to the oxidation of the animal meat tissues. Furthermore, the processed meat and the meat products prepared from the same can improve meat quality and assist in retaining or improving a color of the meat closer to a clear color of fresh meat. The method according to the present invention can produce the processed meat and the meat products therefrom in more efficient way and in a shorter time than conventional methods.

2. Description of the Related Art

In recent years, flesh or meat of livestock animals, such as calves or oxen, horses, pigs, sheep, poultry, etc. and non-domesti cated animals, such as boar, deer, etc. have been commonly employed for meat food materials. The flesh of the animals is usually processed for meat as food and cut into meat joints which in turn are further cut into smaller meat portions appropriate for cooking. The meat may be cooked, e.g. grilled, roasted, fried, stewed, braised, boiled, or otherwise cooked, depending upon its portions, tenderness and other meat quality. The meat are generally stored for a long period of time by freezing, refrigerating, dry-freezing, canning, smoking or otherwise processing by traditional methods.

It is to be noted herein that the term "meat" referred to herein is intended to mean flesh or meat of animals including birds as well as mammalian animals, when it is apparent in the context of this specification or unless otherwise defined herein.

Generally, meats of animals are rapidly frozen or refrigerated immediately after slaughter and they are transported as frozen or refrigerated meats to processing plants or establishments. They are then processed and distributed in the market as processed meats and as processed meat products. As a matter of course, meats may undergo deterioration and lose meat quality during storage by freezing or refrigerating for a long period of time. Further, thawing such frozen or refrigerated meats may cause deteriorating in meat quality, too. In particular, conventional processes for thawing such frozen or refrigerated meats suffer from the disadvantages that savoring and nourishing components are caused to ooze out or flow out during thawing processes, together with meat juice, and therefore they may lose their original taste and flavor from the frozen meat, in accompany with the outflow of such meat juice upon thawing. They also cause the problems that low-molecular proteins and blood flown out from the frozen meat during thawing or freezing, together with the meat juice, are oxidized rapidly during thawing to cause deterioration in the meat quality of the meat and to spoil the color of the meat, thereby giving off an unpleasant smell. The thawing of the frozen or refrigerated meat may further cause the problem that the outflow of the meat juice from the thawing meat reduces water contents in the thawed meat, thereby making the meat tougher upon cooking and providing the cooked meat with a coarse texture and a poor taste and flavor upon eating. Although conventionally processed meats suffer from the various disadvantages and problems during freezing or refrigerating or during thawing or upon cooking as described above, the meats are processed so as to adapt their meat quality to match with a variety of processed meats and meat products to be produced therefrom.

Further, conventional methods for processing meat may cause the problems that the processed meat reduces a meat yield on account of sublimation of water from the meat during refrigerating or freezing or due to the fact that meat juice is caused to ooze out from frozen or refrigerated meat during freezing or refrigerating or during thawing. It is also the great loss of resources that nourishing low-molecular components containing savory materials, i.e. tasteful and flavor-bearing materials are caused to flow out from the frozen or refrigerated or chilled meat during thawing and they are disposed of without being utilized whatsoever. At meat processing plants or establishments, it is further required to dispose of a large amount of such liquid waste so that special equipment for exclusive use for such disposal purposes is required to be installed and the operation of such disposal equipment requires labor and expensive costs.

For instance, at meat shops or supermarkets, chilled or refrigerated meat or unfrozen meat is being sold while displayed in a showcase which is managed at low temperature so as to prevent the chilled or refrigerated meat from thawing or the meat from discoloring or deteriorating in its meat quality due to the oozing of meat juice or for other reasons during displaying. Once chilled or refrigerated meat is purchased by consumers, however, it may be thawed flowing out meat juice and deteriorating in meat quality and spoiling the meat color on the way back to home in many cases. Further, processed meat products, such as hamburgers, prepared by thawing chilled or refrigerated meat and freezing or refrigerating thereafter may present the problems that meat juice is caused to flow out from the meat materials used for meat products, in particular, during cooking by heating and that various fats and oils contained in the meat juice oozed from the meat products are caused to solidify into white and waxy solid materials upon cooling. Such waxy and white solid materials may provide a rough and unpleasant palate and spoil a favorable taste as meat.

In order to improve the problems and disadvantages inherent in the conventional methods and processes for processing meat of animals, there have been proposed a variety of methods and processes for processing.

For instance, Japanese Patent Laid-open Publication (Kokai) No. 54-80,456 proposes a method for the production of corned beef, which comprises cutting fasciae, tendons, etc. of meat bulk into smaller pieces, adding an additive, such as a phosphate or sodium nitrite, to the small meat pieces, stirring them under reduced pressure at 60 mmHg or higher and, as needed, soaking them in a solution at 3° C. to 5° C. for 48 hours, followed by boiling them at 115° C. to 118° C. for 60 to 90 minutes to loose or unfasten them by removing the fasciae, tendons and blood vessels from the processed meat. This method can achieve an improvement of yield in production by 15% to 25%. The method, however, suffers from the disadvantages that the steps are so complicated to require a long time for processing and that as a result, productivity is poor. Further, this method presents the drawbacks that the color of the resulting meat is unsuited for corned beef and that the processed meat is not very preferable in terms of safety as food because it contains the such additive.

Japanese Patent Laid-open Publication (Kokai) No. 59-39,111 discloses a method for the production of blocks of chicken, which comprises adding sodium chloride to chicken in bulk form at the rate of from 1% to 3% by weight with respect to the total weight of the meat and mixing the chicken bulk with stirring gently by means of an agitator and a mixer machine, without damaging inner tissues of the meat bulk, thereby allowing salt-soluble proteins to exude from the meat bulk onto the surfaces of the chicken meat in a meat paste form. The meat is then incorporated and filled into a mold at reduced pressure and heated to solidify yielding chicken blocks. Therefore, this method can provide chicken blocks having their meat surfaces enclosed with such meat paste. This method, however, has various shortcomings that the method involves a reaction on the meat surfaces only and that the meat quality inside the meat bulk cannot be modified. Further, as this method requires working steps which have to be carried out under reduced pressure and which consist of a molding step that lasts from 12 to 48 hours and a heating step that lasts from 2 to 3 hours, it may cause the problems that it is so complicated as a whole that costs of manufacturing may become expensive and productivity may be poor.

Further, Japanese Patent Laid-open No. 62-29,953 proposes a method for the production of pickle for preserving processed meat and of processed meat preserved in such pickle. In this method, the pickle heated with steam is injected into meat stock, followed by addition of a coloring agent or an edible pigment. Thus, it has been found that in this method the concentration of sodium chloride in the meat is so low that the sodium chloride can exert a very poor effect upon the meat and its action to gel or emulsify the meat is extremely mild, thereby failing to modify the quality in meat tissues to a sufficient extent. The processed meat prepared by this method contains a low concentration of salt and phosphoric acid and has a low calorific value, however, it is less resilient and it is poor in texture that gives a pleasant palate upon eating. Further, the meat processed by this method presents the problems that it is likely to be oxidized and its color is readily spoiled.

A method for the production of seasoned meat, as disclosed in Japanese Patent Laid-open Publication No. 3-180,138, comprises soaking meat in a large amount of pickle containing appropriate amounts of finely divided salt, a saccharide, a coagulant, a coloring aid, an emulsion stabilizer, a pH adjusting agent, and so on for 10 to 30 hours, the pickle being adjusted so as to have a concentration near that of the body liquid. This method, however, suffers from the disadvantages that the pickle cannot penetrate through and into the inside of meat blocks when the meat blocks in large bulk form are soaked in the pickle, the quality in meat may vary widely from one meat block to another, and the color of the meat may be spoiled readily. Further, this method has the problems that it is difficult to modify the fat layer of the meat and it lacks a high productivity.

Furthermore, Japanese Patent Laid-open Publication No. 58-37,826 discloses a method for the production of processed meat, in which sodium chloride is added to a lump of meat so as to adjust the ion intensity on the meat surface to 0.6 or higher, thereby exuding actomyosin onto the meat bulk surface, and then the meat is refrigerated at $-2°$ C. to $-8°$ C., followed by applying a pressure of 3 to 70 kg per square centimeter to the meat bulk. This method involves exuding actomyosin onto the meat surface and allowing the meat in bulk form to attach to each other through the actomyosin. If there is a fat layer in the meat bulk, no or little actomyosin can be exuded from the meat bulk. Even if the meat bulk could be attached to each other, it may be readily broken down into small pieces during cooking by heating. Therefore, this method suffers from the disadvantages that small pieces of meat cannot be utilized effectively as a whole, it lacks a high degree of workability and its productivity may become poor.

In addition, Japanese Patent Laid-open Publication No. 2-308,774 proposes a method for reforming meat in small bulk form, which comprises preparing meat for paste by adding a part by weight of an agent for dissolving myofibril protein to from 10 to 90 parts by weight of meat bulk so as to adjust pH to pH 6.0 to pH 7.3, and kneading the resulting meat for paste with 10 to 90 parts by weight of another bulk of meat adjusted to pH 6.5 or lower with a vacuum agitator, a line mill or a line mixer by avoiding incorporation of oxygen gas. This method, however, has the problems that an agent is required as an aid for attaching the meat in bulk form to each other because the meat cannot be attached to each other or the force by which to attach the meat bulk to each other is very weak through actomyosin that cannot be or is little exuded from the meat bulk if fat layers are located in the meat bulk. In addition, this method is difficult to increase productivity due to its complicated steps for processing.

For instance, U.S. Pat. No. 3,556,807 incorporated as reference in European Patent Publication No. 0 209 268 A2 discloses a process for tenderizing meat by soaking the meat in a solution of sodium bicarbonate. It is also known that, for example, European Patent Publication 0 028 113 incorporated as reference in European Patent Publication No. 0 209 268 A2 discloses the method of treating meat with phosphates in conjunction with sodium bicarbonate. It is found, however, that the use of sodium bicarbonate singly or in conjunction with phosphates cannot achieve the effects sought to be attained by the present invention. Further, it has the problem that it may impair the taste of the meat and deteriorate the quality in the meat to a great extent.

In addition, European Patent Publication No. 0 209 268 A2 discloses a process for treating meat with at least one alkali metal chloride and at least one additive selected from alkali metal bicarbonates, alkali metal carbonates, and alkali metal sesquicarbonates, for example with a solution of alkali metal chloride and such additive. This prior art publication discloses to the effect that the such alkali metal chlorides may include, for example, sodium chloride and the such alkali metal bicarbonates may include, for example, sodium bicarbonate and so on. Particularly noted is that the prior art publication uses the additives such as sodium bicarbonates in a mole concentration lower than that of the alkali to be used for the present invention particularly when the meat is processed in substantially the same manner.

Moreover, European Patent Publication No. 0 209 268 A2 discloses to the effect that the process of treating the meat may be effected, for example, by soaking the meat with the solution or by injecting the solution into the meat, or by a combination of soaking and injecting.

It is to be noted herein that the prior patent publication does not clearly teach or even imply the processing of the meat by applying external force to the meat in order to achieve the results to be expected to be attained by soaking or injecting the meat or other means, as disclosed in the prior art.

This process can bring about a reasonable enhancement in the meat-binding and water-binding properties of the meat by contacting the meat with the solution containing sodium chloride and the above-mentioned additives. The such reasonable enhancement brought about by contacting the meat with the such solution is not sufficient enough to achieve the ability of gelling meat.

Given the foregoing technical background for processing meat of animals, extensive studies have been made with the attempt to solve the problems and drawbacks inherent in the conventional and prior art methods and processes for processing the meat. As a result, it has been found that the use of a salt in combination with an additive at a particular rate can sufficiently achieve the objects of this invention as will be set forth in the description that follows.

As a result of extensive studies so far conducted, it is further found that the salt and the alkali can be impregnated in the meat in a very shorter period of time than as disclosed in the prior art and as by conventional methods.

SUMMARY OF THE INVENTION

Therefore, the present invention in one aspect has the primary object to provide processed animal meat processed by treatment with a solution containing a salt and an alkali in a high concentration, which are elastic, tender and tasteful, which little undergo deterioration in meat quality during freezing or refrigerating for a long period of time or thawing or upon cooking, which can prevent meat juice containing low-molecular nutritive and nourishing components from flowing out therefrom as drip upon cooking or during freezing or refrigerating or thawing, and which can provide a high cooked yield when cooked.

In a preferred aspect, the present invention has an object to provide processed animal meat with a unique combination of sodium chloride as the salt with sodium bicarbonate or sodium carbonate as the alkali in a given ratio.

The present invention has another object to provide processed meat food product prepared using the processed animal meats.

A further object of the present invention is to provide a method for the production of such processed animal meat and processed meat product prepared therefrom.

A still further object of the present invention is to provide a method for the production of such processed animal meat by adding the salt and the alkali separately or in a mixture thereof.

In another aspect, the present invention has an object to provide processed animal meat by physically applying external force to the meat after it has been processed with the salt and the alkali or while it is being processed with the salt and the alkali.

A sill further object of the present invention is to provide a method for the production of such processed animal meat by physically applying external force to the meat previously processed with the salt and the alkali or while the meat is being processed with the salt and the alkali.

In order to achieve the objects, the present invention in the one aspect provides the processed animal meats containing the salt and the alkali in predetermined amounts and concentrations. In particular, in this case, the alkali is added in a high concentration.

In preferred aspects, the present invention provides the processed animal meats containing a combination of sodium chloride as the salt and sodium bicarbonate, sodium carbonate, potassium bicarbonate, potassium carbonate, ammonium bicarbonate or a mixture thereof as the alkali.

Further, the present invention provides the meat food products produced from the such processed animal meats.

The present invention further provides a method for the production of such processed animal meats and such meat food products by adding the salt and the alkali separately in a salt addition step and in an alkali addition step, respectively, or in a mixture thereof in a salt/alkali addition step.

Moreover, the present invention provides the processed meats processed by a physical application of external force to the meat after the meat has previously been processed by the salt and the alkali separately, respectively, in a salt injection step and in an alkali injection step or by a mixture of the salt with the alkali in a salt/alkali injection step or while being processed thereby in a salt/alkali solution containing the salt and the alkali with combined together.

In a preferred aspect, the present invention provides the method in which such a physical application of the external force is carried out by tumbling or oscillating the meat under predetermined conditions.

Further, the present invention provides the method for the production of the such processed meat after the meat has previously been processed by the salt and the alkali separately in the salt injection step and in the alkali injection step, respectively, or by a mixture of the salt with the alkali in the salt/alkali injection step or while being processed thereby in the salt/alkali solution containing the salt and the alkali with combined together.

In this specification, the unit indicated by mole is to be represented in mole per kg throughout the description.

Other objects, features and advantages of the present invention will become apparent in the course of the description of this specification with reference to the accompanying drawings.

DESCRIPTION OF THE PREFERRED EMBODIMENTS

Figure 1:
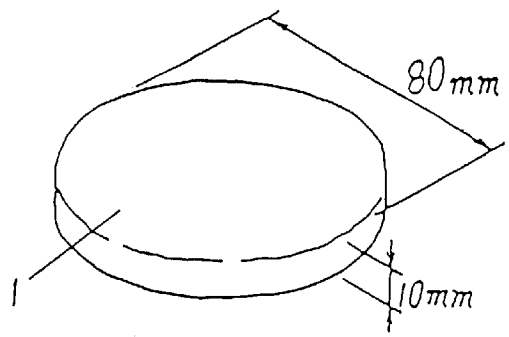
FIGS. 1(A)–(D) represents a process diagram showing the states of a sample in the folding test.
Figure 1:
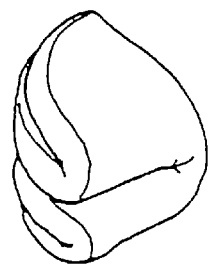
Figure 1:
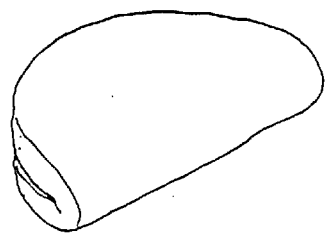
Figure 1:
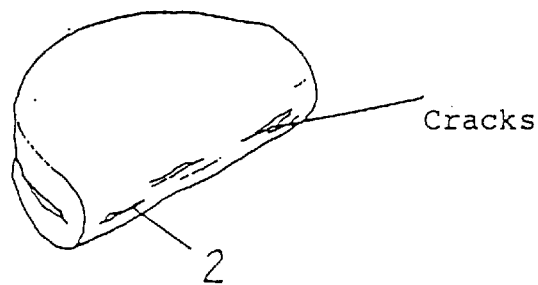
Figure 1:
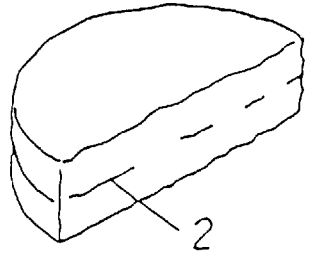

The present invention may be applied to any particular type of meat of animals and to meat in any particular form. Thus, it may be applied to beef or veal, pork or mutton, chicken or turkey, or any other animal meat, and it may be applied to meat in bulk form, such as blocks, chunks, slices or chops, or in a comminuted form, such as minced meat. It should also be understood herein that reference to the particular type of the animal meats or to the meat in the particular form is not intended to be used herein for cooking, the way of processing, etc. It can further be noted herein that the processed meat can give a taste closer to the original taste of the raw material, on the one hand, as long as the salt content in the processed meat becomes lower and it can be stored as smoked products or dried or cured meat products for a longer time, on the other, as long as the salt content thereof becomes higher.

Further, the salt may be added preferably in the form of a solution containing the alkali at the rate of from 2 parts to 15 parts by weight per 100 parts by weight and in a concentration ranging from 1.0 mole to 7.0 moles and preferably from 2.0 moles to 6.5 moles, although the range of the molar concentration of the salt may vary with the kind of the salt to be used, the kind or portion of the meat, or the like.

It is known that the salt may act as solubilizing the meat tissues such as myofibril, perimysium, sarcolemma and the like. Generally, when the concentration of the salt would become lower than 2.0 mole, on the one hand, there may be recognized the tendency of decreasing the solubility of the myofibril and the other meat tissues, thereby lowering gelation or emulsification of the meat and slowing the aging of the meat. This tendency may be seen to a remarkable extent particularly if the concentration of the salt would become lower than 1.0 mole. When the concentration of the salt would become greater than 6.5 mole, on the other hand, the taste of the processed meat may become more salty and tougher in meat quality, thereby impairing a taste and flavor of the meat. Moreover, this tendency may appear to a more apparent extent if the concentration of the salt would become higher than 7.0 mole. When the concentration of the salt is set in the range of from 2.0 moles to 6.5 moles, it can be noted that the solubilities of perimysium, myofibril, sarcolemma, collagen, lipids and other meat tissues of the skeletal muscle of the meat, fats and oils, cell membranes and collagen in the fats and oils, and the like are improved, thereby assisting in forming the meat tissues into fine net-like structures and in solubilizing actomyosin out from the skeletal muscle and so on. These actions may assist in gelling the meat tissues and furthering the aging of the meat, in association with the action with the salt to solubilize the meat tissues so as to become more likely to gel the meat tissues, thereby remarkably improving the adhesion between the meat tissues.

On the other hand, the processed meat in the one aspect of the present invention may have the alkali content ranging from 0.1 part to 6.0 parts by weight, preferably from 0.3 parts to 4.0 parts by weight, and more preferably from 0.5 part to 2.0 parts by weight, with respect to 100 parts by weight of the meat. Further, the alkali may be added at the rate of from 0.1 part to 2.7 parts by weight, preferably from 0.3 part to 2.0 parts by weight, and more preferably from 0.4 part to 1.3 parts by weight, with respect to 100 parts by weight of raw protein material of the meat, although depending upon the alkalinity of the raw meat.

For the processed meat, the alkali to be used in this aspect of the present invention may be selected from sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate and sodium methaphosphate, and the alkali may be employed singly or in a mixture thereof. The alkali may be preferably sodium bicarbonate, sodium carbonate, potassium bicarbonate, ammonium bicarbonate or a mixture thereof, more preferably sodium bicarbonate, sodium carbonate or a mixture thereof, and particularly preferably sodium bicarbonate or sodium carbonate. Further, the use of sodium bicarbonate or potassium bicarbonate may be preferred from the point of view in the readiness to adjust the pH value of the alkali solution, although they may be somewhat difficult to dissolve in an aqueous solution.

In this aspect of the present invention, the alkali may be added in a solution containing the alkali at the rate of from 0.5 part to 12 parts by weight and preferably from 1 part to 10 parts by weight with respect to 100 parts by weight of the raw meat.

Further, the alkali may be added in a concentration ranging from 1.0 mole to 4.0 mole and preferably from 1.0 mole to 3.0 mole, depending upon the kind of the alkali. As the alkali concentration would become lower than 1.0 mole, a degree of increasing the pH value of the meat may become so lower that the ability to gel the meat tissues of the meat may become instable. This trend can be seen remarkably when the alkali concentration is lowered to 0.1 mole or less. On the other hand, if the alkali concentration would become higher than 3 mole, the tendency may be caused to appear that the pH value of the meat may become too high and that the myofibril and sarcolemma may be solubilized to an excessive extent, although varying with the kind of the meat. If the such meat tissues would be solubilized too much, the meat may be prone to deteriorate in meat quality and make it difficult to maintain the meat quality of the processed meat for meat products. Therefore, it is desirable to set the alkali concentration to 4.0 mole or less.

The addition of the alkali in the predetermined amounts and concentrations as described above may assist in aging the meat by gelling the meat tissues of the meat. If the alkali is added after the salt, the alkali can also acts as assisting the action by the salt in promoting solubilization of the meat tissues so as to become likely to interact with the meat tissues gelled by the action of the alkali.

The salt and/or the alkali may preferably be employed in a liquid form in which they may be dissolved each singly or in a mixture thereof in an aqueous solution to which meat juice (drip) flown out from raw meat or from meat of the same kind or different kind may be added. As meat juice, there may be employed ones originating from the identical meats or meats of identical or different animals as long as they are fresh or they are controlled so as to fail to be infected with bacteria. For example, meat juice of chicken meat may be mixed with meat juice of beef, thereby producing a taste and flavor from a combination of the chicken with the beef. The amount of meat juice to be added to the aqueous solution containing the salt and/or the alkali is not critical and it may be optionally selected in particular depending upon preference of a taste of the resulting processed meat. When meat juice is to be added to the salt/alkali solution, it may also be possible to add it by decreasing the amount of the water of the salt/alkali solution in proportions to the amount of the meat juice added, because the meat juice contains water. As meat juice contains nourishing or nutritive materials such as low molecular components in large amounts, the addition of meat juice to the solution may assist in increasing a taste and flavor of the original meat.

To the processed meat may be added a variety of additives may be added to the meat. Such additives may include, for example, an alcohol at the rate of from 0.5 part to 12 parts by weight and preferably from 1 part to 9 parts by weight, vitamin E in the amount of from 1 mg to 300 mg and preferably from 5 mg to 150 mg, vitamin C in the amount of from 6 mg to 500 mg and preferably from 20 mg to 300 mg, a saccharide at the rate of from 1 part to 20 parts by weight and preferably from 4 part to 12 parts by weight, albumin or egg white at the rate of 0.1 part to 5 parts by weight and preferably from 1.0 part to 4.7 parts by weight, and/or an antioxidant at the rate of from 0.01 part to 5 parts by weight and preferably from 0.1 part to 3 parts by weight with respect to 100 parts by weight of the meat. These additives may be added separately from the salt and/or the alkali or together therewith.

The addition of the alcohol may assist the meat in giving a pleasant taste and flavor and in tenderizing the meat. When the alcohol is added to the meat, there may be employed the alcohol including, for example, cooking wine such as Japanese rice wine (sake) or Japanese rice wine for seasoning (mirin), wine, brandy, cherry liquor or Chinese wine. The cooking wine such as sake or mirin may be used preferably at the rate of 0.5 part to 6.0 parts by weight, with respect to 100 parts by weight of the raw meat. When the amount of such cooking wine would be less than 1 part by weight, the processed meat may become less juicy and flavorful. If the amount of the such cooking wine would be less than 0.5 part by weight, the trend to decrease the juiciness and flavor reflected by the addition of the cooking wine may appear apparently. On the other hand, when the amount thereof would become greater than 4 parts by weight, the processed meat may smell alcoholic and this smell may become stronger if the cooking wine would be contained at the rate of 6 parts by weight or more. The use of the alcohol at an appropriate rate can preferably add a pleasant taste and flavor to the processed meat and assist in tenderizing the processed meat.

The saccharide may make the meat unlikely to undergo denaturation and prevent deterioration in the meat quality. When the saccharide is added to the meat, there may be employed the saccharide including, for example, xylit, sorbitol, oligosaccharide, glucose, galactose, fructose, lactose, sugar, sucrose, malt sugar, glycerin, propylene glycol or starch. The amount of the saccharide may range from 1 part to 20 parts by weight and preferably from 4 parts to 12 parts by weight per 100 parts by weight of the raw meat. If the amount of the saccharide would be less than 4 parts by weight, the trend to cause the meat quality to undergo denaturation during storage, thereby leading to deterioration in the meat quality of the processed meat. This may appear to a great extent if the saccharide would be added at the rate of 1 part by weight or less. On the other hand, when the amount of the saccharide would be greater than 12 parts by weight, the processed meat may taste sweet and may be turned to brown in color. If the saccharide would be add at the rate of greater than 16 parts by weight, the processed meat become too sweet.

Vitamin C may prevent the meat from undergoing oxidation and turning the meat color. It may be added in the amount of from 6 mg to 500 mg and preferably from 20 mg to 300 mg. When the amount of the vitamin C would be less than 20 mg, on the one hand, the processed meat may be prone to be oxidized and deteriorate in the color of the meat. This trend may appear to a great extent if the amount of the vitamin C would be less than 6 mg. When the amount of the vitamin C would be greater than 300 mg, on the other hand, there may cause no big difference in the extent of preventing a decrease in the meat color or oxidation of the meat among the kinds of the meats and freshness of the meats. If the vitamin C would be added in the amount greater than 500 mg, no difference can be recognized from the processed meat with the vitamin C added in the amount of 300 mg or more.

Vitamin E may assist vitamin C in holding the meat color clear and fresh and preventing the oxidation of the meat. It may be added in the amount of from 1 mg to 300 mg, preferably from 5 mg to 150 mg, per 100 parts by weight of the meat. The addition of vitamin E may assist the action of vitamin C in making the color of the meat looking clearer or more fresh and preventing the oxidation of the meat. If the meat is fresh, vitamin E may not be used.

Albumin or egg white may be employed for the purpose to assist the meat denatured to some extent during storage in frozen or chilled state for a long period of time in emulsifying and gelling as well as to assist in furthering the action of the salt to solubilize the meat tissues of the meat. When it is employed, albumin or egg white may be added at the rate of from 0.1 part to 10.0 parts by weight and preferably from 1.0 part to 5.0 parts by weight, per 100 parts by weight of the meat. When the amount of albumin or egg white becomes less than 1.0 part by weight, the action thereof to emulsify and gel the meat tissues may become decreasing. This decrease may be caused apparently when the amount of albumin or egg white is lower than 0.1 part by weight. On the other hand, when the amount thereof becomes greater than 5.0 parts by weight, it may impair the taste and flavor of the meat.

The use of an antioxidant is to prevent an oxidation of the meat. The antioxidant to be employed may include, for example, ethylenediamine tetraacetate, calcium disodium, L-sorbic acid or dibutyl hydroxyl-anisole. The amount of the antioxidant may be added at the rate of from 0.005 part to 4 parts by weight and preferably from 0.05 to 3 parts by weight per 100 parts by weight of the meat. When the amount may become less than 0.05 part by weight, the meat may become likely to be oxidized and this tendency may appear apparently when the amount may become lower than 0.005 part by weight. On the other hand, when the amount of the antioxidant may exceed 3 parts by weight, the taste and flavor of the meat may be impaired. If it would be added at the rate greater than 4 parts by weight, the taste and flavor of the meat may be impaired to a considerable extent.

Other auxiliary materials may be used for various purposes. Such auxiliary materials may include, for example, a bond reinforcing agent, such as bouillon, meat extract, CURD-RUN 10, 20 and 30 (trade name; made by Takeda Yakuhin Kogyo co., Ltd.), soybean protein powder or casein sodium; an emulsifying agent, such as albumen, lecithin or sugar ester; a functional agent, such as chitosan, calcium, vitamins, dehydroacetic acid (DHA), EPA, collagen or glucomannan; an adhesion reinforcing agent, such as sodium alginate, calcium citrate, corn starch, potato starch powder or glucomannan; a preservation agent, such as sorbic acid or potassium sorbate; a deodorant, such as SUN-FRABON HG T-200 (trade name; made by Taiyo Kagaku co., LTD.); animal or vegetable fiber, such as soybean protein fiber, chitin or meat paste; an animal or vegetable fat or oil, such as coconut oil, corn oil, rapeseed oil, pork fat, lard and fish oil; a condiment or seasoning, such as pepper, glycine, L-glutamic acid, sodium L-glutamate, disodium inosinate, disodium guanylate, fish peptides, beef powder, beef extract, pork extract, tangle extract, AJINOMOTO (trade name; made by Ajinomoto Co., LTD.) or AMIRICH GCR (trade name; made by Ajinomoto CO. LTD.); and a spice, such as pepper, ginger, paprika, nutmeg, mace, thyme, all spice, onion, garlic, coriander, cardamon, caraway, sage, laurel, marjoram, clove or cinnamon. The spices may be ones in any state, such as in a raw, dried, powdery, extracted, concentrated or emulsified state.

These additives may be added to or impregnated in the meat by dissolving them in the salt solution and/or in the alkali solution and/or in an aqueous solution, depending upon the solubility of each additive. If the additives are in a powdery form and they are insoluble in any one of the solutions as described above, they may be added in the form of a suspension. In order to impregnate the additives uniformly in the meat, it is preferred to use the solution containing the additives. The additives may add a taste and flavor to the processed meat and assist in harmonizing the taste and flavor of the processed meat. The use of the additives may also serve as providing the processed meat and the meat products with high values as products.

Processed meats in the one aspect of the present invention may be produced in various ways. The processed meat in the one aspect of the present invention as described above may be produced by a method comprising a salt addition step for impregnating meat with the salt solution and an alkali addition step for impregnating meat with the alkali solution or a salt/alkali addition step for impregnating meat with the salt/alkali solution containing a mixture of the salt with the alkali.

In the method for the production of the processed meat according to the present invention, the salt addition step may comprise adding the salt to meat at the predetermined rate by impregnating the meat in an aqueous solution of the salt to which meat juice may be added in an appropriate amount. The salt solution may contain the salt at the rate of from 2 parts to 15 parts by weight per 100 parts by weight of the meat and in a concentration ranging from 1 mole to 7.0 moles and preferably from 2 moles to 6.5 moles. The impregnation of the meat with the salt solution may be effected, for example, by injection of the salt solution into the meat through an injector, spraying the meat with the salt solution, immersing the meat in the salt solution filled in a container such as a pan or the like, coating the meat with the salt solution with a brush or the like, or kneading or mixing the meat in the salt solution with a mixer or the like.

The salt addition step may be carried out at temperature of 20° C. or lower and preferably 10° C. or lower. If the temperature of the salt addition step would become higher than 20° C., meat may be prone to undergo denaturation and lower its storage ability, although the extent to which it undergoes denaturation and lowers its storage ability may vary with the extent of aging.

Further, the salt addition step may be conducted at a pH value ranging from pH5 to pH10 and preferably from pH6.5 to pH 8.5. If the pH value of the meat would become too low, on the one hand, the tenderness of the meat may be impaired making the meat quality tough. If the pH value of the meat would become too high, on the other hand, the meat may become tough rapidly. If the pH value of the meat would become too high, it may be lowered by the addition of a weak acid such as lactic acid.

As described above, the addition of the salt to the meat in the salt addition step may assist in solubilizing the meat tissues such as the perimysium, myofibril, sarcolemma, collagen and lipid in the skeletal muscles of the meat, fats and cell membranes and collagen in the fats of the meat. Once the meat tissues would be solubilized, they may become likely to undergo the action of the alkali to gel and form a fine net-like structure in the meat.

On the other hand, the alkali addition step may comprise adding the alkali to meat at the predetermined rate by impregnating the meat in an aqueous solution of the alkali to which meat juice may be added in an appropriate amount. The alkali solution may contain the alkali at the rate of from 0.5 part to 12 parts by weight and preferably from 1 part to 10 parts by weight per 100 parts by weight of the meat and in a concentration ranging from 1.0 mole to 4.0 mole and preferably from 1 mole to 3.0 mole. The alkali may be impregnated in meat in substantially the same manner as in the salt addition step, for example, by injecting, spraying, immersing, coating, kneading or mixing.

Like the salt addition step, the alkali addition step may be carried out at temperature of 20° C. or lower and preferably 10° C. or lower and at a pH value ranging from pH5 to pH10 and preferably from pH6.5 to pH 8.5. If the temperature of the alkali addition step would become too high, the meat may be prone to undergo denaturation and lower storage performance, like the meat processed by the salt addition step at such a high temperature. Likewise, if the meat would be processed at a too high or too low pH value, the meat may become too tough.

As described above, the addition of the alkali can promote the gelation of the meat tissues forming a fine net-like structure in the meat tissues, thereby furthering the aging of the processed meat, in association with the action of the salt to solubilize the meat tissues of the meat.

The order of carrying out the steps is not critical so that the salt addition step may be conducted before or after the alkali addition step.

Moreover, the salt and the alkali may be added together in the form of a mixture thereof. In this case, the method for the production of the processed meat may comprise the salt/alkali addition step. In the salt/alkali addition step, the salt and the alkali may be contained at the same rates and in the same concentrations as in the salt addition step and the alkali addition step. It is also possible to add a portion of the salt and the alkali in the form of a mixture thereof in the salt/alkali addition step and to add the remaining separately in each of the salt addition step and the alkali addition step. In the salt/alkali addition step, the mixture of the salt with the alkali may be impregnated in the meat in substantially the same manner as in the salt addition step and the alkali addition step, for example, by injecting, spraying, immersing, coating, kneading or mixing.

The salt/alkali addition step may also be carried out at substantially the same temperature and pH value as in the salt addition step and the alkali addition step with substantially the same results.

The method for the production of the processed meat may further comprise an additive addition step for adding the additive to the meat by impregnating the meat in an aqueous solution of the additives, such as the saccharides, vitamins, albumin or egg white powder, the antioxidant or a mixture thereof.

The additive addition step may also be carried out in substantially the same manner as in the salt addition step, the alkali addition step or the salt/alkali addition step with substantially the same results. In this case, the additives may preferably be added in the alkali addition step using the alkali solution containing the additives, although they may be added in the salt addition step using the salt solution containing them. It is also possible to add one or more of the additives in a mixture with the salt or the alkali to the meat.

The processed meat may then be subjected to an aging step to allow the salt and the alkali more to distribute uniformly in the meat, while promoting the action of the salt to solubilize the meat tissues of the meat and furthering the action of the alkali to gel the meat tissues forming a fine net-like structure in the meat. The aging step may be carried out in each time after the salt addition step, the alkali addition step, the salt/alkali addition step and the additive addition step or after two or more steps have been finished.

Although the processed meat may be aged simply by storing under appropriate conditions and for appropriate period of time, the aging step in accordance with the present invention may preferably be effected, for example, by massaging, vibrating, applying ultrasonic wave or kneading in conventional manner.

In another aspect of the present invention, there is provided processed meat by physically applying external force to meat particularly after the meat has been processed with the salt solution and/or the alkali solution or with the salt/alkali solution containing a mixture of the salt with the alkali or while the meat is in contact with the salt solution and/or the alkali solution or in the salt/alkali solution containing the mixture of the salt with the alkali.

More specifically, meat may be processed by the method comprising a salt injection step for injecting meat with the salt solution and an alkali injection step for injecting meat with the alkali solution or a salt/alkali injection step for injecting meat with the salt/alkali solution containing a mixture of the salt with the alkali, and a force application step for physically applying external force to the meat.

The salt solution to be used for the salt injection step may contain the salt in the amount of from 2 parts to 15 parts by weight per 100 parts by weight of the meat and in the concentration of from 1.0 mole to 7.0 mole. The alkali solution to be used for the alkali injection step may contain the alkali in the amount of from 0.5 part to 12 parts by weight and preferably from 1 part to 10 parts by weight per 100 parts by weight of the meat and in the concentration of from 0.1 mole to 4.0 mole and preferably from 0.3 mole to 1.5 mole. Further, the salt/alkali solution to be used for the salt/alkali injection step may contain the mixture of the salt with the alkali, the salt and the alkali being contained at the predetermined amounts and in the predetermined concentrations as described above.

In an alternative way, meat may be processed by the physical application of the external force to the meat in the presence of the salt solution and the salt/alkali solution or in the presence of the salt/alkali solution. In other words, the force application step for physically applying external force to the meat may be preferably carried out together with the salt/alkali injection step in the presence of the salt/alkali solution, although it may be carried out while the salt injection step or the alkali injection step is being carried out together therewith.

In this aspect of the present invention, the salt to be used herein may include sodium chloride, potassium chloride, calcium chloride, magnesium chloride or a mixture thereof. Among them, sodium chloride is preferred. The salt may be added in the form of a solution to the meat so as for the salt content to amount to the range from 0.2 part to 5.0 parts by weight, preferably from 0.3 part to 4.0 parts by weight, and more preferably from 0.5 part to part to 4.0 parts by weight, and more preferably from 0.5 part to 2.5 parts by weight, with respect to 100 parts by weight of the meat. To the salt solution may be added an appropriate amount of meat juice flown out as purge (drip) from the raw meat or from different meats of the identical animal or different animals. Like in the one aspect of the present invention as described above, when the salt content of the processed meat becomes too low, the processed meat may cause a decrease in the solubilities of the meat tissues, e.g., perimysium, myofibril, sarcolemma, collagen, lipids and the like of the skeletal muscle of the meat, fats and oils, cell membranes and collagen in the fats and oils of the meat, and the like. On the other hand, if the salt content of the processed meat becomes too high, the processed meat may become too salty. Further, the salt may be added in a concentration ranging from 1.0 mole to 7.0 moles and preferably from 2.0 moles to 6.5 moles, although the range of the molar concentration of the salt may vary with the kind of the salt to be used, the kind or portion of the meat, or the like. If the concentration of the salt would become too low, on the one hand, the meat may be caused a decrease in the solubility of the meat tissues of the meat, thereby lowering the gelation or emulsification of the meat and slowing the aging of the meat. If the concentration of the salt would become too high, on the other hand, the taste of the processed meat may become more salty and tougher in meat quality, thereby impairing a taste and flavor of the meat.

On the other hand, the alkali to be used in this aspect of the present invention may include, for example, sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate and sodium methaphosphate, and the alkali may be employed singly or in a mixture thereof. Among the alkalis as described above, sodium bicarbonate, sodium carbonate, potassium bicarbonate, ammonium bicarbonate or a mixture thereof may be preferred and sodium bicarbonate and sodium carbonate are more preferred.

The alkali may be added in the form of a solution to the meat so as for the alkali content of the processed meat to amount to the range from 0.5 part to 12 parts by weight and preferably from 1.0 parts to 10 parts by weight with respect to 100 parts by weight of the meat. Further, the alkali may be added so as to be contained in an aqueous solution or in an aqueous solution, with the meat juice flown out as purge (drip) from the raw meat or different meats added thereto, at the rate of from 0.1 part to 2.7 parts by weight, preferably from 0.3 part to 2.0 parts by weight, and more preferably from 0.4 part to 1.3 parts by weight, with respect to 100 parts by weight of raw protein material of the meat. Moreover, the alkali may be added in a concentration ranging from 0.1 mole to 4.0 moles and preferably from 1.0 mole to 3.0 moles, depending upon the kind of the alkali. As the alkali concentration would become too low, a degree of increasing the pH value of the meat may become so low that the ability to gel the meat tissues of the meat may become instable. On the other hand, if the alkali concentration would become too high, the pH value of the meat may become too high and that the myofibril, sarcolemma and the other meat tissues may be solubilized to an excessive extent, resulting in deterioration in the meat quality and making it difficult to maintain the meat quality of the processed meat suitable for meat products.

When the salt and the alkali are added together in an aqueous solution to the meat, they may be dissolved in the solution in the same amounts and concentrations as described above and injected in the same manner as described above. In this case, it is also possible to added to meat juice flown out as drip from meat or from different meats of the identical animal or different animals.

In the salt, alkali and salt/alkali solutions to be employed for the salt, alkali and salt/alkali injection steps, there may be added one or more of the additives as added to the salt, alkali and salt/alkali solutions to be employed for the salt, alkali and salt/alkali addition steps as described above.

The physical application of the external force to the meat may be carried out in the presence of an aqueous solution in which both of the salt and the alkali are preferably dissolved in the amounts and concentrations as described above.

The physical application of the external force to the meat may be carried out by tumbling under ambient or reduce pressure or vacuum oscillating the meat.

When the tumbling is effected under ambient pressure, the meat is tumbled at from 3 rpm to 30 rpm while the meat is being kept at temperature ranging from about 1° C. to 10° C. for 1 minutes to 10 hours.

Further, when the tumbling is effected under reduced pressure, the meat is tumbled at from 3 rpm to 30 rpm under pressure ranging from about 0 mmHg to 760 mmHg while the meat is being kept at temperature ranging from about 1° C. to 10° C. for 1 minutes to 10 hours.

Moreover, the meat may be processed by subjecting it to vacuum oscillation. The vacuum oscillation may be carried out at temperature ranging from 1° C. to 10° C. for 1 minute to 10 hours.

The physical application of the external force to the meat can offer advantages as will be described below.

The meat processed by the physical application of the external force thereto can improve a cooked yield higher than the processed meat which is processed without the treatment with the salt and the alkali and decrease the outflow of meat juice (drip) with a less drip loss. the processed meat so processed can provide improved tenderness and juiciness. Further, the physical application of the external force thereto can provide the processed meat with improved flavor and improved overall taste. In addition, the processed meat so processed can be given higher sensory ratings demonstrating the effect of improving the quality grade of the meat by one grade or more.

After the meat has been processed by the force application step, the processed meat may preferably be subjected to an aging step in substantially the same manner as above, for example, by massaging, vibrating, applying ultrasonic wave or kneading.

In a preferred embodiment of the present invention where there is used, as the alkali, sodium bicarbonate, sodium carbonate, potassium bicarbonate, potassium carbonate, ammonium bicarbonate or a mixture thereof, preferably sodium bicarbonate, sodium carbonate or a mixture thereof and more preferably sodium bicarbonate and/or sodium carbonate, or in a more preferred embodiment of the present invention where there is used a combination of sodium chloride with the such alkali, there may be obtained processed meat by the method comprising a combination of the salt injection step and the alkali injection step or the salt/alkali injection step with the force application step or by the method comprising the force application step together with the salt injection step and the alkali injection step or with the salt/alkali injection step.

The processed meat in a preferred embodiment or in a more preferred embodiment of the present invention may comprise the salt at the rate of from 0.2 part to 2.0 parts by dry weight and preferably from 0.2 part to 1.5 parts by dry weight and the alkali at the rate of 0.1 part to 1.5 part by dry weight and preferably from 0.1 part to 1.0 parts by dry weight. Further, the percentage by dry weight of the salt and the alkali may be in respect of 100 parts by weight of meat.

The present invention will be described in more detail by way of examples and embodiments with reference to the accompanying drawings.

EMBODIMENT 1

Frozen inner round block meat of Australian beef of 11,050 grams was thawed under natural conditions for 18 hours. After the natural thawing, 300 grams of block meat was cut each from the lean meat and the fat meat for meat block test samples. The pH was found to be pH 5.5 for the lean meat and pH 5.7 for the fat meat. Meat juice purge(drip) oozed out from the frozen beef weighed 791 grams at the rate of 6.7%. To the purge was added water yielding 1,318 grams of a 60% drip solution.

In this embodiment, there were employed sodium chloride (NaCl: manufactured by Hayashi Junyaku Co., Ltd.), potassium chloride (KCl: Wako Junyaku Co., Ltd.) and magnesium chloride ($MgCl_2$: Wako Junyaku Co., Ltd.) as a salt, and there were employed sodium bicarbonate ($NaHCO_3$: Wako Junyaku Co , Ltd.), potassium bicarbonate ($KHCO_3$: Wako Junyaku Co., Ltd.) and sodium polyphosphate as an alkali. As an alcohol, there were employed Japanese sake, cooking wine (Goto Breweries Co., Ltd.), and mirin. As Vitamin C, there was employed lemonade (trade name: NEW LEMONADE; SS Seiyaku Co., Ltd.). As vitamin E, there was employed a Vitamin E preparation (trade name: YUBERAK; Eizai Co., Ltd.). As a saccharide, there were used sugar, sucrose and sorbitol.

Experimental Example 1-1

Twenty grams of a 60% drip solution obtained in Embodiment 1 were taken into each of two test tubes. To one of the two test tubes was added sodium chloride in the amount as shown in Table 1 below so as to yield a salt solution having a 2.6 mole concentration. On the other hand, sodium bicarbonate was added to the other test tube in the amount as shown in Table 1 below so as to yield an alkali solution having a 1.2 mole concentration. These test tubes were both placed in an injector, and a 5 grams portion of the salt solution was injected each into the meat samples. Thereafter, a 5 grams portion of the alkali solution was likewise injected each into the meat samples at four locations. The injected test samples were then subjected to vibration treatment for 10 minutes and then aged for 30 minutes.

The amounts of the salts, alkalis and other materials to be added are shown in Table 1 below.

TABLE 1

| Experimental Example No. | Drip (grams) | Salt (grams) | Alkali (grams) | Alcohol (grams) | Vitamins C (mg) | Vitamins E (mg) | Saccharide (grams) |
|---|---|---|---|---|---|---|---|
| 1-1 | 24 | 3 | 2 | 0 | 0 | 0 | 0 |
| 1-2 | 24 | 3 | 2 | 5 | 0 | 0 | 0 |
| 1-3 | 24 | 3 | 2 | 5 | 167 | 25 | 0 |
| 1-4 | 24 | 3 | 2 | 5 | 167 | 25 | 7 |
| 1-5 | 24 | 3 | 2 | 5 | 167 | 25 | 15 |
| 1-6 | 0 | 3 | 2 | 0 | 0 | 0 | 0 |
| 1-7 | 0 | 3 | 2 | 5 | 0 | 0 | 0 |
| 1-8 | 0 | 3 | 2 | 5 | 167 | 25 | 0 |
| 1-9 | 0 | 3 | 2 | 5 | 167 | 25 | 7 |
| 1-10 | 0 | 3 | 2 | 5 | 167 | 25 | 7 |
| 1-11 | 24 | 3 | 0.5 | 0 | 0 | 0 | 0 |
| 1-12 | 24 | 3 | 4 | 0 | 0 | 0 | 0 |
| 1-13 | 24 | 0.5 | 2 | 0 | 0 | 0 | 0 |
| 1-14 | 24 | 5 | 2 | 0 | 0 | 0 | 0 |

Note: The above amounts are per 300 grams of Australian beef.

The test samples were measured for a rate of absorption of the additives, pH, outer appearance (color tone and luster or glory as referred to so in this specification, i.e. such as reflecting a degree of juiciness on the surface of the meat) and elasticity, i.e. tenderness. The results are shown in Table 2 below. The rate of absorption of the additives is determined as a ratio of the amount of the salt and alkali solutions unabsorbed after aging to the amount thereof prior to the injection treatment. The pH of each of the test samples was measured with a pH meter (manufactured by Shindengen Kogyo CO., LTD.). The outer appearance of each of the test samples was determined as an average score value of ratings ranging from 1 to 10 points observed and checked by ten panelist members.

TABLE 2

Evaluations of Processed Meat

| Experimental Example No. | Absorption Rate of Additive Solution (%) | pH | Appearance (10 Ratings) Color Tone | Look | Elasticity | Remarks |
|---|---|---|---|---|---|---|
| 1-1 | 98.4 | 7.0 | 8.2 | 8.4 | 8.1 | Satisfactory luster and gloss. |
| 1-2 | 98.5 | 7.1 | 8.3 | 8.4 | 8.5 | Satisfactory luster and gloss. |
| 1-3 | 100 | 7.1 | 8.3 | 8.5 | 8.6 | Satisfactory luster and gloss. Recognized impact of vitamins E & C on tone. |
| 1-4 | 100 | 7.0 | 8.4 | 8.5 | 8.7 | Satisfactory luster and gloss. Improved gloss by addition of saccharide. |
| 1-5 | 100 | 7.1 | 8.5 | 8.5 | 8.7 | Satisfactory luster and gloss. No deterioration from freezing. Elastic. |
| 1-6 | 98.5 | 7.1 | 8.4 | 8.2 | 7.9 | Satisfactory luster and gloss. |
| 1-7 | 98.5 | 7.2 | 8.3 | 8.3 | 8.0 | Satisfactory luster and gloss. |
| 1-8 | 98.8 | 7.1 | 8.4 | 8.4 | 8.6 | Satisfactory luster and gloss. |
| 1-9 | 98.5 | 7.1 | 8.5 | 8.4 | 8.7 | Satisfactory luster and gloss. |
| 1-10 | 98.5 | 7.1 | 8.5 | 8.5 | 8.7 | Satisfactory luster and gloss. |
| 1-11 | 85.3 | 6.1 | 6.8 | 7.2 | 7.1 | Elasticity, luster & gloss somewhat deteriorated. |
| 1-12 | 100 | 7.1 | 8.3 | 8.5 | 8.9 | Satisfactory luster and gloss. Elastic. |
| 1-13 | 95.5 | 8.0 | 8.2 | 7.9 | 8.0 | Luster & gloss somewhat deteriorated. |
| 1-14 | 100 | 7.3 | 8.1 | 8.9 | 9.1 | Normal luster and gloss. |

The processed meat was then tested for cooking and boiling. As a sample, an approximately half of the sample material was minced for 1 minute. The meat samples for the cooking test were each prepared by forming 50 grams of the minced meat to a disk shape having a thickness of 9 mm and a diameter of 83 mm and then cutting the upper and bottom surface portions to a thickness of 5 mm.

a. Cooking Tests

The cooking test was carried out by grilling the meat sample on its upper side for 4 minutes and on its bottom side for 3 minutes on a hot plate heated to 180° C. By the cooking test, the meat samples were measured for their cooked yield, expansion rate, sensory or organoleptic tests (elasticity, i.e. tenderness, and flavor), and folding tests. The cooked yield of the cooked meat was determined as a percentage obtained by dividing the weight of the cooked meat immediately after cooking by the weight thereof prior to cooking. The expansion rate of the cooked meat was determined as a percentage by measuring the diameter and the thickness of the meat sample after cooking and then dividing the resulting volume of the meat sample by the volume thereof prior to cooking. The sensory or organoleptic tests (elasticity, i.e. tenderness and flavor) were determined as an average score of 10 ratings measured and observed by ten volunteer panelists. The folding test was carried out in accordance with the methods described in publication entitled "Kneaded Fish Meat Products—New Edition", page 399, 1986 (published by Koseisha-Koseikaku). FIG. 1 is a process diagram showing the status of a sample in the folding test. Evaluation of the test sample was determined by the following ratings:

A: No cracking caused to occur by folding the cooked test sample into four;

B: No cracking caused to occur by folding the cooked test sample into two, but cracking caused to occur by folding the cooked test sample into four;

C: Cracking caused to occur by a half portion by folding the cooked test sample into two; and D: Cracking caused to occur in its entirety by folding the cooked test sample into two.

The tests results are shown in Table 3 below.

TABLE 3

Evaluations of Processed Meat

| Experimental Example No. | Cooked Yield (%) | Expansion Rate (%) | Sensory Test Results (10 Ratings) | | Folding Test Result | Remarks |
|---|---|---|---|---|---|---|
| | | | Elasticity | Flavor | | |
| 1-1 | 93.3 | 105.8 | 8.3 | 7.2 | A | Good feeling upon chewing, elastic and supple. |
| 1-2 | 93.5 | 104.3 | 8.3 | 7.8 | A | Good feeling upon chewing, elastic and supple. |
| 1-3 | 93.0 | 104.8 | 8.4 | 7.8 | A | Good feeling upon chewing, elastic and supple. |
| 1-4 | 93.8 | 115.6 | 8.5 | 8.5 | A | Good feeling upon chewing, elastic and supple. Satisfactory flavor & color tone. |
| 1-5 | 94.8 | 118.8 | 8.5 | 8.2 | A | Good feeling upon chewing, elastic and supple. Flavor deteriorated somewhat. Satisfactory color tone. |
| 1-6 | 94.0 | 104.5 | 8.2 | 7.4 | A | Satisfactorily elastic and supple. |
| 1-7 | 93.8 | 104.0 | 8.1 | 7.8 | A | Satisfactorily elastic and supple. |
| 1-8 | 94.5 | 115.8 | 8.1 | 7.9 | A | Satisfactorily elastic & supple and satisfactory color tone. |
| 1-9 | 95.0 | 116.5 | 8.4 | 7.9 | A | Satisfactorily elastic & supple and satisfactory shine & color tone. |
| 1-10 | 95.3 | 116.5 | 8.4 | 8.2 | A | Satisfactorily elastic & supple and satisfactory shine & color tone. |
| 1-11 | 79.0 | 94.8 | 6.8 | 7.3 | B | Hard to chew & poor in resilience, yet no rough feeling upon chewing. |
| 1-12 | 96.0 | 114.8 | 8.9 | 8.5 | A | Fine in elasticity & flavor and stretched well. |
| 1-13 | 87.0 | 100.5 | 7.1 | 6.9 | B | Elasticity and chewing deteriorated somewhat. Rough taste. |
| 1-14 | 100 | 7.3 | 8.1 | 8.9 | A | Fine elasticity, chewing & taste, yet less flavor. | b. Boiling Tests

A sample for the boiling tests was prepared by mincing the meat and forming 90 grams of the minced meat into a cylindrical bar shape having a diameter of 30 mm and a length of 70–80 mm. The boiling tests were carried out by enclosing the meat paste with a wrap and placing the wrap in a water bath heated to 85° C. for 40 minutes, thereby processing the meat into a semi-solid form. The test sample was then subjected to rheometer tests, organoleptic tests and folding tests.

Figure 2:
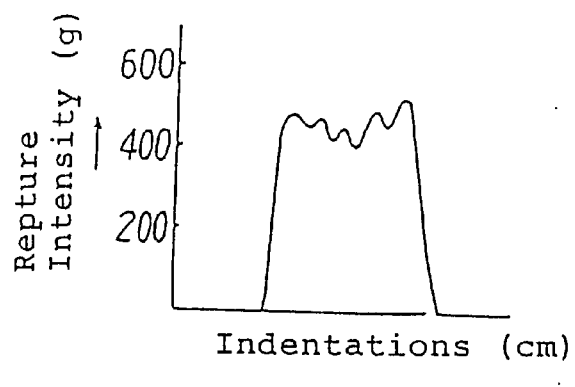
FIG. 2 is graphs showing the measurement of three test samples of the embodiment with a rheometer.
Figure 2:
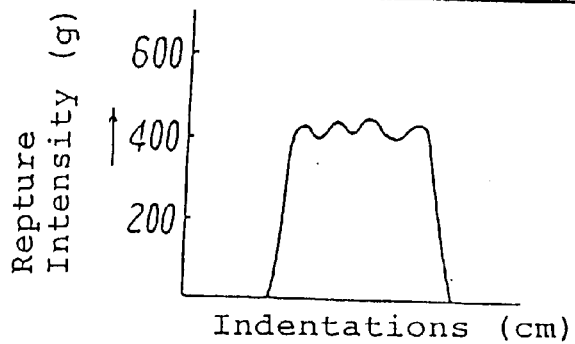
Figure 2:
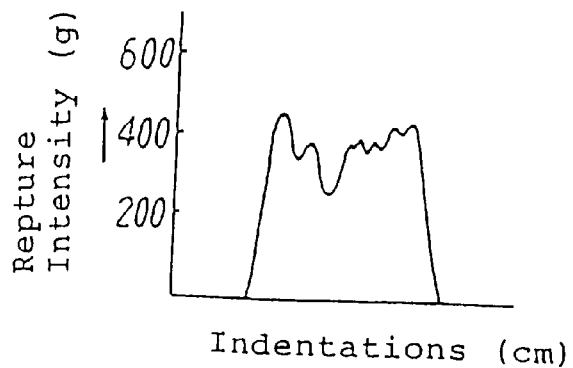

For the rheometer tests, a test sample was prepared by gouging a central portion having a diameter of 30 mm out from the boiled meat sample and cutting a cylinder having a diameter of 30 mm and a length of 30 mm. The rheometer tests were carried out using a rheometer tester (manufactured by Fudo Kogyo Co., Ltd.) by measuring a rupture intensity as expressed by the depth of penetration in a unit of grams, indicative of the degree of hardness, or tenderness of cooked meat, a depth width as expressed in a unit of cm indicative of tenderness or flexibility, and Jelly intensity as expressed in g·cm. The results of the rheometer tests are shown in FIG. 2.

The tests results are indicated in Table 4 below.

TABLE 4

Evaluations of Processed Meat

| Experimental Example No. | Rheometer Test Results | | | Sensory Test Results (10 Ratings) | | Folding Test Result | Remarks |
|---|---|---|---|---|---|---|---|
| | Rupture Intensity (grams) | Depth Width (cm) | Jelly Intensity (g/cm) | Elasticity | Flavor | | |
| 1-1 | 420 | 3.1 | 1302 | 8.3 | 7.2 | A | Evident effects of salt and alkali recognized |
| 1-2 | 410 | 2.9 | 1189 | 8.4 | 7.8 | A | Evident effects of salt and alkali recognized |
| 1-3 | 415 | 3.2 | 1328 | 8.4 | 7.8 | A | Evident effects of salt and alkali recognized |
| 1-4 | 400 | 3.1 | 1240 | 8.5 | 8.5 | A | Outstanding effects of salt and alkali shown |
| 1-5 | 415 | 3.2 | 1328 | 8.5 | 8.2 | A | Outstanding effects of salt and alkali shown |

TABLE 4-continued

Evaluations of Processed Meat

| Experimental Example No. | Rheometer Test Results | | | Sensory Test Results (10 Ratings) | | Folding Test | |
|---|---|---|---|---|---|---|---|
| | Rupture Intensity (grams) | Depth Width (cm) | Jelly Intensity (g/cm) | Elasticity | Flavor | Result | Remarks |
| 1-6 | 400 | 3.2 | 1280 | 8.2 | 7.4 | A | Evident effects of salt and alkali recognized |
| 1-7 | 410 | 3.3 | 1353 | 8.2 | 7.8 | A | Evident effects of salt and alkali recognized |
| 1-8 | 420 | 3.6 | 1512 | 8.1 | 7.9 | A | Sufficient effects of salt and alkali upon gelation |
| 1-9 | 445 | 3.4 | 1513 | 8.0 | 7.9 | A | Sufficient effects of salt and alkali upon gelation |
| 1-10 | 450 | 3.2 | 1440 | 8.4 | 8.2 | A | Sufficient effects of salt and alkali upon gelation |
| 1-11 | 675 | 3.7 | 2775 | 6.8 | 7.3 | C | Some effects of salt shown |
| 1-12 | 350 | 3.7 | 1295 | 8.9 | 8.5 | A | Sufficient effects of salt and alkali upon gelation |
| 1-13 | 440 | 3.5 | 1540 | 7.1 | 6.9 | B | Some effects of alkali upon gelation shown |
| 1-14 | 380 | 3.4 | 1292 | 8.3 | 7.3 | A | Sufficient effects of salt and alkali upon gelation |

Experimental Example 1-2

To two test tubes each containing 20 grams of the purge (drip) solution were add sodium chloride and a mixture of the alkali and the alcohol, respectively, in the proportions as shown in Table 1. The test samples were likewise tested in the same manner as in Experimental Example 1-1 above. The test results are shown in Tables 2 to 4 above.

It is to be noted herein that the use of a mixture of Japanese rice wine (sake) and mirin (rice wine for seasonings) as the alcohol at an equal ratio gave nearly the same results as in Experimental Example 1-2.

Experimental Example 1-3

Sodium chloride and vitamins C and E were added in the proportions as indicated in Table 1 above to one test tube containing 20 grams of the purge solution, and sodium bicarbonate and cooking rice wine were added in the proportions as indicated in Table 1 above to another test tube containing 20 grams of the purge solution. The test samples were likewise tested in the same manner as in Experimental Example 1-1 above. The test results are shown in Tables 2 to 4 above.

It is to be noted herein that the use of a 1:1 mixture of Japanese rice wine ("sake") and mirin as well as Sherry wine as the alcohol at equal rates gave nearly the same results as in Experimental Example 1-3.

Experimental Example 1-4

Sodium chloride, vitamins C and E and saccharide were added in the proportions as indicated in Table 1 above to one test tube containing 20 grams of the purge solution, and sodium bicarbonate and cooking rice wine were added in the proportions as indicated in Table 1 above to another test tube containing 20 grams of the purge solution. The test samples were likewise tested in the same manner as in Experimental Example 1-1 above. The test results are shown in Tables 2 to 4 above.

It is to be noted herein that the use of a 9:1 mixture of sodium chloride and potassium chloride as well as the use of a 4:1 mixture of sodium chloride and magnesium chloride, in place of sodium chloride alone, gave nearly the same results as in Experimental Example 1-4.

Experimental Example 1-5

Sodium chloride, vitamins C and E and saccharide were added in the proportions as indicated in Table 1 above to one test tube containing 20 grams of the purge solution, and sodium bicarbonate and cooking rice wine were added in the proportions as indicated in Table 1 above to another test tube containing 20 grams of the purge solution. The resulting purge solutions were likewise injected in the same manner as in Experimental Example 1-1 above into the test sample and then the injected sample was allowed to freeze at −25° C. and to stand at that temperature for 10 days. After freezing at −25° C. for 10 days, the sample was taken out from the freezer and tested to measure an extent of its denaturation caused by freezing in the same manner as in Experimental Example 1-1. The test results are shown in Tables 2 to 4 above. The results obtained by the rheometer tests are shown in FIG. 2.

It can be noted herein that in Experimental Example 1-5, the use of an equal mixture of sodium bicarbonate with sodium polyphosphate in place of sodium bicarbonate and the use of sorbitol in place of sugar gave substantially the same results as above.

Experimental Examples 1-6 to 1-9

Sodium chloride, vitamins C and E and saccharide were added in the proportions as indicated in Table 1 above to one test tube containing 20 grams of water without the purge solution, and sodium bicarbonate and cooking rice wine were added in the proportions as indicated in Table 1 above to another test tube containing 20 grams of water without the purge solution. The resulting samples were likewise tested in the same manner as in Experimental Examples 1-1 to 1-4 above. The test results are shown in Tables 2 to 4 above.

Experimental Example 1-10

A test solution with the same constituents as in Experimental Example 1-9 was prepared, and the test for injection treatment was carried out by changing the order of injection. In other words, in this experimental example, the sodium bicarbonate solution was injected into the sample before the injection of the sodium chloride solution. The sample was likewise evaluated as in Experimental Example 1-9. The results of the test are shown in Tables 2 through 4 above.

Experimental Examples 1-11 to 1-12

The effects of the alkali solution upon the sample meat were evaluated in the manner as will be described hereinafter.

Sodium chloride and sodium bicarbonate were added in the proportions as indicated in Table 1 above, respectively, to two test tubes each containing 20 grams of the purge solution. The test sample meat was tested in the same manner as in Experimental Example 1-1, and the test results are shown in Tables 2 through 4 above.

Experimental Examples 1-13 to 1-14

The effects of sodium chloride upon the sample meat were evaluated in the manner as will be described hereinafter.

Sodium chloride and sodium bicarbonate were added in the proportions as indicated in Table 1 above, respectively, to two test tubes each containing 20 grams of the purge solution. The test sample meat was tested in the same manner as in Experimental Example 1-1, and the test results are shown in Tables 2 through 4 above.

Comparative Example 1-1

Figure 3:
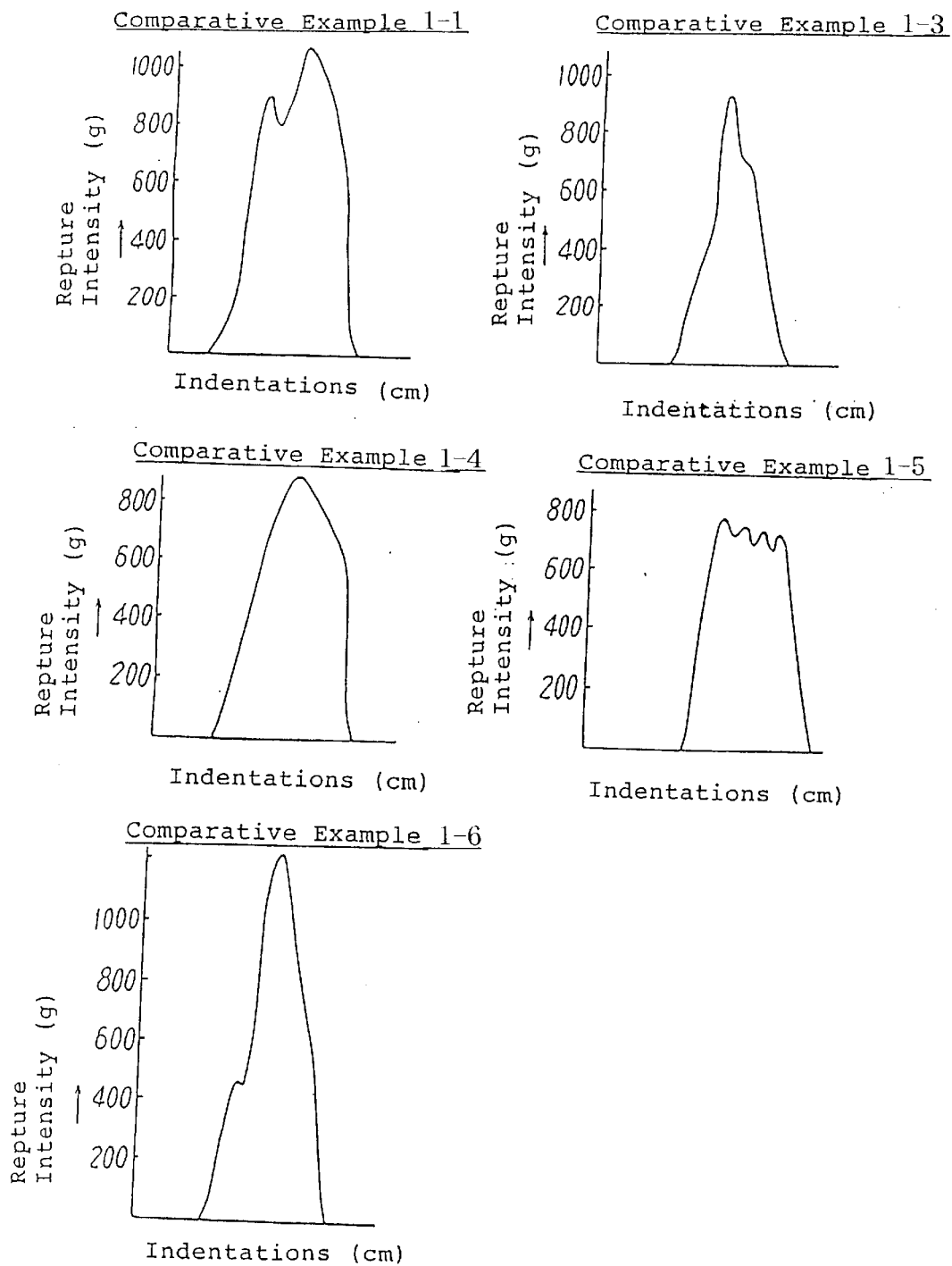
FIG. 3 is graphs showing the measurement of comparative samples with a rheometer.

As shown in Table 5, neither meat juice nor other additives such as water, sodium chloride, alkali solution, and alcohol were added to the test sample. Tests were carried out using 300 grams of meat a block alone in the same manner as in Experimental Example 1-1. The results of the test are shown in Tables 6 through 8 below. The results of the rheometer tests also are shown in FIG. 3.

TABLE 5

Amounts of Additives

| Comparative Example No. | Drip (grams) | Salt (grams) | Alkali (grams) | Alcohol (grams) | Vitamins C (mg) | Vitamins E (mg) | Saccharide (grams) |
|---|---|---|---|---|---|---|---|
| 1-1 | 0 | 0 | 0 | 0 | 0 | 0 | 0 |
| 1-2 | 0 | 0 | 0 | 0 | 0 | 0 | 0 |
| 1-3 | 24 | 0 | 0 | 0 | 0 | 0 | 0 |
| 1-4 | 24 | 3 | 0 | 0 | 0 | 0 | 0 |
| 1-5 | 24 | 0 | 2 | 0 | 0 | 0 | 0 |
| 1-6 | 24 | 0 | 0 | 5 | 0 | 0 | 0 |

TABLE 6

Evaluations of Processed Meat

| Comparative Example No. | Absorption Rate of Additive Solution (%) | pH | Appearance (10 Ratings) Color Tone | Shine | Elasticity | Remarks |
|---|---|---|---|---|---|---|
| 1-1 | — | 5.6 | 5.4 | 5.9 | 6.0 | Meat color whitened and drastic water separation shown. Variations in colors between external and internal meat seen. Poor elasticity. |
| 1-2 | 72.0 | 5.6 | 5.4 | 5.8 | 6.0 | Meat color whitened and drastic water separation shown. |
| 1-3 | 72.5 | 5.5 | 5.9 | 6.3 | 6.4 | Meat color whitened and relatively slight water separation. |
| 1-4 | 97.5 | 5.5 | 7.1 | 6.9 | 7.4 | Effect of salt shown. Meat looked fresh in color as if having luster, but slight moisture contents. |
| 1-5 | 95.5 | 6.5 | 7.2 | 7.0 | 7.2 | Meat color whitened and evident swelling shown. Relatively slight water separation seen. |
| 1-6 | 72.6 | 5.7 | 5.6 | 6.1 | 5.9 | Meat color transformed without having any luster and gloss. |

TABLE 7

Evaluations of Processed Meat

| Comparative Example No. | Cooked Yield (%) | Expansion Rate (%) | Sensory Test Results (10 Ratings) Elasticity | Flavor | Folding Test Result | Remarks |
|---|---|---|---|---|---|---|
| 1-1 | 72.5 | 73.0 | 6.4 | 5.9 | D | Crumbly and tasteless. Meat juice left. |
| 1-2 | 73.8 | 73.0 | 6.5 | 5.9 | D | Crumbly and tasteless. Meat juice left. |
| 1-3 | 77.8 | 71.3 | 6.2 | 6.1 | D | Somewhat crumbly. Meat juice left. |

TABLE 7-continued

Evaluations of Processed Meat

| Comparative Example No. | Cooked Yield (%) | Expansion Rate (%) | Sensory Test Results (10 Ratings) | | Folding Test | |
|---|---|---|---|---|---|---|
| | | | Elasticity | Flavor | Result | Remarks |
| 1-4 | 79.4 | 74.3 | 6.8 | 6.4 | D | Tasteful although crumbly. Meat juice left. |
| 1-5 | 85.0 | 75.7 | 7.0 | 6.0 | C | Turned like liver and somewhat elastic. Meat juice left. |
| 1-6 | 73.3 | 70.5 | 6.5 | 6.1 | D | Somewhat hard to masticate and poor feeling upon chewing. Meat juice left. |

TABLE 8

Evaluations of Processed Meat

| Comparative Example No. | Rheometer Test Results | | | Sensory Test Results (10 Ratings) | | Folding Test | |
|---|---|---|---|---|---|---|---|
| | Rupture Intensity (grams) | Depth Width (cm) | Jelly Intensity (g/cm) | Elasticity | Flavor | Result | Remarks |
| 1-1 | 1115 | 2.5 | 2787 | 6.4 | 4.9 | D | High strength and crumbly |
| 1-2 | 1110 | 2.6 | 2886 | 6.5 | 4.9 | D | High strength and crumbly |
| 1-3 | 920 | 2.0 | 1840 | 6.2 | 5.1 | D | High strength and crumbly |
| 1-4 | 895 | 2.6 | 2327 | 6.8 | 5.4 | D | Effect of salt seen, but insufficient gelation |
| 1-5 | 780 | 2.7 | 2106 | 7.0 | 5.0 | C | Effect of alkali seen, but insufficient gelation |
| 1-6 | 1205 | 2.6 | 3133 | 6.5 | 5.1 | D | High strength and crumbly |

Comparative Example 1-2

After injection of a meat clump with 40 grams of water in the same manner as in Experimental Example 1-1, testing was performed with the same method as in Experimental Example 1-1. The results of this test are shown in Tables 6 through 8 above.

Comparative Example 1-3

After injection of meat clump with 40 grams of the purge solution in the same method as in Experimental Example 1-1, testing was performed with the same method as in Experimental Example 1-1. The results of this test are shown in Tables 6 through 8 above. The results of the rheometer tests also are shown in FIG. 3.

Comparative Example 1-4

Sodium chloride was added in the proportion as indicated in Table 5 above to a test tube containing 20 grams of the purge solution as prepared in Experimental Example 1-1. Another test tube containing 20 grams of the purge solution was used as a control. The test sample meat was tested in the same manner as in Experimental Example 1-1, and the test results are shown in Tables 6 through 8 above. The results of the rheometer tests also are shown in FIG. 3.

Comparative Example 1-5

Sodium bicarbonate was added in the proportion as indicated in Table 5 above to a test tube containing 20 grams of the purge solution as prepared in Experimental Example 1-1. Another test tube containing 20 grams of the purge solution was used as a control. The test sample meat was tested in the same manner as in Experimental Example 1-1, and the test results are shown in Tables 6 through 8 above. The results of the rheometer tests also are shown in FIG. 3.

Comparative Example 1-6

Japanese rice wine (sake) was added in the proportion as indicated in Table 5 above to a test tube containing 20 grams of the purge solution as prepared in Experimental Example 1-1. Another test tube containing 20 grams of the purge solution was used as a control. The test sample meat was tested in the same manner as in Experimental Example 1-1, and the test results are shown in Tables 6 through 8 above. The results of the rheometer tests also are shown in FIG. 3.

As clearly shown in Tables 5 through 8 above, it is found that injection of water into the meat gave virtually no significant difference in cooked yield compared to the unprocessed meat (Comparative Examples 1-1 and 1-2), while injection of the meat with the meat juice achieved an increase in the cooked yield by several percentage as compared to the meat stock, having a good compatibility of meat juice with the raw meat without causing any water separation from the meat.

It is also found that the injections only with the meat juice and an alcohol additive show almost no significantly improved results in cooked yield and elasticity (as shown in Comparative Examples 1-3 and 1-6). The outflow of the meat juice from the meat is also remarkably great during the cooking test. On the other hand, the addition of the meat juice to the sodium chloride solution and to the alkali solution achieves some improvements in cooked yield by approximately 8% and 16%, respectively. Further, some improvements in elasticity are also recognized, yet the results of bending or folding tests and rheometer tests are still insufficient as shown in Comparative Examples 1-4 and 1-5.

It is further found that the meat processed by this embodiment according to the present invention has an exceedingly high rate of absorption of the additives and achieves improvements in cooked yield by from 128% to 138%, in contrast with Comparative Example 1. Moreover, it is found from the results of the folding tests that all the meats processed in accordance with the comparative examples show the rating D while most of the meats processed in accordance with the present invention show the rating A. More specifically, the comparative samples caused cracking when folded into two, while the samples prepared from processed meat of this invention caused no cracks even when folded into four.

It is also evaluated by all the panelists that the meat quality of the meats processed by the method according to the present invention is extremely tender and gives a feeling of fine texture, like a fillet steak tasting like a roasted beef of an extremely high grade. It is thought that the present invention can create these improved nature of the meats by the appropriate combination of the effects by the addition of the salt in such a high concentration with the effects by the addition of the alkali in such a high concentration. The addition of the salt in the such high concentration can create the effects of gradually solubilizing perimysium, myofibril, sarcolemma and other meat tissues. On the other hand, the addition of the alkali in the such high concentration can assist in advancing the effects created by the addition of the salt in the such high concentration forming a reticulation in the meat tissues and accompany the gelation of proteins in the meat tissues. The formation of the reticulated structure in the meat tissues and the gelation of the proteins in the meat tissues assist in ripening and aging the meat, thereby resulting in the creation of the improved nature of the meat. An optical-microscopic comparison of the meats prepared by Comparative Examples 1-1 through 1-6 with those prepared by Embodiment 1 revealed that the myofibril could clearly be seen on the meat sample of each of the meats prepared by Comparative Examples 1-1 through 1-6, while the perimysium and the sarcolemma of the meat tissues are solubilized forming an intertwined network structure in the muscular fibers on the meat sample of each of the meats prepared by Embodiment 1. As a result of observations by the optical microscope, it is found that the meat tissues of the meat processed by the present invention are totally different from those of the meat processed by Comparative Examples.

It is further thought that the formation of the reticulated structure in the meat tissues resulting from the intertwinement of the muscle bundles and muscular fibers on account of the solubilization of the perimysium, sarcolemma and the like assists in improving the rate of absorption of the additive in the processed meat and the cooked yield of the processed meat. Further, the formation of the reticulated structure assists in achieving the improved expansion rate upon cooking, for example, as shown in Experimental Example 1-5 by 163% as compared with Comparative Example 1-1.

Moreover, it is found that, during the cooking tests, all the comparison samples cause meat juice to come out in large amounts, thereby generating smoke upon cooking, while meat juice little comes out from the meat samples of the meat processed by the present invention resulting in little generating smoke. It is thought that these effects achieved by the present invention are created by a better water prevention or water-binding ability and by the solubilization of the perimysium, myofibril, sarcolemma, etc. and the transformation of such meat tissues into a fine network or reticulated structure, as shown by the observation by the optical microscope. The such improved nature of the meat tissues assists in contracting the muscular tissues of the meat, thereby weakening the action to ooze out meat juice from the meat and preventing the outflow of the meat juice therefrom. Further, the swelling of the meat tissues is furthered to a remarkable extent accompanying the so-called syringe effect of sustaining the meat juice in the meat tissues and preventing the outflow of the meat juice from the meat. Therefore, little smoke is emitted upon cooking and the meat is cooked tender.

It is further found that the addition of the alcohol improves elasticity and tenderness, thereby attaining a higher product value when the meat is processed into hamburgers and other meat products, as particularly shown in Experimental Examples 1-1, 1-2, 1-6, and 1-7.

Furthermore, it is confirmed from Experimental Example 1-5 that no deterioration in meat quality is cased in the processed meat upon freezing even when freezing the processed meat in a freezer and storing it at −25° C. for 10 days and a product evaluation of the processed meat can be rated as high as the processed meat produced by Experimental Example 1-4. Moreover, when the meat processed by Experimental Example 1-4 was frozen in is a freezer at −25° C. for 30 days, a product evaluation remained unchanged. This is due to the complementary effects of the salt solution and the alkali solution causing the formation of a fine net-like structure of the protein in the meat and further assisting in holding low molecular proteins, such as sarcoplasm, and the like in the meat and preventing the outflow of the meat juice from the meat. It is also thought that the salt and the alkali assist in preventing the oxidation on the surface of the meat.

In contrast to the test meat samples processed by Experimental Examples of this embodiment, the comparison meat samples had a Jelly strength and rupture strength of over 200%, but the sensory or organoleptic tests revealed that the comparison meat samples are little juicy and tender so that they could not readily become pasty even if chewed for a long time, with a feeling of tough and rough texture in the mouth. On the other hand, the test samples using the processed meats of this embodiment had elasticity (tenderness) and a good texture so that meat juice did not come out from the meat chops, thereby making it flavorful, juicy and easy to chew and providing an exceedingly fine feeling and a favorable texture upon eating.

The processed meat of the embodiment according to the present invention had no longer any livestock-like smell after vibration treatment. This is thought to be caused by the change in the structure of the meat tissues.

Examination of the rheometer test data showed that the meats processed by Comparative Examples, where neither salt nor alkali are added, had sharp peaks on their ends (Comparative Examples 1-1, 1 -3 and 1-6) due to the high rupture resistance. However, on the other hand, the processed meats with the salt added had a peak shape turned into an obtuse angle, while the processed meats with the alkali added thereto had their peaks converted into an uneven shape lowering the rupture strength. In contrast, the processed meats according to the embodiment of the present invention had a low rupture strength and all their top portions were flat having uneven patterns with multiple concave and convex portions. This gives a more pleasant feeling upon eating on account of the numerous convex and concave portions and provides a good texture and elasticity, along with a moderate rupture strength of varying quality.

It was also found that gelling could be performed with extremely small amounts of sodium chloride as small as 0.5 gram to 5 grams (0.16 to 1.6 parts by weight with respect to the weight of the meat). The complementary effect of the alkali solution can accounted for the gelling at such a low amount of sodium chloride.

A high test evaluation rating was obtained for 4 grams of sodium bicarbonate, i.e. 1.3 parts by weight with respect to the weight of the meat. When 6 grams of sodium bicarbonate were dissolved in warm water (1.9 parts by weight with respect to the weight of the meat), the same effect was obtained after injection as in Experimental Example 1-12.

This shows that the quantity of the alkali solution can be increased if an alkali with a high solubility is employed. However, when the quantity of alkali is too high, the effect of the alkali becomes too strong and tends to cause drastically deteriorating in taste.

Evaluations of processed meats and products are performed on meat processed using a solution of sodium chloride with meat juice (drip) added thereto and on meat processed using a solution of sodium bicarbonate in water containing no meat juice. The results of the evaluations on the meats obtained were identical to those obtained by Experimental Example 1-1.

Tests were also performed in which the meats were processed in substantially the same manner as in Experimental Example 1-1 except brushing the salt solution in a high concentration or the alkali solution in a salt solution on the meat. The test results gave no significant differences from the meat processed in Experimental Example 1-1. However, this processing process requires a longer time to cause the solutions to penetrate in the inner part of the meat in a block shape and age it, while the meat processed by the injection treatment takes 30 minutes. On the other hand, in the case of the meat in a plate shape such as steak or the like, the brushing is easier and higher in workability than the injection treatment.

The penetration or immersion method was further confirmed under identical conditions as in Experimental Example 1-1. The results obtained were largely identical to those of Experi-mental Example 1-1. The findings from the penetration method proved largely identical to those of the brushing method.

Further, massage treatment was performed as a substitution for the vibration treatment of Experimental Example 1-1. The results obtained were identical to those of Experimental Example 1-1. This test showed that a combination of the injector and massage machines were applicable to processing a large quantity of meat in a short time.

A microscope was used to confirm the effects of the salt solution and the alkali solution in a high concentration on the meat tissues of the skeletal muscles and the fat tissues in the meat.

Five grams of meat each were taken as test samples from the skeletal muscle portions of the meat of Experimental Example 1-6 and Comparative Example 1-1. After freezing them in liquid nitrogen, they were wrapped in paraffin and sliced into segments of 10 micron and the paraffin was removed. They were then dyed with a reagent and examined under a 400 power optical microscope.

Examination clearly showed the cell membranes in the test sample of Comparative Example 1-1, while no cell membranes were shown in the test sample of Experimental Example 1-6, with the cell membranes ruptured and filled with the connective liquid throughout. This examination clearly confirms the effects of the action of the salt for solubilizing meat tissues and the development of the emulsification and gelation thereof.

Further, samples of 5 grams each were taken from the fat portion of the meat of Experimental Example 1-6 and Comparative Example 1-1 and samples for observation with the microscope were prepared in the same manner as described hereinabove. The examination was performed under an optical microscope at 400 power.

Examination clearly showed that the cell membranes are left unchanged in the sample of Comparative Example 1-1, while no cell membranes were shown in the test sample of Experimental Example 1-6, with the cell membranes ruptured and filled with the connective liquid throughout. This examination clearly confirms the effects of the action of the salt for solubilizing meat tissues and the development of the emulsification and gelation thereof. Further, the fat and cell structures were found to totally integrate with each other, demonstrating the development of transformation and the improved quality.

EMBODIMENT 2

After frozen breast meat of domestic poultry of 1,510 grams was naturally thawed over 18 hours, it was cut into chunks of 300 gram for use as test samples. The pH was 5.5 and meat juice (drip) of 220 grams was obtained at a drip rate of 12.6%. Water was added to the drip to obtain a drip liquid having a drip concentration of 75% yielding a drip liquid of 294 grams.

Experimental Examples 2-1 to 2-5

Figure 4:
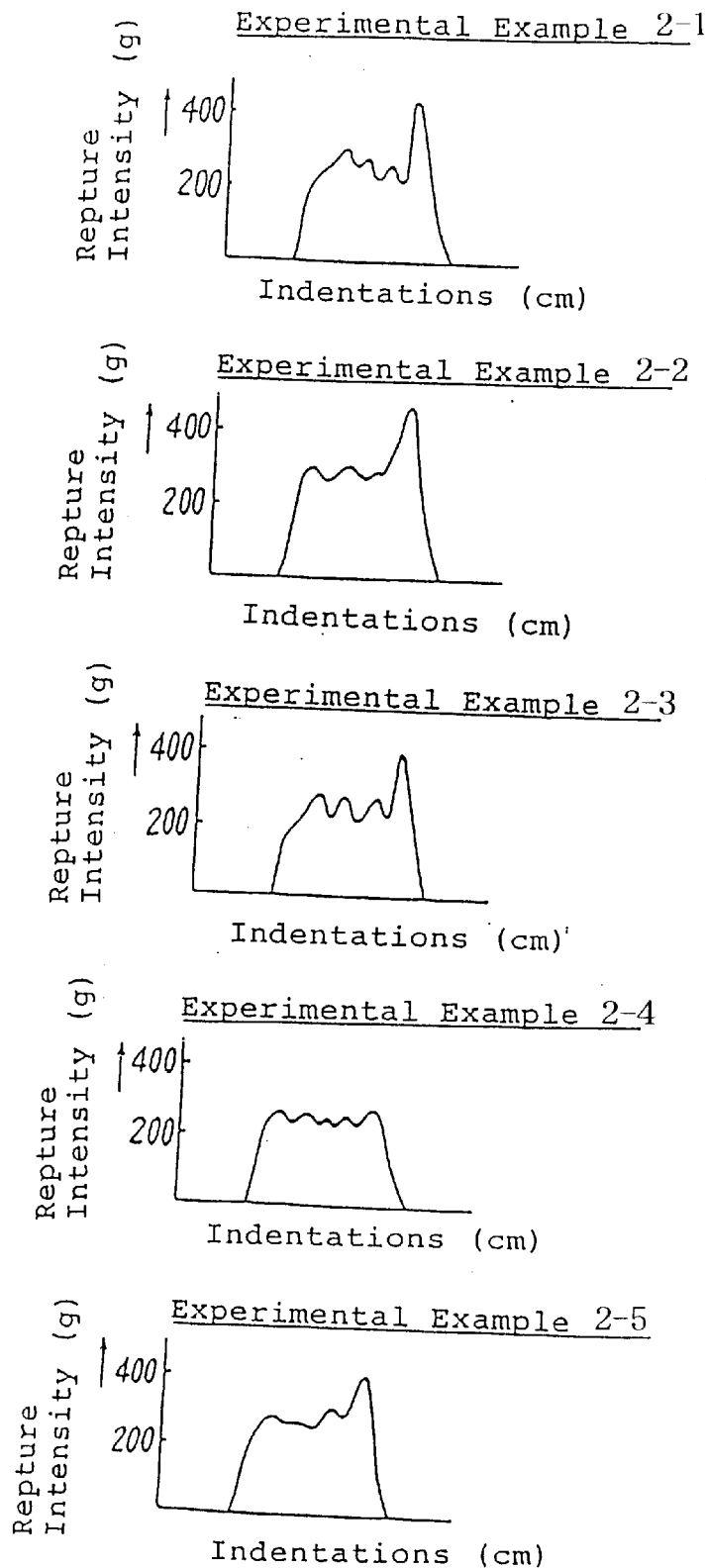
FIG. 4 is graphs showing the measurement of test samples of the embodiment with a rheometer.

Drip liquid in the amount of 20 grams for each was poured in two test tubes and mixed with the salt and the alkali in the proportions shown in Table 9, one tube being added with sodium chloride and the other test tube being added with sodium bicarbonate, respectively, forming a salt solution in a high concentration and an alkali solution in a high concentration. Samples were then obtained, tested and evaluated in the same manner as with Experimental Example 1-1. The results are shown in Tables 10 through 12. The results of the rheometer tests are shown in FIG. 4.

TABLE 9

Amounts of Additives

| Experi-mental Example No. | Drip (grams) | Salt (grams) | Alkali (grams) | Alcohol (grams) | Vitamins C (mg) | Vitamins E (mg) | Saccha-ride (grams) |
|---|---|---|---|---|---|---|---|
| 2-1 | 30 | 3 | 0.5 | 0 | 0 | 0 | 0 |
| 2-2 | 30 | 3 | 2 | 0 | 0 | 0 | 0 |
| 2-3 | 30 | 3 | 4 | 0 | 0 | 0 | 0 |
| 2-4 | 30 | 0.5 | 2 | 0 | 0 | 0 | 0 |
| 2-5 | 30 | 5 | 2 | 0 | 0 | 0 | 0 |

TABLE 10

Evaluations of Processed Chicken Meat

| Experi-mental Example No. | Absorption Rate of Additive Solution (%) | pH | Appearance (10 Ratings) Color Tone | Shine | Elasti-city | Remarks |
|---|---|---|---|---|---|---|
| 2-1 | 90.4 | 6.3 | 6.9 | 6.1 | 7.1 | Meat had wet surface, although skin looked somewhat fatty. |
| 2-2 | 95.3 | 7.1 | 5.9 | 7.3 | 8.2 | Meat had wet surface, although |

TABLE 10-continued

Evaluations of Processed Chicken Meat

| Experimental Example No. | Absorption Rate of Additive Solution (%) | pH | Appearance (10 Ratings) | | | Remarks |
| --- | --- | --- | --- | --- | --- | --- |
| | | | Color Tone | Shine | Elasticity | |
| 2-3 | 98.5 | 8.0 | 8.1 | 8.3 | 7.9 | skin looked somewhat fatty. Meat had wet surface, although skin looked very fatty. |
| 2-4 | 88.4 | 7.3 | 7.2 | 6.1 | 8.2 | Meat color whitened and no fat aggregated. |
| 2-5 | 95.1 | 7.1 | 8.9 | 8.3 | 9.1 | Meat had wet surface, although some fat aggregated. |

TABLE 11

Evaluations of Processed Chicken Meat

| Experimental Example No. | Cooked Yield (%) | Expansion Rate (%) | Sensory Test Results (10 Ratings) | | Folding Test Result | Remarks |
| --- | --- | --- | --- | --- | --- | --- |
| | | | Elasticity | Flavor | | |
| 2-1 | 85.0 | 89.5 | 6.9 | 7.2 | B | Cooked yield and expansion rate low. Weak capability of gelation. |
| 2-2 | 90.4 | 110.5 | 8.1 | 8.3 | B | Improved cooked yield, expansion rate and elasticity. |
| 2-3 | 92.5 | 116.8 | 7.9 | 8.1 | A | Excellent performance in elasticity, meat surface color, and cooked yield. |
| 2-4 | 88.7 | 100.5 | 6.5 | 7.2 | B | Lacking in elasticity. |
| 2-5 | 90.3 | 116.5 | 8.9 | 8.6 | A | Good performance in elasticity, meat surface color, and cooked yield. |

TABLE 12

Evaluations of Processed Chicken Meat

| Experimental Example No. | Rheometer Test Results | | | Sensory Test Results (10 Ratings) | | Folding Test Result | Remarks |
| --- | --- | --- | --- | --- | --- | --- | --- |
| | Rupture Intensity (grams) | Depth Width (cm) | Jelly Intensity (g/cm) | Elasticity | Flavor | | |
| 2-1 | 435 | 2.5 | 1087 | 6.9 | 7.2 | B | Some effects of salt and alkali recognized |
| 2-2 | 465 | 2.8 | 1302 | 8.1 | 8.3 | B | Improved effects of salt and alkali upon gelation |
| 2-3 | 410 | 2.4 | 984 | 7.9 | 8.1 | A | Excellent effects of salt and alkali upon gelation |
| 2-4 | 315 | 2.7 | 850 | 6.3 | 7.0 | B | Some effects of alkali upon gelation |
| 2-5 | 405 | 2.4 | 972 | 8.9 | 8.6 | A | Sufficient effects of salt and alkali upon gelation |

As clearly shown in Tables 10 through 12, the cooked yield increases and the swelling rate improves in the poultry meat as the amount of alkali solution is increased, however, it is found that the rupture strength and Jelly strength are reduced, as shown in Experimental Examples 2-1, 2-2 and 2-3. Further, as the salt is increased, the cooked yield, rupture strength and Jelly strength tend to level off after having been improved to some extent, but the swelling rate increases. Further, it is found that the elasticity or tenderness increases as the alkali solution or salt is increased and moreover that the meat was rated as rating A by the folding test, as shown in Experimental Examples 2-2, 2-4, and 2-5). However, the taste becomes salty when the salt level reaches 5 grams, i.e. 1.6% by weight per meat, making it therefore ideal for dried food products and smoked meats. The rate of absorption of meat juice is also lowered, with a decrease in the quantity of salt, as shown in Experimental Examples 2-2 and 2-4.

When only the meat juice and salt were injected into the poultry meat, it was found that a damp or juicy state is produced along with a feeling of firmness or toughness. The processed meats are also so swollen and elastic as raw meat. This tendency can be increased as the alkali solution is increased. Further, this treatment can provide the meat with shines, i.e. reflecting juiciness on the meat surface, together with increased viscosity, and moreover with a feeling of tenderness. In addition, the fat portion shows the same trends as the meat portion, and the addition of the salt and alkali solution can provide brighter or clearer in color tone of the meat improving the color of the meat to a remarkable extent.

As clearly shown in Experimental Examples 2-2 and 2-3, extremely excellent results were obtained in the cooking test, with exceptional extraordinary improvements in outer appearance and texture, as compared with meats processed by conventional methods. After cooking, the fat portions in particular are converted into a gelatin form creating softness, i.e. tenderness, and water retention, i.e. juiciness. The present invention offers a special advantage over conventional methods that the meat processed by this invention does not become hard or tough and retains its tenderness, even after being stored in a freezer for several days.

It is further found that, when the quantity of the salt is reduced, the surface portion and the inner portion of the meat become whitened and the meat rapidly deteriorates emitting unpleasant raw odor or smell, even when left standing at room temperature. The meat must therefore have salt added to it in prescribed quantities depending on the freshness of the meat stock.

Experimental Example 2-6

The processes of Experimental Example 2-2 were carried out in substantially the same manner except for the addition of 5 grams of cooking wine as an alcohol, 167 mg of vitamin C, 25 mg of vitamin E, 7 mg of sugar to the salt solution.

It was found that the addition of vitamins C and E solution to the salt solution of Experimental Example 2-2 in a high concentration can achieve a remarkable improvement in meat color. Further, the addition of vitamin C and E solution also is remarkably effective in preventing discoloration during storing. Moreover, the taste of the meat was found to be improved when the alcohol is added. The product tests shows that the addition of the sugar can preservative performance of the meat. Even when the product was stored in a freezer for 10 days at −25° C., it was confirmed by the product tests that virtually no changes in the outer appearance, such as meat color, was found in the product.

EMBODIMENT 3

Domestic frozen pork tenderloin of 1,510 grams was naturally thawed over 18 hours and then cut into chunks of 300 grams each as test samples. The pH was 5.5 and the meat juice (drip) of 130 grams was obtained at a drip rate of 7.8%. Water was added to the drip to obtain a drip concentration of 50% yielding a drip liquid of 260 grams.

Experimental Examples 3-1 through 3-5

Figure 5:
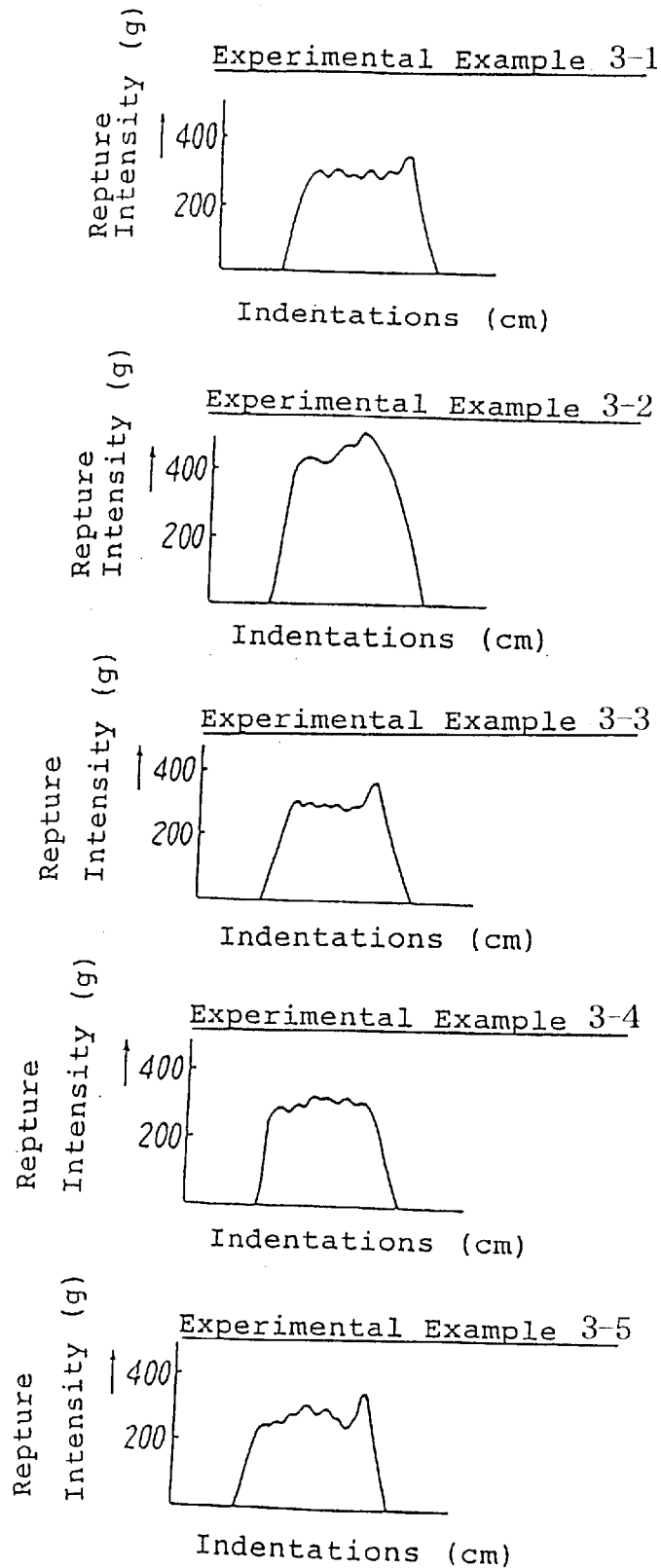
FIG. 5 is graphs showing the measurement of test samples of the embodiment with a rheometer.

The drip liquid was taken in 20 grams each for two test tubes and mixed in the proportions shown in Table 13 below, with one tube being added with sodium chloride and the other test tube being added with sodium bicarbonate, respectively, forming a salt solution and an alkali solution each in a high concentration. The samples were then tested and evaluated in substantially the same manner as in Experimental Example 1-1. The results are shown in Tables 14 through 16 below, and the results of the rheometer tests are shown in FIG. 5.

TABLE 13

Amounts of Additives

| Experimental Example No. | Drip (grams) | Salt (grams) | Alkali (grams) | Alcohol (grams) | Vitamins C (mg) | Vitamins E (mg) | Saccharide (grams) |
|---|---|---|---|---|---|---|---|
| 3-1 | 20 | 3 | 0.5 | 0 | 0 | 0 | 0 |
| 3-2 | 20 | 3 | 2 | 0 | 0 | 0 | 0 |
| 3-3 | 20 | 3 | 4 | 0 | 0 | 0 | 0 |
| 3-4 | 20 | 0.5 | 2 | 0 | 0 | 0 | 0 |
| 3-5 | 20 | 5 | 2 | 0 | 0 | 0 | 0 |

TABLE 14

Evaluations of Processed Pork Fillet

| Experimental Example No. | Absorption Rate of Additive Solution (%) | pH | Appearance (10 Ratings) Color Tone | Shine | Elasticity | Remarks |
|---|---|---|---|---|---|---|
| 3-1 | 99.1 | 6.3 | 6.8 | 6.1 | 7.2 | Meat had moderately lustrous surface and color. |
| 3-2 | 100.0 | 7.3 | 8.2 | 7.1 | 8.1 | Meat had improved and satisfactorily lustrous surface and color. |
| 3-3 | 100.0 | 8.1 | 8.9 | 8.1 | 7.9 | Meat had lustrous surface and bright color. |
| 3-4 | 98.2 | 7.3 | 6.9 | 7.4 | 7.1 | Meat color whitened and meat juice oozed away. |
| 3-5 | 100.0 | 7.2 | 8.1 | 8.9 | 8.9 | Meat had lustrous surface and color. |

TABLE 15

Evaluations of Processed Pork Fillet

| Experimental Example No. | Cooked Yield (%) | Expansion Rate (%) | Sensory Test Results (10 Ratings) Elasticity | Flavor | Folding Test Result | Remarks |
|---|---|---|---|---|---|---|
| 3-1 | 83.5 | 89.5 | 6.8 | 7.2 | B | Cooked meat had somewhat low elasticity. |
| 3-2 | 87.0 | 102.5 | 8.2 | 8.2 | B | No particular problems with cooked meat, with good taste. |

TABLE 15-continued

Evaluations of Processed Pork Fillet

| Experimental Example No. | Cooked Yield (%) | Expansion Rate (%) | Sensory Test Results (10 Ratings) | | Folding Test Result | Remarks |
| --- | --- | --- | --- | --- | --- | --- |
| | | | Elasticity | Flavor | | |
| 3-3 | 88.5 | 113.4 | 8.9 | 8.4 | A | Good juicy, with good taste, and well gelled. |
| 3-4 | 89.0 | 102.5 | 6.5 | 8.2 | C | Somewhat lacking in elasticity and gelation. |
| 3-5 | 88.5 | 109.5 | 8.4 | 9.1 | A | Excellence in elasticity, taste and gelation. |

TABLE 16

Evaluations of Processed Pork Fillet

| Experimental Example No. | Rheometer Test Results | | | Sensory Test Results (10 Ratings) | | Folding Test Result | Remarks |
| --- | --- | --- | --- | --- | --- | --- | --- |
| | Rupture Intensity (grams) | Depth Width (cm) | Jelly Intensity (g/cm) | Elasticity | Flavor | | |
| 3-1 | 460 | 3.9 | 1794 | 6.8 | 7.2 | B | Effects of salt and alkali recognized. |
| 3-2 | 483 | 2.8 | 1352 | 8.2 | 8.2 | B | Sufficient effects of salt and alkali upon gelation |
| 3-3 | 375 | 3.1 | 1162 | 8.9 | 8.4 | A | Sufficient effects of salt and alkali upon gelation |
| 3-4 | 315 | 3.1 | 977 | 6.5 | 8.2 | C | Some effects of alkali upon gelation recognized, but gelation insufficient. |
| 3-5 | 360 | 3.1 | 1116 | 8.4 | 9.1 | A | Effects of salt and alkali recognized. |

As clearly shown in Tables 14 through 16 above, when the quantities of the salt and the alkali in the drip liquid are low, the absorption of the additive is high at the initial stage, however, as shown in Table 14, the meat juice begins separating and oozing out from the meat, declining the rate of absorption of the additive after 30 minutes, as in Experimental Examples 3-1 and 3-4. It is found, however, that the addition of the alkali solution can improve the absorption rate of the additive to a remarkable extent, as in Experimental Examples 3-2, 3-3 and 3-5.

When the alkali solution is increased, the cooked yield and swelling (or expansion) improve but the rupture strength and Jelly strength decline. The coloration and organoleptic tests showed remarkable improvements in elasticity and taste, as in Experimental Examples 3-1 to 3-3.

The interrelation between the amount of the salt and the cooked yield was not found in these experiments, but data from the folding tests reveals that the gel strength improved as the salt level increased. However, it is found that an exceedingly high gel strength was obtained in the pork tenderloin by using 50% or less of the salt quantities as added upon preparing fish paste rolls from fish meat.

Comparative Example 3-1

For the cooking test, the pork tenderloin of Embodiment 3 was prepared with no additives as a conventional method.

When testing was performed under the same conditions as in Experimental Example 3-2, each test sample of Experimental Example 3-2 was found to have the cooked yields and swelling rates increasing by 20% to 30% higher than the meat prepared in Comparative Example 3-1. The sensory or organoleptic tests also received considerably higher ratings than those for the meat processed in Comparative Example 3-1.

Experimental Example 3-6

The processes of Experimental Example 3-2 were carried out in substantially the same manner except for the addition of 5 grams of cooking wine as an alcohol, 167 mg of vitamin C, 25 mg of vitamin E and 10 grams of sugar to the salt solution in a high concentration, and the sample was tested and evaluated by the methods identical to those of Experimental Example 3-2. The test results showed remarkable improvements in meat color with only slight changes over time from the effects of the addition of the vitamin C and E solutions as achieved by Experimental Example 3-2. The addition of the alcohol was also found to increase the quality of the shines and luster reflecting the juiciness on the surface of the meat. The addition of the saccharide was further found to improve the preservative ability, causing virtually no changes in the product tests and the outer appearance such as meat color, even after frozen in a freezer for 10 days at −25° C.

In the tests, the sugar was added to the pork in amounts larger by approximately 1% by weight than beef. As a result, it was found better to add the sugar larger for pork meat than for beef meat because the pork is more tender than the beef, although the amounts may vary depending on the portion of the meat and its freshness.

EMBODIMENT 4

Frozen mixed horse meat of 2,200 grams with fat content of approximately 30% was naturally thawed over 18 hours and cut into chunks of 300 grams each for use as test samples. The pH was 5.8 and meat juice of 109 grams was obtained as a meat juice drip at a rate of 4.7%. Water was added to the meat juice to a concentration of 25% yielding a meat juice drip of 436 grams.

Experimental Examples 4-1 to 4-5 & Comparative Example 4-1

Figure 6:
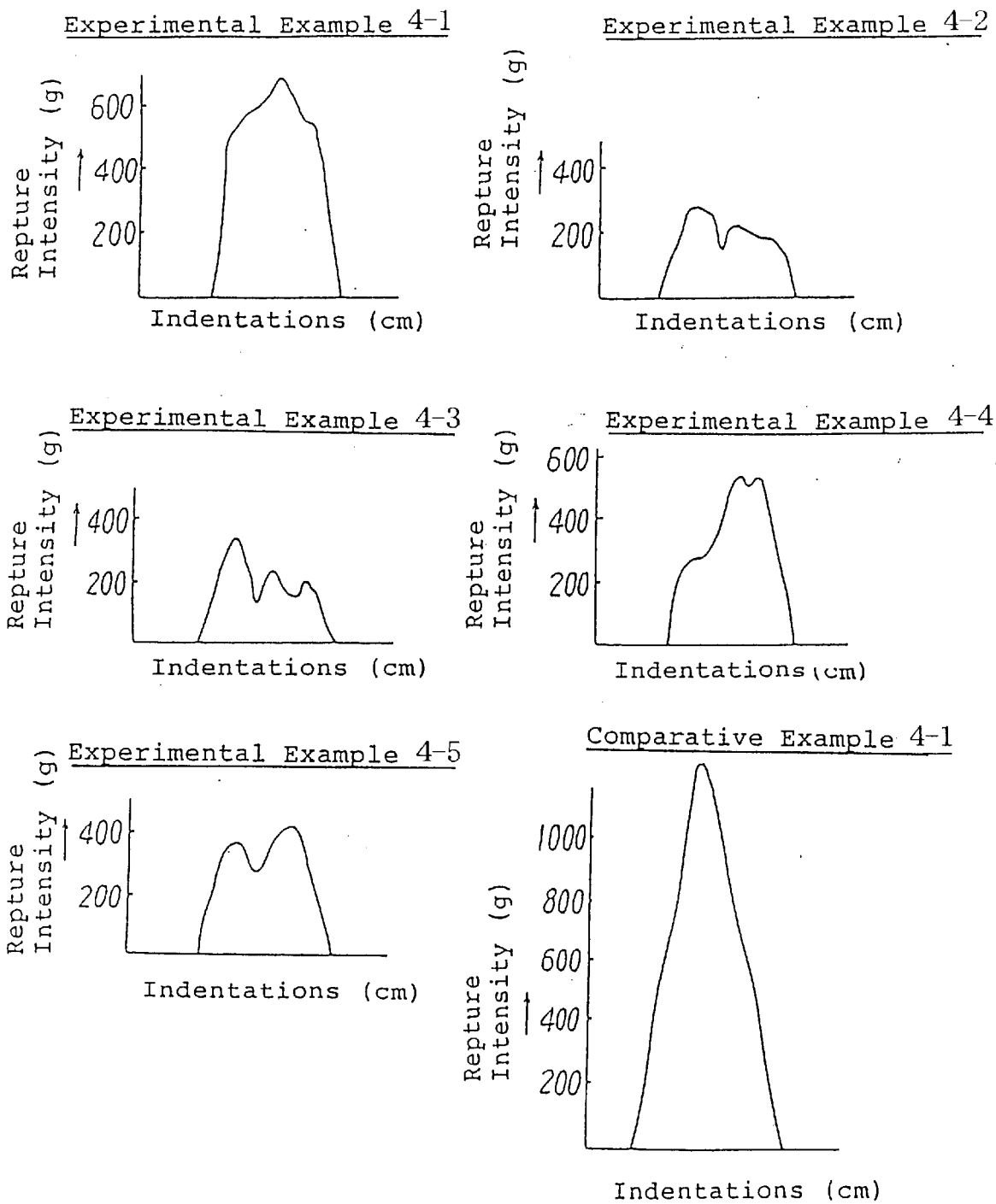
FIG. 6 is graphs showing the measurement of test samples of the embodiment and a comparative sample with a rheometer.

To two test tubes were added 20 grams each of the meat juice drip of Embodiment 4, and the meat juice drip was then mixed with the additives in the proportions as shown in Table 17 below, with one tube being added with sodium chloride and the other test tube being added with sodium bicarbonate yielding, respectively, a salt solution and an alkali solution in a high concentration. The samples were prepared, tested and evaluated in substantially the same manner as in Experimental Example 1-1. The test results are shown in Tables 18 through 20 below and the results of the rheometer tests are shown in FIG. 6.

TABLE 17

Amounts of Additives

| Experimental Example No. | Drip (grams) | Salt (grams) | Alkali (grams) | Alcohol (grams) | Vitamins C (mg) | Vitamins E (mg) | Saccharide (grams) |
|---|---|---|---|---|---|---|---|
| 4-1 | 10 | 3 | 0.5 | 0 | 0 | 0 | 0 |
| 4-2 | 10 | 3 | 2 | 0 | 0 | 0 | 0 |
| 4-3 | 10 | 3 | 4 | 0 | 0 | 0 | 0 |
| 4-4 | 10 | 0.5 | 2 | 0 | 0 | 0 | 0 |
| 4-5 | 10 | 5 | 2 | 0 | 0 | 0 | 0 |
| Comparative Example 4 | 10 | 0 | 0 | 0 | 0 | 0 | 0 |

TABLE 18

Evaluations of Processed Horse Meat

| Experimental Example No. | Absorption Rate of Additive Solution (%) | pH | Appearance (10 Ratings) Color Tone | Shine | Elasticity | Remarks |
|---|---|---|---|---|---|---|
| 4-1 | 85.7 | 6.5 | 6.4 | 6.9 | 7.1 | Poor in juiciness and elasticity; water come out upon cooking. |
| 4-2 | 95.0 | 7.4 | 7.1 | 7.2 | 8.2 | Good in juiciness and elasticity; no water come out upon cooking. |
| 4-3 | 96.4 | 8.3 | 8.1 | 8.7 | 7.9 | Good in juiciness and elasticity; no water come out upon cooking. |
| 4-4 | 74.2 | 7.4 | 7.1 | 7.1 | 6.8 | Poor in juiciness and elasticity; water come out upon cooking. |
| 4-5 | 92.8 | 7.4 | 7.8 | 8.2 | 9.1 | Good in juiciness and elasticity; no water come out upon cooking. |
| Comparative Example 4 | 57.1 | 5.8 | 5.9 | 6.1 | 5.2 | Poor in juiciness and elasticity; a lot of water come out upon cooking. |

TABLE 19

Evaluations of Processed Horse Meat

| Experimental Example No. | Cooked Yield (%) | Expansion Rate (%) | Sensory Test Results (10 Ratings) Elasticity | Flavor | Folding Test Result | Remarks |
|---|---|---|---|---|---|---|
| 4-1 | 78.0 | 89.1 | 6.8 | 6.5 | C | Crumbly, but soft texture felt upon chewing. |
| 4-2 | 90.0 | 103.2 | 8.2 | 8.6 | A | Cooked state good, pink color on the cut ends, with good taste. |
| 4-3 | 93.5 | 116.5 | 8.3 | 8.5 | A | Cooked state good, pale pink color on the cut ends, with soft texture. |
| 4-4 | 87.5 | 110.5 | 8.6 | 8.4 | B | Soft in cooked state, but elastic. |
| 4-5 | 91.0 | 115.9 | 8.9 | 8.0 | A | Cooked state good, pale pink color on the cut ends, with good taste. |
| Comparative Example 4 | 65.5 | 73.2 | 5.2 | 6.1 | D | Poor in juiciness and taste, and crumbly. |

TABLE 20

Evaluations of Processed Horse Meat

| Experimental Example | Rheometer Test Results | | | Sensory Test Results (10 Ratings) | | Folding Test | |
|---|---|---|---|---|---|---|---|
| | Rupture Intensity | Depth Width | Jelly Intensity | | | | |
| No. | (grams) | (cm) | (g/cm) | Elasticity | Flavor | Result | Remarks |
| 4-1 | 685 | 3.1 | 2123 | 6.8 | 6.5 | C | Some effects of salt shown, but high in strength. |
| 4-2 | 328 | 2.9 | 951 | 8.2 | 8.6 | A | Sufficient effects of salt and alkali upon gelation |
| 4-3 | 390 | 2.9 | 1131 | 8.3 | 8.5 | A | Sufficient effects of salt and alkali upon gelation |
| 4-4 | 450 | 2.7 | 1215 | 8.6 | 8.4 | B | Some effects of alkali upon gelation recognized, but gelation insufficient. |
| 4-5 | 420 | 3.2 | 1344 | 8.9 | 8.0 | A | Effects of salt and alkali recognized, but poor in taste. |
| Comparative Example 4 | 1290 | 2.9 | 3741 | 5.2 | 6.1 | D | High strength, but no gelation shown. |

From Tables 18 through 20 above, it is found that, as the quantity of the alkali solution increases, the rate of absorption of the additives, the cooked yield, and the swelling (expansion) improves remarkably as well as the sensory or organoleptic tests and the folding tests also provides extremely high ratings. Further, the rheometer tests show that the rupture strength and the Jelly strength are lowered, while the organoleptic tests show remarkably improved elasticity and flavor.

From the above test data, it is found that the addition of the salt solution shows tendencies almost identical to those obtained by the addition of the alkali solution.

It is also found from Experimental Example 4-1 that, when the quantity of the alkali solution is low, on the one hand, the shininess reflecting the juicy surface of the meat and the elasticity are caused to deteriorate and that large amounts of water and waxy materials are prone to flow out, causing emitting smoke upon cooking. It is further found from Experimental Examples 4-2 and 4-3 that, on the other hand, when the quantity of the alkali solution is too large, the pH of the meat climbs drastically and problems with the meat quality may be caused to occur. Therefore, this means that there is the upper limit of the pH value of meat. When the pH should be lowered, it can be lowering by the addition of lactic acid or the like. Moreover, the results of Experimental Examples 4-2 and 4-4 reveal that, as the quantity of the salt solution becomes smaller, the rate of absorption of the additives decreases along with a decrease in elasticity, i.e. tenderness, and in the shininess reflecting the juicy surface of meat. Further, the water contents and waxy materials are separating from meat and tending to come out from meat during cooking.

A comparison of this embodiment with Comparative Example 4-1 clearly shows that, when the solutions of the additives were injected as in Comparative Example 4-1, the water together with the meat juice were separated from meat reducing the rate of absorption of the additives to only 59% to 77% in 30 minutes after injection. As a result, the cooked yields were also reduced to only 70% to 84% with respect to that of this embodiment. Further, a rate of swelling (or expansion) was reduced to 63% to 82%. Therefore, in Comparative Example 4-1, large amounts of water and waxy substances flowed out and an extremely large amount of smoke was emitted during the cooking tests. The results of the sensory or organoleptic tests are also found to be very poor. On looking at the figure indicating the results of the rheometer tests, it is apparent that the processed meat prepared by Comparative Example 4-1 had a remarkably high rupture strength, with the peak sharpened. On comparing photographs taken with an optical microscope of the processed meats of Experimental Example 4-2 with Comparative Example 4-1, it is found that the photograph of Experimental Example 4-2 indicates the formation of a fine mesh-like structure of the meat tissues due to the solubilization of the sarcolemma, perimysium and other meat tissues, while the photograph of Comparative Example 4-1 does not indicate any formation of such fine net-like structure and any changes in the sarcolemma, perimysium and other meat tissues.

The sensory tests reveals that the meat processed by Comparative Example 4-1 provides a taste as if it was dry, i.e. having almost no juiciness, and it does not become pasty even when chewed for a long time, having a rough feel in the mouth and a poor texture. The meats processed in accordance with this embodiment, on the other hand, are so elastic and tender and they readily become in the form of a paste upon chewing, the meat juice coming out with an extremely delicious flavor and with a good eating feeling and texture.

On looking at the data from the rheometer tests, it is found that Comparative Example 4-1 without containing the salt and alkali indicates a sharp pointed peak due to its high rupture strength while the peak becomes obtuse in the case where the salt was added, and the peak portion becomes uneven in the case where the alkali was added, thereby reducing the rupture strength in each case. Further, it is apparent that the experimental examples are low in rupture strength and have their peaks flattened as a whole and made uneven forming multiple convex and concave portions. It may be thought that such unevenness contributes to elasticity for the meat texture and also give a pleasant taste in the mouth.

As fat portions are also blended in the mixed horse meats used in this embodiment, a clear correlation of the quantities of the salt and alkali solutions with the mixed horse meats could not be recognized due to the influence of the fat portions mixed therewith upon the mixed horse meats, These trends are found quite similar to those obtained with poultry meats and the other meats.

Experimental Example 4-6

The mixed horse meats were processed in substantially the same manner as in Experimental Example 4-2 except for adding 5 grams of cooking wine as an alcohol, 167 mg of vitamin C solution, 25 mg of vitamin E solution and 7 grams of sugar to the salt solution. The processed meat was then tested and evaluated in the same manner as in Experimental Example 4-2. As a result, it is found that the color of the processed meat is improved compared to Experimental Example 4-2 due to the addition of the vitamin C and E solutions, alcohol and sugar. In addition, the shines and luster reflecting the juicy surface of the processed meat and the preservative ability are also found to be improved.

It is particularly noted that the color of the meat and the fat portions is remarkably improved by the addition of the vitamin C and E solutions. Another result is obtained by the addition of the vitamin C and E solutions for preventing discoloration of the meat while preserved. The addition of the alcohol may further improve the overall flavor. Moreover, the addition of the sugar may improve the preservative or storing ability of the meat and virtually no changes are found in the product tests and in the outer appearance such as meat color even after being stored in a freezer for 10 days at −25° C.

EMBODIMENT 5

Frozen Australian mixed mutton consisting of 2,300 grams was naturally thawed over 18 hours and then cut into chunks of 300 grams each as test samples. The pH was 5.9 and meat juice drip of 176 grams was obtained at a rate of 7.1%. To the meat juice was added water to obtain a drip concentration of 47.5% yielding a meat juice drip of 370 grams.

Experimental Examples 5-1 to 5-5 & Comparative Example 5-1

Figure 7:
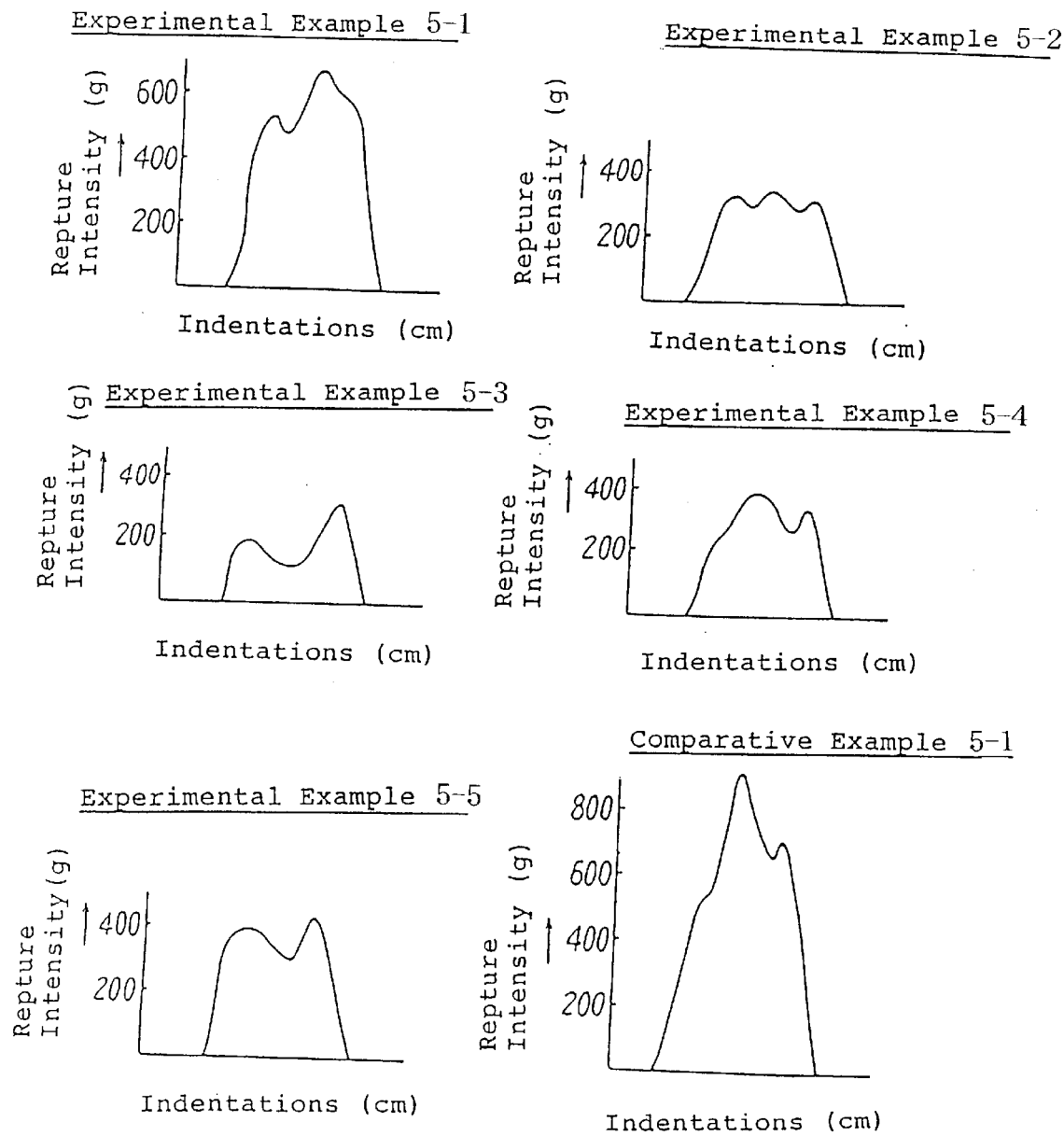
FIG. 7 is graphs showing the measurement of test samples of the embodiment and a comparative sample with a rheometer.

To two test tubes were added 20 grams each of the meat juice drip of Embodiment 4, and the meat juice drip was then mixed with the additives in the proportions as shown in Table 21 below, with one tube being added with sodium chloride and the other test tube being added with sodium bicarbonate yielding, respectively, a salt solution and an alkali solution in a high concentration. The samples were prepared, tested and evaluated in substantially the same manner as in Experimental Example 1-1. The test results are shown in Tables 22 through 24 below and the results of the rheometer tests are shown in FIG. 7.

TABLE 21

| Experimental Example No. | Amounts of Additives | | | | | | |
|---|---|---|---|---|---|---|---|
| | Drip (grams) | Salt (grams) | Alkali (grams) | Alcohol (grams) | Vitamins C (mg) | Vitamins E (mg) | Saccharide (grams) |
| 5-1 | 19 | 3 | 0.5 | 0 | 0 | 0 | 0 |
| 5-2 | 19 | 3 | 2 | 0 | 0 | 0 | 0 |
| 5-3 | 19 | 3 | 4 | 0 | 0 | 0 | 0 |
| 5-4 | 19 | 0.5 | 2 | 0 | 0 | 0 | 0 |
| 5-5 | 19 | 5 | 2 | 0 | 0 | 0 | 0 |
| Comparative Example 5 | 19 | 0 | 0 | 0 | 0 | 0 | 0 |

TABLE 22

| | | Evaluations of Processed Mutton Meat | | | | |
|---|---|---|---|---|---|---|
| Experimental Example No. | Absorption Rate of Additive Solution (%) | pH | Appearance (10 Ratings) | | Elasticity | Remarks |
| | | | Color Tone | Shine (Juiciness) | | |
| 5-1 | 83.5 | 6.4 | 7.1 | 6.2 | 7.1 | A lot of water come out upon cooking; sticky and odorous. |
| 5-2 | 95.5 | 7.3 | 8.2 | 7.8 | 8.3 | High in elasticity; little water come out upon cooking. |
| 5-3 | 98.3 | 8.2 | 8.1 | 8.2 | 7.9 | Viscous. |
| 5-4 | 82.9 | 7.3 | 7.2 | 7.3 | 6.9 | Low in juiciness and elasticity; Low degree of gelation. |
| 5-5 | 99.3 | 7.4 | 5.9 | 8.2 | 8.9 | No water come out upon cooking; in gelled and emulsified state. |
| Comparative Example 5 | 62.0 | 5.8 | 6.2 | 6.1 | 5.2 | No juiciness and elasticity; a lot of water come out upon cooking. |

TABLE 23

Evaluations of Processed Mutton Meat

| Experimental Example No. | Cooked Yield (%) | Expansion Rate (%) | Sensory Test Results (10 Ratings) | | Folding Test Result | Remarks |
| --- | --- | --- | --- | --- | --- | --- |
| | | | Elasticity | Flavor | | |
| 5-1 | 75.0 | 87.5 | 6.8 | 6.2 | C | No elasticity. |
| 5-2 | 89.0 | 100.3 | 8.9 | 8.1 | B | Elastic and a plenty of meat juice. |
| 5-3 | 89.0 | 110.8 | 8.1 | 8.6 | A | Highest in elasticity and juiciness, with soft texture. |
| 5-4 | 83.0 | 98.5 | 8.2 | 7.1 | B | Meat color somewhat whitened on the cut ends; good in juiciness. |
| 5-5 | 85.0 | 105.8 | 8.1 | 8.0 | C | Elastic and juicy. |
| Comparative Example 5 | 68.0 | 68.4 | 5.2 | 5.9 | D | Crumbly, and cooked mutton meat reduced in size as a whole. |

TABLE 24

Evaluations of Processed Mutton Meat

| Experimental Example No. | Rheometer Test Results | | | Sensory Test Results (10 Ratings) | | Folding Test Result | Remarks |
| --- | --- | --- | --- | --- | --- | --- | --- |
| | Rupture Intensity (grams) | Depth Width (cm) | Jelly Intensity (g/cm) | Elasticity | Flavor | | |
| 5-1 | 660 | 3.3 | 2178 | 6.8 | 6.2 | C | Some effects of salt shown, but high in strength. |
| 5-2 | 345 | 3.1 | 1070 | 8.9 | 8.1 | B | Sufficient effects of salt and alkali upon gelation |
| 5-3 | 426 | 3.2 | 1363 | 8.1 | 8.6 | A | Sufficient effects of salt and alkali upon gelation |
| 5-4 | 460 | 2.8 | 1288 | 8.2 | 7.1 | B | Some effects of alkali upon gelation, but gelation somewhat insufficient. |
| 5-5 | 405 | 2.4 | 972 | 8.1 | 8.0 | C | Effects of salt and alkali recognized, but poor in taste. |
| Comparative Example 5 | 860 | 2.4 | 2064 | 4.2 | 5.9 | D | High in strength and crumbly. |

As clearly shown in Tables 22 through 24 above, it is found that the addition of the alkali solution not only improves the rate of absorption of the additives but also remarkably improves the swelling rate. The cooked yield also is improved, but tends to level off when 2 grams of sodium bicarbonate are used, i.e. at the rate of 0.66% by weight per meat. The effects of the sodium chloride are also evaluated and it can generally show the same results as in the case of the alkali solution. It is also found that when the quantity of the alkali solution is low, elasticity becomes insufficient and the rupture strength becomes higher. Further, it is found in Experimental Examples 5-1 and 5-2 that meat juice tends to come out in large quantities during grilling than when the alkali is added at larger rate. The test results demonstrate that the odor or small were lower, as compared with Comparative Example 5-1, but the odor or smell of mutton still remained. When the amount of the salt is decreased, the cooked yield tends to decrease. Although it is further recognized that the comparative samples decrease the cooked yield and the swelling rate as well as the shines reflecting the extent of juiciness on the meat surface and the elasticity, as compared to Embodiments 1 through 3, this is thought because the fat portions are mixed.

On comparing Comparative Example 5-1 with this embodiment, it is found that a rate of absorption of the additives was as high as 134% to 160% due to the complementary effects of the alkali solution and the salt solution. As a result, the cooked yield was increased to 110% to 131% and the swelling rate (expansion) to 141% to 162%. The sensory tests also provided extremely high ratings.

The Comparative Example 5-1 had a Jelly strength and a rupture strength higher than 200% when compared with Experimental Examples of this embodiment. However, the organoleptic tests showed that the processed meat prepared by Comparative Example 5-1 tasted as if it would be dry, i.e. having almost no juiciness, and it did not readily become pasty even if chewed for a long time, providing a rough feel in the mouth and a poor texture. The processed meats prepared by this embodiment, on the other hand, were elastic, i.e. tender, and juicy as well as produced a sufficient amount of meat juice during chewing, readily forming meat into a paste and providing a very delicious taste and flavor with a fine texture.

On looking at the data from the rheometer tests, it is found that Comparative Example 5-1 without containing the salt and alkali indicates a sharp pointed peak due to its high rupture strength, while the peak becomes obtuse in the case where the salt was added and the peak portion becomes uneven in the case where the alkali was added, thereby reducing the rupture strength in each case. On the other hand, it is apparent that Experimental Examples are low in rupture strength and have their peaks flattened as a whole and made uneven forming multiple convex and concave portions. It may be thought that such unevenness contributes to elasticity for the meat texture and also gives a pleasant taste in the mouth.

Experimental Example 5-6

The mixed mutton meats were processed in substantially the same manner as in Experimental Example 5-2 except for adding 5 grams of cooking wine as an alcohol, 167 mg of vitamin C solution, 25 mg of vitamin E solution and 7 grams of sugar to the salt solution. The processed mutton meat was then tested and evaluated in the same manner as in Experimental Example 5-2. As a result, it is found that the color of the processed meat was improved to a remarkable extent, as compared to Experimental Example 5-2 due to the addition of the vitamin C and E solutions, alcohol and sugar. In addition, the shines and luster achieved by the juicy surface of the processed meat and the preservative ability were also found to be improved. Moreover, the addition of the sugar improved the preservative ability of the meat and virtually no changes were found in the product tests and in the outer appearance such as meat color even after being stored in a freezer for 10 days at −25° C.

EMBODIMENT 6

As raw material meats, the following samples have been prepared.
Sample 1: Beef Steaks (1" thick), Boneless Strip Loin, USDA Select Grade
Sample 2: Beef Steaks (1" thick), Boneless Strip Loin, USDA Choice Grade
Sample 3: Beef Patties, Beef Trimmings (Fat<10%)
Sample 4: Beef Chunks (1–2 oz), Bottom Round, USDA Select Grade
Sample 5: Chicken Breasts, Whole, Boneless, Skinless
Sample 6: Pork Chop (1" thick), Boneless Pork Loin, ¼" Fat Trim
Sample 7: Turkey Chunks (1–2 oz), Breast
Sample 8: Chicken Chunks (1–2 oz), Breast In addition, a high salt concentration solution, specifically an aqueous solution of 25 percent by weight of sodium chloride, was prepared. Also, a high alkali concentration solution, specifically an aqueous solution of 8 percent by weight of sodium bicarbonate was prepared.

The experiment was carried out such that at first, each of the meats of sample Nos. 1, 2 and 6 was divided into two sample groups. One group was processed in such a way that an amount of aqueous solution of sodium chloride and an amount of aqueous solution of sodium bicarbonate were injected to obtain the dry weight indicated in Table 25 below. The product was then tumbled for 15 minutes under a condition of 0.2 atmospheric pressure. The beef and pork loins were cut into one-inch thick portions, wrapped and frozen at −30° C. Comparable meat samples were used as controls which were processed in the same manner as that of the treated sample, except that neither the sodium chloride solution nor the sodium bicarbonate solution was added.

The meat of sample No. 3 was processed by grinding through a ⅜ inch plate and then further ground through a ¼ inch plate. The meat was then divided into two sample groups. One sample group was put into a vacuum mixer, an aqueous solution of sodium chloride and an aqueous solution of sodium bicarbonate were added into the mixer to obtain the dry weight indicated in Table 25, and then tumbled 30 seconds so the liquid would be absorbed into the sample. For seasoning purposes, granulated sodium chloride and pepper were added to the control sample in such a manner that sodium chloride showed 0.5 percent dry weight in respect to the meat weight and then tumbled in the mixer for 30 seconds. Subsequently, both sample groups were formed into patties and frozen at −30° C.

The meat of sample Nos. 4, 5, 7 and 8 was divided into two sample groups. One sample group was mixed with an aqueous solution of sodium chloride and an aqueous solution of sodium bicarbonate, which was added to the meat in a vacuum tumbler. The sample was then tumbled for 15 minutes in such a manner that the dry weights indicated in Table 25 was obtained. After this operation, the meat was wrapped and frozen at −30° C. The other sample group was a control and processed in the same manner except that neither the sodium chloride solution nor the sodium bicarbonate solution was added.

TABLE 25

| Sample No. | Kind of Meats | Salt* | Alkali** | Final Internal Cook Temp. (° F.) | Method of Cooking |
|---|---|---|---|---|---|
| 1 | Beef Steaks, Boneless Strip Loin, USDA Select Grade | 0.66 | 0.46 | 150 | Broiler |
| 2 | Beef Steaks, Boneless Strip Loin, USDA Choice Grade | 0.66 | 0.46 | 150 | Broiler |
| 3 | Beef Patties Beef Trimmings | 0.50 | 0.33 | 160 | Grill |
| 4 | Beef Chunks Bottom Round USDA Select Grade | 0.66 | 0.46 | 165 | Boiling water |
| 5 | Chicken Breast Whole, Boneless, Skinless | 0.75 | 0.40 | 165 | Grill |
| 6 | Pork Chop Boneless Pork Loin | 0.66 | 0.46 | 160 | Broiler |
| 7 | Turkey Chunks Breast | 0.50 | 0.40 | 165 | Boiling water |
| 8 | Chicken Chunks Breast | 0.75 | 0.40 | 165 | Boiling water |

*: Dry weight in grams of sodium chloride per 100 gram of meat.
**: Dry weight in grams of sodium bicarbonate per 100 gram of meat.

Each of the processed test and control samples were then evaluated in reference to the following items. The results are indicated in Table 26 and Table 27.

TABLE 26

| | Sample No. 1 | | Sample No. 2 | | Sample No. 3 | | Sample No. 4 | |
|---|---|---|---|---|---|---|---|---|
| | Control | Treated | Control | Treated | Control | Treated | Control | Treated |
| Cooked Yield | 75.6% | 75.5% | 71.8% | 77.1% | 67.9% | 74.3% | 62.4% | 71.1% |
| Drip Loss | 2.1% | 1.5% | 1.1% | 1.3% | 1.2% | 0.5% | 3.2% | 0.4% |
| pH | 5.7 | 5.9 | 5.6 | 5.9 | 5.7 | 6.2 | 5.8 | 5.7 |

TABLE 26-continued

|  | Sample No. 1 | | Sample No. 2 | | Sample No. 3 | | Sample No. 4 | |
| --- | --- | --- | --- | --- | --- | --- | --- | --- |
|  | Control | Treated | Control | Treated | Control | Treated | Control | Treated |
| Shear (kg) | 1.6 | 1.4 | 2.0 | 1.9 | 155.3 | 120.0 | 6.0 | 4.4 |
| Tenderness* | 6.5 | 7.0 | 6.4 | 6.7 | 5.4 | 6.6 | 2.5 | 4.4 |
| Juiciness* | 5.6 | 6.6 | 6.2 | 5.8 | 5.0 | 6.4 | 2.9 | 4.5 |
| *Flavor | 6.0 | 7.2 | 6.0 | 6.2 | 4.8 | 5.7 | 3.6 | 5.2 |
| Overall Acceptability* | 6.0 | 6.9 | 6.1 | 6.2 | 4.9 | 6.0 | 3.1 | 4.6 |

*: Subjective consumer evaluations using a scale of 1–9 with 1 being the least desirable and 9 being most desirable.

TABLE 27

|  | Sample No. 5 | | Sample No. 6 | | Sample No. 7 | | Sample No. 8 | |
| --- | --- | --- | --- | --- | --- | --- | --- | --- |
|  | Control | Treated | Control | Treated | Control | Treated | Control | Treated |
| Cooked Yield | 75.4% | 85.7% | 63.9% | 71.1% | 75.3% | 88.6% | 70.9% | 88.2% |
| Drip Loss | 3.7% | 0.5% | 0.9% | 0.4% | 1.4% | 1.0% | 3.7% | 1.2% |
| pH | 5.9 | 6.4 | 5.7 | 6.0 | 6.2 | 6.5 | 6.1 | 6.5 |
| Shear (kg) | 1.4 | 0.6 | 2.2 | 1.9 | — | — | — | — |
| Tenderness* | 6.7 | 7.7 | 5.7 | 6.1 | 7.1 | 7.2 | 6.9 | 7.4 |
| Juiciness* | 5.4 | 6.9 | 4.5 | 5.5 | 6.0 | 6.9 | 5.0 | 6.7 |
| *Flavor | 5.2 | 7.1 | 5.6 | 6.5 | 5.9 | 6.3 | 5.0 | 6.5 |
| Overall Acceptability* | 5.6 | 7.2 | 5.2 | 6.1 | 6.1 | 6.5 | 5.2 | 6.7 |

*: Subjective consumer evaluations using a scale of 1–9 With 1 being the least desirable and 9 being the most desirable.

Definition of evaluation items:
1. Cooked Yield: The difference in the weight of the sample after thawing and after cooking.
2. Drip Loss: The difference between the weight of the sample before freezing and after thawing.
3. pH: pH was measured after the sample was cooked and cooled to room temperature.
4. Shear: Measured relative tenderness by using the Instron-W Warner Bratlzer shear test in kilograms. Sample No. 2 was measured by the Instron-Kramer Shear test.
5. Taste Panel: Panelists consisted of 50 consumers selected at random who evaluated the meat samples on a scale of 1 to 9, with 1 being the least desirable and 9 being the most desirable, for the following subjective factors:
   a. tenderness
   b. juiciness
   c. flavor
   d. overall evaluation As a result, it has been found that by limiting salt concentrations to less than 1.5 percent of dry weight of treated product, the natural taste, flavor and eating quality of the product are enhanced. Further, it has been found that when salt concentrations exceed 2.0 percent of dry weight of treated product, the effects of the invention are more pronounced, but at the same time, from a sensory perspective, the treated product has a tendency towards a salty taste. Additionally, it has been found preferable to maintain an alkali range of from 0.1 part to 1.5 parts by dry weight and preferably from 0.1 part to 1.0 part by dry weight of treated product, although the alkali range may vary with the kinds of the meat and other conditions. It has been found that when alkali concentrations surpass 1.5 percent of dry weight of treated product, the effects of the invention are more pronounced, but the natural taste, flavor and eating quality of the treated product tend to decrease.

From the above it may be seen that product treated with this embodiment of the invention maintains its original flavor and, further, that the preferable range of sodium chloride is 0.2 percent to 1.5 percent of dry weight of treated product and that the preferable range for sodium bicarbonate is 0.1 to 1.0 percent of dry weight of treated product. Further, it has been found that sodium bicarbonate is the most desirable alkali, although sodium carbonate may also be used as a substitute.

With respect to the treatment process, the current embodiment of the invention is the preferred process because it is quicker and simpler. The effects of the invention are obtained by mixing together concentrated solutions of sodium chloride (a 25 percent solution) and sodium bicarbonate (an 8 percent solution), injecting (and/or surface application) such solution, and tumbling in a vacuum mixer. The uniqueness of the current embodiment of the invention lies in the amount of the specific mixtures applied and in the fact that the solutions saturated and combined at the point of use. Therefore, the present embodiment represents a practical, simple and effective production method.

Also as may be seen in Tables 26 and 27, the present embodiment obtains quality improvements in treated product even when using small quantities of the treatment solution in proportion to the dry weight of product being treated. These improvements are seen in increased yield, decreased purge (drip), increased tenderness, increased juiciness, improved flavor and increased overall acceptability. On the basis of the data presented in Tables 26 and 27, the following claims are made:

1. Meat processed according to this embodiment has a higher yield improvement, which was superior to the "Control" sample, as clearly shown in Tables 26 and 27.

2. Meat processed according to this embodiment has a decreased drip, which was superior to the "Control" sample, as clearly shown in Tables 26 and 27.
3. Meat processed according to this embodiment has improved tenderness, which was superior to the "Control" sample, as clearly shown in Tables 26 and 27.
4. Meat processed according to this embodiment has improved juiciness, which was superior to the "Control" sample, as clearly shown in Tables 26 and 27.
5. Meat processed according to this embodiment has an improved flavor, which was superior to the "Control" sample, as clearly shown in Tables 26 and 27.
6. Meat processed according to this embodiment has an improved overall taste, which was superior to the "Control" sample, as clearly shown in Tables 26 and 27.
7. Beef Steaks, USDA Select Grade, processed according to this embodiment had higher sensory ratings, then untreated USDA choice Beef. This treatment had the effect of improving the quality grade of the meat by one USDA Grade.

EMBODIMENT 7

Australian beef was used as a meat sample, which was 300 grams of refrigerated inside chuck roll with outer layer fat portions having a 1 to 2 cm thickness. The meat juice drip of Embodiment 1 was utilized with sodium chloride being used as the salt and sodium bicarbonate as the alkali. These additives were dissolved into the meat juice drip and then injected into the meat which was subjected to product evaluations in the same manner as in Experimental Example 1-1.

As a result, the fat processed in this manner was poorer in a rate of absorption of the additives than the muscle portions thereof, while the luster reflecting the extent of juiciness on the meat surface increased. It is further found that, in the cooking tests, the materials dissolved out by heating are mixed with the fat materials dissolved out into a paste form, thereby producing a soft, i.e. tender, and tasteful fat portions that could not been produced so far by conventional methods.

This is due to the injection of the salt and the alkali that meat tissues such as collagen, gelatin, blood materials and fibrous proteins are mutually interacted with the salt and the alkali, thereby solubilizing these tissues and intertwining them with the fibrous meat proteins. Further, the vibration treatment promotes these actions as a whole, thereby causing the tissues in the fat portions to form a fine mesh-like structure and gelling the proteins of the meat.

EMBODIMENTS 8 & 9

Round portions of frozen Australian beef used in Embodiment 1 was injected with a solution of each of the salt solution and the alkali solution, to each of which 20 grams of the meat juice drip were added. In these Embodiments, sodium chloride is used as the salt with 0.5 gram (0.17% by weight per meat) of bonito extract added (in Embodiment 8) or 0.75 gram (0.25% by weight per meat) of tangle (konbu) extract added (in Embodiment 9), in substantially the same manner as in Experimental Example 1-1. The sample meats were tested and evaluated in the same manner as in Experimental Example 1-1.

The test results showed virtually no changes from Experimental Example 1-1 in the outer appearance and the rate of absorption of the additives of the processed meat. In the product evaluation tests, a slight improvement was seen in the cooked yield and the swelling rate, but almost no changes was found in the folding and rheometer tests. However, in the sensory tests, all the test panels accepted that the cooked beef provided an extremely fine flavor and a delicious taste that were unmatched with cooked beef obtained by conventional methods.

Thus, it is found from the foregoing that by dissolving various condiments in the additive solution, the condiments in the meat are combined with the meat taste to produce meats of a completely original taste. In contrast to conventional methods, the present invention allows the salt and the alkali to come into harmony with the meat, attracting a delicious taste from the meats, thoroughly different from the meats processed in the manner as by the conventional methods, e.g. simply by sprinkling seasonings onto the meat surface or cooking therewith. The meats so processed can present the advantage that they can be cooked in accordance with usage.

Next, based on this knowledge, adaptability of those processed meats to each type of foodstuff was evaluated. The evaluations are carried out for the meat products prepared by the methods according to the present invention as test samples and for the meats prepared by the conventional methods as control samples by ten panelists on the basis of the sensory tests, i.e. organoleptic tests, and the visual tests for the appearance of the processed meats. The results obtained by these tests are found acceptable and satisfactory.

EMBODIMENT 10

A block of a frozen loin of beef was thawed in a thawing device while controlling the temperature between 2 and 5° C. The meat juice obtained during thawing was used for dissolving the alkali and the salt.

The thawed beef of 9,000 grams was injected in a reticulated way or in a network pattern with 450 cc of an aqueous solution of sodium chloride, with meat juice added thereto so as to reach a salt concentration of 4.3 mole. To the aqueous-salt solution were added 150 cc of mirin, 15 grams of a condiment (Trade name: AMIRICH GCR), 180 grams of powdered sorbitol, and a 15 gram of a mixture of vitamin C with E. After the injection treatment, the meat was then subjected to vibration treatment for 5 minutes with an electric massage machine to promote the action of the salt to solubilize the meat tissues of the meat.

Then, a solution was prepared by mixing 150 cc of Japanese rice wine (sake) as an alcohol with 420 cc of a solution of sodium bicarbonate in a 2.0 mole concentration and the resulting solution was injected into the meat in a net-like pattern, followed by vibration with an electric massage machine for 10 minutes to promote gelling and aging the meat, together with furthering the action of the salt added.

Thereafter, a solution was prepared by dissolving 15 grams of Amirich GCR as seasoning and 360 grams of sorbitol powder, and 15 grams of a mixture of vitamin C and E in 150 cc of mirin and 150 cc of Japanese rice wine (sake), and the resulting solution was injected in a reticulated way into the meat, followed by vibration with an electric massage machine for 5 minutes to allow a uniform distribution of the additives and to cause aging the meat, together with furthering the action of the salt added.

The processed beef was cut into slices, each 10 mm thick and 200 grams in weight, and then wrapped as test samples for testing chilled meat products for cooking by heating. The similarly cut meat slices were quickly frozen and then vacuum packed as test samples for testing frozen and processed meat products.

On the other hand, test samples were prepared by grilling each the upper and rear surfaces of the cut meat slices at 180° C. with a grilling device for 6 minutes, followed by cooking and wrapping for testing as meat products to be cooked by heating. The likewise cooked meat samples were further placed in an airtight container and sterilized by heating under elevated pressure yielding test samples for retort meat products.

The chilled meat products, the frozen meat products and the frozen grilled meat products were thawed after storage for 2 weeks in a freezer or a refrigerator, while the retort meat products were allowed to stand for 4 weeks at room temperature. Thereafter, the meat products were tested and evaluated by the sensory or organoleptic tests and by the appearance evaluation tests. As a result, all the panelists for the sensory tests accepted all the processed meat products produced in this embodiment as satisfactory.

EMBODIMENT 11

A block of a frozen loin of beef was thawed in a thawing device while controlling the temperature between 2 and 5° C. The meat juice obtained during thawing was used for dissolving the alkali and the salt.

The thawed beef of 9,000 grams was injected in a reticulated way with 450 cc of an aqueous solution of sodium chloride in a concentration as high as 4.3 mole, with meat juice added thereto. After the injection treatment, the meat was then subjected to vibration treatment for 5 minutes with an electric massage machine to promote the action of the salt to solubilize the tissues of the meat.

Then, a solution was prepared by mixing 150 cc of Japanese rice wine (sake) as an alcohol with 420 cc of an aqueous solution of sodium bicarbonate in a 1.0 mole concentration with meat juice added thereto, and the resulting solution was injected into the meat in a net-like pattern, followed by vibration with an electric massage machine for 10 minutes to promote gelling and aging the meat, while promoting the action of the salt.

Thereafter, a solution was prepared by dissolving 15 grams of Amirich GCR as seasoning and 360 grams of sorbitol powder, and 15 grams of a mixture of vitamin C with vitamin E in 150 cc of mirin and 150 cc of Japanese rice wine (sake), and the resulting solution was injected in a reticulated way into the meat, followed by vibration with an electric massage machine for 5 minutes to allow a uniform distribution of the additives and the seasonings and to cause aging.

The processed beef was then cut into slices, each 10 mm thick and 200 grams in weight, and then wrapped as test samples for testing chilled meat products for cooking by heating. The similarly cut meat slices were quickly frozen and then vacuum packed as test samples for testing frozen and processed meat products.

On the other hand, test samples were prepared by grilling each the upper and rear surfaces of the cut meat slices at 180° C. with a grilling device for 6 minutes, followed by cooking and wrapping for testing as meat products to be cooked by heating. The likewise cooked meat samples were further placed in an airtight container and sterilized by heating under elevated pressure yielding test samples for retort meat products.

The chilled meat products, the frozen meat products and the grilled meat products were thawed after storage for 2 weeks in a freezer or a refrigerator, while the retort meat products were allowed to stand for 4 weeks at room temperature. Thereafter, the meat products were tested and evaluated by the sensory or organoleptic tests and by the appearance evaluation tests.

From the results of the tests carried out in Embodiments 10 and 11 above, it is found that the present invention could solve the problems and defects that are otherwise are caused to occur in frozen meat products using meats processed by the conventional methods, which involve, for example, oozing meat juice out from the meat as purge (drip) upon thawing, softening and weakening the meat tissues, smelling from meat itself, rapidly deteriorating in the meat color, hardening the meat, and deteriorating in taste accompanied with non-aging.

More specifically, the present invention can transform the meat quality at a cellular level by converting the meat tissues into a fine mesh-like structure by the biochemical reaction at a cellular level, thereby allowing tasteful substances to be attracted from the meat and the resulting processed meat to be cooked with a wide variety of condiments and savored with great relish.

These processed meats may be distributed in a chilled, frozen or lyophilized state or in any other appropriate way. Further, they can be used for various purposes after having been thawed. It can be further noted that the methods as described hereinabove can be applied to different meats and different portions of the meats and that the meats so processed can be cooked with various condiments, thereby adding different flavor and taste to the meat products in a harmonized fashion. The processed meats according to the present invention are appropriate for a variety of uses by slicing or dividing it so as to be adapted to the intended use. In other words, each portion of the processed meats according to the present invention can be cut for the following uses:

1. Steaks: Loin steaks, tenderloin steaks, round steaks, steaks cut into small pieces, cut roast steak, tongue steak, roasted beef, beef cutlets, and so on;
2. Grilled meats: loin, rib, tongue, round, inner organs, and so on;
3. Sliced meats: sukiyaki, boiling in a pot, a pan, etc., "shabu-shabu", and so on;
4. Boiled meats: beef curry rice, beef stew, meat cooked with potatoes or with vegetables,and so on.

EMBODIMENT 12

Chilled block round beef of 6,000 grams, which looked somewhat denatured in meat color due to some decrease in freshness, was injected in a reticulated way with 300 cc of a solution of sodium chloride for cooking use in a 4.3 mole concentration, followed by vibration with an electric massage machine for 5 minutes to promote the action of the salt of solubilizing the meat tissues of meat.

To the processed block round meat was injected in a

To the processed block round meat was injected in a reticulated way 280 cc of an alkali solution with sodium bicarbonate in a concentration as high as 1.0 mole, followed by vibration with an electric massage machine for 5 minutes to further the action of the salt as well as to promote aging by gelling.

To the processed block round meat was then injected in a network pattern a solution of 10 grams of seasoning (trade name: AJINOMOTO), 240 grams of sucrose, and 10 grams of a mixture of vitamin C and E in 100 cc of mirin and 100 cc of Japanese rice wine (sake), followed by vibration with an electric massage machine for 5 minutes to allow a uniform distribution of the additives, while promoting the action of the salt of solubilizing the meat tissues of meat as well as furthering the aging of the meat by gelation of the meat tissues of the meat.

Cooking Example 12-1

The beef round block obtained in Embodiment 12 was cut along the fiber bundle into meat chunks, 70 mm wide by 300 mm long by 70 mm thick, and then roasted on each of the four sides for 1 minute at 160° C. using a hot roasting plate. Seasoning can be added as requested. The meat was then roasted in an oven for 60 minutes at 60° C. to produce a roasted beef. The roasted beef was refrigerated and packed as a cooked food product.

Cooking Example 12-2

The beef round block obtained in Embodiment 12 was cut into steaks having a thickness of 8 mm and weighing 80 grams and quickly frozen, followed by vacuum packaging to yield frozen steaks ready for cooking and serving.

After each of the meat samples obtained in Cooking Examples 12-1 and 12-2 was allowed to stand in a freezer at −25° C. for 4 outer appearance evaluation tests.

As a result, it was found that the meats had a sharp color with no meat juice coming out as drip and that they retained a high water preventive capability or water-binding property. Further, the meat quality was tender and swollen giving a voluminous look. They were superior in overall acceptability to conventional chilled meat products.

Cooking Example 11-3

The beef round block obtained in Embodiment 12 was cut into slices, each 3 mm thick, about 3–5 cm long and about 3–5 cm wide, and they were dipped in a seasoning mixture consisting of chopped onions, "shirataki" (noodles from "konnyaku" flour) and fried eggs with sugar, soy sauce and condiments added thereto, followed by placing the meat slices in an airtight container, together with the seasoning mixture, and sterilizing the contents of the container by heating under elevated pressure to produce a retort food product ready for quickly cooking "sukiyaki". This retort food product was then heated for 5 minutes in a boiling water bath and served over cooked rice. As a result, it was found that the meat slices retained their original shapes and tasted tender and delicious. Further, the food product achieved a high cooked yield.

On the other hand, when meats are prepared as a retort food product in conventional manner, they have in almost all cases been shrunken without retaining their original shapes when cooked. Further, they have been very poor in cooked yield. The conventional methods could not solve these problems.

The present invention could solve the problems prevailing in retort food products processed by the conventional methods, thereby enabling eating retort food products with a delicious taste. The present invention can be likewise applied to a variety of retort noodle products ready for quickly cooking food products, in addition to retort "sukiyaki" products to be served over cooked rice simply by boiling the bag-filled retort products in a boiling water bath.

Cooking Example 12-4

The beef round block obtained in Embodiment 12 was cut into slices, each 1 mm thick, about 3–5 cm long and about 3–5 cm wide, and they were freeze-dried. They were placed in a container and stored at room temperature for 1 month. The container was then opened and the freeze-dried meats were boiled in a boiling water, thereby swelling within short to a size as almost large as the original size before freeze-drying. The sensory or organoleptic tests revealed that they provided a good and delicious taste.

Hitherto, the dried meats contained in conventional food products to be quickly cooked before serving are very poor in reproduction to their original sizes and shapes upon boiling in a boiling water, and they sometimes provide have provided a very poor taste. Therefore, improvements have been demanded for a long time. It can be noted that the present invention could solve those problems prevailing in the conventional technology.

As is apparent from the results of the cooking examples as described above, the present invention can restore and reproduce chilled meats which have once deteriorated in quality, while eliminating a smell of the meat, restoring moisture to the meat, providing the meat with a look of freshness, and emulsifying and gelling the meat tissues forming a fine net-like structure in meat. Further, the meat processed by the present invention was found to offer a number of advantages that little meat juice is caused to ooze out as drip from meat during storage in a freezed or refrigerated state or during thawing, meat can be tenderized, and the tasteful substances in the meat can be harmonized and matched with seasonings added. Hence, the present invention can solve the problems and disadvantages originating from chilled meat and chilled meat products produced in conventional manner and can make the meat quality of a lower grade to meat of a higher grade, making it more tasteful than its original taste. It is further found that the addition of additives such as a functional agent, e.g. EPA, calcium or the like, can provide the processed meat with the features which conventionally processed meat could not provide. With the advantages and features of the processed meat according to the present invention, it can be distributed in any form suitable for usage, for example, in the form of steaks, blocks, slices and so on, and in any suitable state such as in a chilled, frozen or freeze-dried state.

EMBODIMENT 13

Frozen point end beef stock was thawed while controlling the temperature at −2° C. and cut into small chops having a size suitable for being canned. While the small beef chops of 6,000 grams were mixed with a mixer at a low speed, 300 cc of a solution of sodium chloride in a 4.3 mole concentration was sprayed thereonto and the meat was kneaded for 5 minutes to impregnate the salt solution in the meat to solubilize the meat tissues therein.

Thereafter, the meat was sprayed uniformly with 280 cc of an aqueous solution of sodium bicarbonate in a 1.0 mole concentration while mixing the meat with a mixer at a low speed. After spraying, the mixing was continued for another 5 minutes to have the alkali solution absorbed sufficiently in the meat to age the meat by gelation of the meat tissues, while promoting the action of the salt to solubilize the meat tissues therein.

Then, while the meat was kneaded with a mixer at a low speed, it was sprayed with a solution of 10 grams of seasoning containing sodium glutamate (trade name: AJINOMOTO), 240 grams of sucrose and 10 grams of a mixture of vitamin C with vitamin E in 100 cc of cooking Japanese rice wine (sake) and 100 cc of brandy whisky, followed by mixing the meat at a low speed for another 5 minutes to uniformly impregnate the solution of the additives in the meat while furthering the aging.

The processed meat was then cooked with a rotary cooking device by heating its surfaces at 100° C. for 5 minutes and packed in cans in given amounts, together with seasoning liquid. The can was then sealed while removing the air therefrom and sterilized at 115° C. and 2 atmospheric pressure for 40 minutes.

The can was opened after storage for a given period of time and the canned beef was subjected to sensory tests. It was evaluated by the panelists that the canned beef tasted tender and elastic. Further, the processed meat was cooked at a high cooked yield, with little fat materials flown out and little waxy materials solidified in white. Moreover, the processed meat had the fat materials transformed into gelatin, providing the meat with a savor.

From the above-mentioned evaluations, the canned beef prepared using the processed beef according to the present invention is found to be remarkably superior to canned beef prepared in conventional manner in water preventive capability or water-binding property and in taste.

EMBODIMENT 14

Frozen raw beef meat (point end beef brisket portion) of 6,000 grams was thawed while controlling the thawing temperature and then cut into square blocks each 25 cm long. The meat blocks were then mixed at a low speed with a mixer while spraying 300 cc of a solution of sodium chloride in a 4.3 mole concentration with meat juice obtained during thawing added thereto, to which 100 cc of mirin, 10 grams of a mixture of vitamin C and E, 240 grams of sorbitol powder and 10 grams of AMIRICH GCR as seasoning were added. The treatment with the salt was continued for 5 minutes and they were impregnated with the salt and the alkali.

The meat blocks were then sprayed with 200 cc of an aqueous solution of sodium bicarbonate in a 1.0 mole concentration, with meat juice and 100 cc of Japanese rice wine (sake) added thereto, while mixing them at a low speed with a mixer. The mixing operation was continued for 10 minutes in order to further the aging of the meat by gelation forming a fine net-like structure in the fat and muscle portions while promoting the action of the salt for solubilizing the meat tissues.

The meat blocks were cooked by heating for 5 minutes at 100° C. with a rotary cooker and were then cooled. They were placed in a heat-resistant plastic container and sealed airtight by inserting liquid nitrogen into the container. They were then heated at 115° C. and 2 atmospheric pressures for 25 minutes and processed with microwave, preparing food products ready for cooking and serving.

EMBODIMENT 15

A frozen topside round block of beef was thawed while controlling the thawing temperature and the thawing was discontinued when the temperature at the central portion of the beef reached −2° C. to −5° C., followed by mincing them with a chopper with 5 mmφ blades.

The pre-processed minced meat of 6,000 grams was mixed with a mixer while spraying it with 300 cc of an aqueous solution of sodium chloride in a 4.0 mole concentration, and the treatment with the salt was carried out by continuing the mixing operation at a low speed for 2 minutes.

The minced meat was mixed with a mixer at a low speed while spraying it with 280 cc of an aqueous solution of sodium bicarbonate in a 1.0 mole concentration with meat juice added thereto, followed by continuing the mixing at a low speed for 2 minutes to promote the aging of meat by gelation, while furthering the action with the salt. Further, the meat was then sprayed with an aqueous solution of 10 grams of seasoning (trade name: AJINOMOTO), 240 grams of sucrose and 10 grams of a mixture of vitamin C with vitamin E in 100 cc of mirin and 100 cc of Japanese rice wine (sake) while operating the mixer at a low speed, followed by operating the mixing treatment for 4 minutes after the completion of the spraying to allow a uniform impregnation of the additives in the minced meat and to promote the aging of the meat.

Cooking Example 15-1

The minced meat obtained in Embodiment 15 was freeze-dried and stored in a sealed container for 1 month. Thereafter, the container was opened and the minced meat was boiled in a boiling water, thereby returning the shape of the swollen meat to its original size prior to freeze-drying. The boiled meat tasted tender and delicious.

The freeze-dried product of the minced meat contained in a quickly cooking freeze-dried noodles packed in a cup prepared in conventional manner was poor in restoring its shape and did not give any meat-like taste. On the other hand, the freeze-dried product of the minced meat processed by this example has restored the shape and provided a taste as meat.

Cooking Example 15-2

The minced meat of 500 grams, prepared in this embodiment, was mixed with 50 grams of processed cheese cut into square blocks each 5 mm long, and they were formed into a hamburger. The hamburger was grilled with the result that had the minced meats were secured to each other, holding its original shape without scattering the minced meat upon cooking. It also provided a delicious taste without neither liquid seasoning nor salt and pepper.

Cooking Example 15-3

The minced meat prepared in this embodiment was prepared into a cooking premix and placed in a sealed container which in turn was sterilized by heating under elevated pressure to prepare a retort food product. The resulting retort food product was cooked and stored for 15 days, followed by opening the container and placing the contents onto bean curd cut into small chops. The resulting mixture was wrapped with a polyvinyl chloride sheet and cooked by heating in an electronic oven for 3 minutes. It was found as the sensory or organoleptic tests that the meat of the cooked food tasted provided a tender taste and a delicious flavor.

Cooking Example 15-4

The minced meat prepared in this embodiment was prepared into hamburgers, balls, and retort curries. It is found that these minced meats are secured to each other and the meat products have retained their original shapes upon cooking.

On the other hand, conventional hamburgers are contained with egg, egg albumin powder, bread powder or the like in order to increase the ability of joining the minced meat to each other, while hamburgers prepared by the minced meat of the present invention are high in the ability of joining the meat to each other, keeping the shape, without addition of the such additives.

Moreover, the steaks of the meat of this embodiment were cut into small blocks which in turn were placed in a sealed container, together with a curry roux and prepared into a retort beef curry product by sterilization under heating at elevated pressure. The meat blocks in this beef curry product were elastic and tender, retaining their original shapes without being broken upon cooking and the resulting retort product provided a high cooked yield upon cooking, as the retort meat products prepared from the processed meat of Embodiment 11. Further, the curry roux prepared in this cooking example enhanced a savor originating from the meat processed by the present invention in combination with a taste as a curry roux. Moreover, the curry roux of this cooking example gave a taste and the meat was tender as if it was cooked for a long time.

The minced meat of the beef proceed by this embodiment was prepared and formed into Chinese bean curd foodstuff stuffed with minced meat, a fried dumpling stuffed with minced pork meat, and "shao-mai" (Chinese foodstuff with minced pork covered with a thin wheat skin). The minced meat in the retort food products was elastic and tender and assisted in enhancing a taste of a sauce, providing a good feeling upon eating, while the minced meat processed in conventional manner produced a hard and poor feeling upon eating.

It is further found that the remaining obtained by cutting the meat block can be minced with a chopper into minced meat having the properties as described hereinabove. Further, this method for preparing minced meat can be applied to pork meat, a mixture of pork meat with beef meat, and poultry meat, The minced meat is elastic and high in adherence and is provided with a savor.

EMBODIMENT 16

A frozen topside round of beef of 6,000 grams was thawed while controlling the temperature, and the thawing wad discontinued as the temperature at the central portion of the block meat reached −2° C. to −5° C., followed by cutting the block into small chops each 2 cm long. The small chops pre-processed were placed in a vacuum mixer installed with a spraying device and a cock of the mixer was closed in a state in which the pressure was reduced to 600 mmHg.

The meat chops were sprayed with 300 cc of a solution of sodium chloride in water in a 4.0 mole concentration in the mixer while operating the mixer at a low speed. After spraying, the pressure within the mixer was returned to ambient atmosphere and the operation of the mixer was continued for another 4 minutes, thereby promoting the treatment with the salt to solubilize the meat tissues.

Then, the pressure within the vacuum mixer was again reduced to 600 mmHg and the cock was closed. Further, the meat chops were sprayed with 280 cc of a solution of sodium bicarbonate in a 1.0 mole concentration with meat juice added thereto, while operating the mixer at a low speed. Then, the pressure within the mixer was returned to ambient pressure and the operation of the mixer was continued for another 4 minutes, thereby furthering the aging of the meat by gelling the meat tissues thereof, while promoting the action with the salt to solubilize the meat tissues thereof.

The meat chops were further sprayed with a solution of 10 grams of seasoning (trade name: AMIRICH GCR), 120 grams of sorbitol powder and 10 grams of a mixture of vitamin C with vitamin E in 100 cc of mirin and 100 cc of cooking Japanese rice wine (sake), while operating the mixer at a low speed and reducing the pressure to 600 mmHg. After spraying, the pressure within the mixer was returned to ambient pressure and continued operating at a low speed for another 4 minutes to impregnate the additives uniformly in the meat for furthering the aging of the meat.

It can be noted herein that the vacuum mixer used upon spraying the meat with the salt solution, the alkali solution and the solution of the additives has the functions of uniformly impregnating each of the solutions in the meat by spraying the solutions under reduced pressure and returning the pressure to ambient pressure. It can be noted, however, that the vacuum mixer can achieve its functions to a sufficient extent under ambient pressure, not under reduced pressure, by extending the period of mixing at a low speed to a somewhat longer time, thereby allowing a sufficient impregnation of the solutions in the meat.

In this embodiment, the processed beef was cooked for a curry and it was well impregnated with the additives providing a favorable taste and flavor although the cooking time was very short. Moreover, the taste of the curry served with this meat was evaluated by all the panelists as being as tasteful and flavored as a curry served with meat cooked by boiling for a longer period of time.

It was further found that the processed beef canned with a curry roux in an airtight can as a retort food could hold its original shape without being broken with little fat materials flown out from the meat yet tasteful materials flown out from the meat in the roux and mixed therewith in a harmonized way, thereby providing an excellent savor for the curry roux. On the other hand, conventional retort beef curry has the meat broken into pieces at the time of sterilization by heating under elevated pressure or by heating with microwave, with the fat materials flown out from the meat into the curry roux. The outflow of the fat materials into the curry roux may damage a taste and flavor of the beef curry. Therefore, the present invention has solved the problems inherent in conventional retort beef curry food, providing a retort beef curry with the processed beef, which can be cooked in a tender and elastic manner. This technology can as a matter of course be applied to a stewed beef, other Chinese food materials and any other food materials.

EMBODIMENT 17

Chilled pork round block of 6,000 grams was injected in a net-like pattern with 300 cc of an aqueous solution of a 95:5 mixture of sodium chloride with magnesium chloride in a 4.3 mole concentration and then subjected to vibration treatment with an electric massage machine for 5 minutes to further the action of the salt to solubilize the meat tissues.

Then, the pork round block was injected in a net-like pattern with 280 cc of a solution of sodium bicarbonate in water in a 1.0 mole concentration and then subjected to vibration treatment with an electric massage machine for 5 minutes to promote the aging of the meat by gelation while furthering the action of the salt to solubilize the meat tissues. Thereafter, the pork round block was further injected in a net-like pattern with a solution of 10 grams of seasoning containing sodium glutamate (trade name: AJINOMOTO), 240 grams of sucrose and 10 grams of a mixture of vitamin C with vitamin E in 100 cc of cooking Japanese rice wine (cooking sake) and 100 cc of Japanese rice wine (sake). After injection, the pork meat was subjected to vibration treatment with an electric massage machine for 5 minutes to distribute the additives in the muscle and fat portions of the meat, while promoting the aging of the meat by gelation, thereby providing a processed pork round block having a favorable savor.

The processed pork round block was cut into steaks each having a thickness of 10 mm and weighing 200 grams and rapidly frozen, followed by packaging at vacuo. The frozen pork steaks can be distributed in the market as food materials ready for thawing and cooking as pork steaks, port cutlets and for other food.

Cooking Example 17-1

The frozen pork steak processed in this embodiment was thawed and then grilled at 180° C. on both sides each for 5 minutes, thereby yielding a cooked food material ready for serving as a pork steak.

Cooking Example 17-2

The pork steak processed in this embodiment was packaged in an airtight container and sealed, followed by sterilization by heating under elevated pressure, thereby preparing a retort food product ready for cooking as a pork steak.

Cooking Example 17-3

The frozen pork steak processed in this embodiment was thawed and then covered with bread crumbs, followed by dipping it in whipped egg and then covering it again with bread crumbs. The pork steak covered with bread crumbs was then frozen rapidly and packaged, thereby yielding a cooked food material ready for serving as pork cutlet.

The frozen pork cutlet was fried with oil at 170° C. on both sides each for 4 minutes. It is found that the fried pork cutlet according to this cooking example caused the pork met to be little separated from the covering of the bread crumbs upon frying because the meat expanded by frying and kept attachment to the covering thereof. On the other hand, fried pork cutlet prepared in conventional manner often has the meat separated from the covering of the bread crumbs upon frying and even upon eating because the meat is caused to shrink while the covering thereof is caused to expand upon frying.

It is further found as a result of sensory tests that the pork meat of the fried pork cutlet tasted tender and elastic, with the fat portions transformed into gelatin and providing a taste and flavor that conventional pork cutlets could not provide.

This process was likewise applied to small pork chops on a spit, which were then covered with bread crumbs, dipped in whipped egg and then covered with bread crumbs. The small pork chops were then fried in the same manner as above and it is found that they produced substantially the same results.

EMBODIMENT 18

Chilled pork loin block of 760 grams was thawed to -2° C. to -5° C. in a thawing machine while controlling the temperature and then injected in a net-like pattern with 380 cc of an aqueous solution of sodium chloride in a 4.3 mole concentration, with a mixture of 12.5 cc of mirin with 1.3 grams of seasoning (trade name: AMIRICH GCR), 30.0 grams of sorbitol powder and 1.3 grams of a mixture of vitamin C with vitamin E added thereto. The pork loin block was then subjected to vibration treatment with an electric massage machine for 5 minutes to further the action of the salt to solubilize the meat tissues.

Then, the pork loin block was injected in a net-like pattern with 35 cc of an aqueous solution of sodium bicarbonate in 12.5 cc of sake in a 1.0 mole concentration and then subjected to vibration treatment with an electric massage machine for 10 minutes to promote the aging of the meat by gelation while furthering the action of the salt to solubilize the meat tissues.

The pork loin block so processed was then cooked and subjected to sensory tests and evaluations on the appearance of the cooked meat in substantially the same manner as in Embodiment 17. As a result, it is found that the pork loin processed in Embodiment 18 achieved substantially the same results as achieved in Embodiment 17, thereby maintaining the meat color of the chilled pork loin block into a bright or fresh color as a fresh pork loin and improving the quality of the meat to a remarkable extent.

EMBODIMENT 19

Chilled pork loin block of 6,000 grams was injected in a net-like pattern with 300 cc of an aqueous solution of sodium chloride in a 4.3 mole concentration and then subjected to vibration treatment with an electric massage machine for 5 minutes to further the action of the salt to solubilize the meat tissues.

Then, the pork loin block was injected in a net-like pattern with 280 cc of an aqueous solution of sodium bicarbonate in water in a 1.0 mole concentration and then subjected to vibration treatment with an electric massage machine for 5 minutes to promote the aging of the meat by gelation while furthering the action of the salt to solubilize the meat tissues.

Thereafter, the pork loin block was further injected in a net-like pattern with a mixture of 100 cc of mirin and 100 cc of sake with 10 grams of seasoning containing sodium glutamate (trade name: AJINOMOTO), 240 grams of sucrose and 10 grams of a mixture of vitamin C with vitamin E and then subjected to vibration treatment with an electric massage machine for 5 minutes to distribute the additives uniformly in the muscle and fat portions of the meat while furthering the aging of the meat by gelation, thereby producing a pork loin block stuffed with seasoning.

The pork loin block stuffed with seasoning was rounded in a ham-like shape and heated for 180 minutes with a hot plate controlled at 5° C. to 57° C., followed by cooling to yield a pork loin ham like raw ham. It is found by sensory tests and evaluations on the appearance of the meat that the meat looks very fresh in color, is superior in water-sustaining or water-binding capabilities, is elastic and tender, provides a favorable taste, and rich in fine texture.

Further, it is found that the pork loin block so processed in this embodiment can be also produced into a pork loin ham by smoking it in conventional manner.

The conventional methods for producing ham suffer from a lack of attachment of pork block meats to each other. Therefore, in order to reinforce the attachment of the pork block meats, the conventional methods generally use large amounts of starch, egg white or integrating additives or chemicals and have the block meats integrated into a shape by casing or with strings. On the other hand, the processed pork loin blocks processed by the present invention can sustain a ham shape and produce a ham like raw ham without requiring the use of any additives or chemicals for reinforcement of the attachment of the pork block meats and even without the use of casing or strings for integrating them.

Moreover, the conventional methods for producing ham usually requires a long period of time, that is, from 5 to 10 days for salting pork meats and further from 1 day to 2 days for aging with a massage machine or other like equipment after injection of a pickle. Therefore, the conventional methods are poor in workability and productivity, while the present invention requires several hours from the start of processing raw pork meat blocks to the completion of manufacturing to produce a ham like raw ham. Therefore, the method according to the present invention is extremely high in workability and productivity and can reduce costs of manufacturing. As a matter of course, the method according to the present invention is extremely superior in producing meat products on a large scale.

It is further found that the pork loin blocks so processed can be distributed in the market as they are or as in a form of slices or in any other appropriate form and in a chilled, frozen or freeze-dried state or in any other appropriate state.

EMBODIMENT 20

Chilled pork loin block of 3,000 grams was injected in a net-like pattern with 150 cc of an aqueous solution of sodium chloride in a 4.3 mole concentration, with 120 grams of sucrose, 15 grams of seasoning (trade name: PORK POWDER-S; produced by Taiyo Kagaku Kabushiki Kaisha) and 2 grams of a mixture of vitamin C with vitamin E added thereto, and then subjected to vibration treatment with an electric massage machine for 5 minutes to further the action of the salt to solubilize the meat tissues.

Then, the pork loin block was injected in a net-like pattern with 140 cc of a solution of sodium tripolyphosphate in a 2.0 mole concentration, with 21 grams of egg white powder, 6 grams of seasoning containing sodium glutamate (trade name: AJINOMOTO), additives (1 gram, trade name: AMIRICH GCR; 6 grams, trade name: SUPER-LACTO NO. 96, product of Taiyo Kagaku K.K.; 1.5 grams, trade name: SUN-PRO GF-G, product of Taiyo Kagaku K.K.; 15 grams, trade name: SUNLITE S-3, product of Taiyo Kagaku K.K.), and 2.1 grams of spices added thereto, and then subjected to vibration treatment with an electric massage machine for 30 minutes to impregnate the additives uniformly in the meat and to promote the aging of the meat by gelation while furthering the action of the salt to solubilize the meat tissues.

Thereafter, the pork loin block meats so processed above were inserted into a fibrous casing while rounding the block meat and the both sides of the casing were bundled. The bundled pork block meats were then heated at 35° C. to 45° C. for 30 minutes to have the surface dried, immediately followed by subjecting the meats to smoking with chips of a cherry tree for 60 minutes, then boiling them in a heating water at 75° C. for 4 hours, and immersing them in a cold water immediately thereafter, thereby producing a pork loin ham.

As a result, it is found that the present invention can produce a pork loin ham in a short time of processing and at a high productivity, the ham being elastic and tender due to a sufficient extent of aging by gelation and sustaining a favorable color of the pork loin ham without using a nitrite as a coloring agent yet simply by using vitamins. Further, the present invention allows a decrease in a pickle solution and an increase in cooked yield up to approximately 97 percent. Moreover, the present invention provides the pork loin ham so produced with increased taste and flavor, tenderizing the fat portions together with the muscle portions of the meat.

On the other hand, ham prepared in conventional manner contains decomposed materials of starch and egg white powder, this addition may present the problem that a taste of the resulting ham may be impaired, although depending upon amounts of addition. Further, as a matter of course, the original color of the meat may be discolored to a dark color as time passes. In order to prevent the discoloration, a nitrite or other chemical is employed as a coloring agent for producing ham. The use of such nitrate and chemicals may be hazardous and lacking in safety to the human health, together with impairing a taste of the meat itself. Further, as the conventional methods requires a long period of time for salting, the meat quality may be impaired lacking in elasticity and tenderness.

EMBODIMENT 21

Frozen pork round block was thawed while controlling the temperature and then minced with a chopper with 5 mm$\phi$ blades. The minced pork meat of 3,000 grams was placed in a mixer and sprayed with 150 cc of an aqueous solution of sodium chloride in a 4.3 mole concentration, with 120 grams of sucrose, 5 grams of seasoning containing sodium glutamate (trade name: AJINOMOTO) and 5 grams of a mixture of vitamin C with vitamin E added thereto, while operating the mixer at a low speed. After the completion of spraying, the mixer was continued operating for another 5 minutes to further the action of the salt to solubilize the meat tissues.

Then, the minced pork meat was prayed with 140 cc of an aqueous solution of sodium pyrophosphate in a 2.0 mole concentration, with a mixture of 1 gram of white pepper, 2 grams of black pepper, 1 gram of cardamon, 2 grams of nutmeg and 1 gram of garlic as flavorings in 50 cc of mirin added thereto, while operating the mixer at a low speed. After the completion of spraying, the mixer was continued operating for another 15 minutes to promote the aging of the meat by gelation of the meat tissues thereof and to impregnate the additives and flavorings uniformly in the minced meat, while furthering the action of the salt to solubilize the meat tissues.

The minced pork meat so processed was then filled in a sheep intestinal casing with a stuffer and twisted at intervals of 6 cm to 8 cm, followed by placing the twisted casing in a smoking room at 35° C. to 40° C. for 30 minutes to dry it and then smoking the twisted casing with chips of a cherry tree at 40° C. to 45° C. for another 30 minutes. The minced pork meat smoked was then boiled in a hot water heated at 75° C. for 20 minutes and then allowed to cool, thereby producing Vienna sausage.

The Vienna sausage so produced consists of minced pork meat without containing any meat cut with a silent cutter and the resulting sausages produced by the present invention have the minced meats attached in a secure manner to each other and provides a tender taste and pleasant feeling upon eating, flavored with the flavorings in a harmony way. Further, the color on the sectional surface of the sausage is as clear as the fresh meat.

EMBODIMENT 22

Chilled pork rib block of 3,000 grams was injected in a net-like pattern with 150 cc of an aqueous solution of sodium chloride in a 4.3 mole concentration, with 120 grams of sucrose, 5 grams of seasoning (trade name: AMIRICH GCR), 2 grams of a mixture of vitamin C with vitamin E and 3 grams of spices added thereto, and then subjected to vibration treatment with an electric massage machine for 5 minutes to further the action of the salt to solubilize the meat tissues.

Then, the pork rib block was injected in a net-like pattern with 140 cc of a solution of sodium bicarbonate in a 1.0 mole concentration in 50 cc of cooking sake and then subjected to vibration treatment with a vacuum massage machine for 30 minutes to impregnate the additives uniformly in the meat and to promote the aging of the meat by gelation while furthering the action of the salt to solubilize the meat tissues.

The pork rib block was then placed in a smoking room at 35° C. to 40° C. for 3 hours to dry the block and thereafter smoked with chips of a cherry tree at 25° C. to 30° C. for 3 days, yielding bacon.

Conventional methods for the production of bacon require from 8 to 10 days for removing the blood from the meat and for salting and suffer from the disadvantage that it is difficult to uniformly distribute salt contents throughout the meat because the pork meat has its muscle portions and fat portions formed in layers.

On the other hand, the present invention requires approximately 50 minutes for pre-processing and can uniformly distribute the salt and additive contents throughout the meat even among the muscle and fat portions of the meat because the fat portions are emulsified and aged by gelation to a sufficient extent, in particular by the action of the alkali. Further, the bacon produced by the present invention is superior in preservative ability to conventional bacon, produces a color of the meat clearer than that of conventional ones, in accompaniment with the use of vitamins, even if no nitrites are used as coloring agents, and provides the meat with a tender taste rich in fine texture and with a favorable eating quality. The productivity of this invention is higher than that of conventional methods.

EMBODIMENT 23

Chilled pork loin block of 3,000 grams was injected in a net-like pattern with 150 cc of a solution of sodium chloride in a 4.3 mole concentration and 120 grams of sucrose in 50 cc of sake and then subjected to vibration treatment with an electric massage machine for 5 minutes to further the action of the salt to solubilize the meat tissues.

Thereafter, the pork loin block was injected in a net-like pattern with 140 cc of an aqueous solution of sodium bicarbonate in a 1.0 mole concentration, with a solution of 5 grams of a mixture of vitamin C with vitamin E, 5 grams if seasoning (trade name: AMIRICH GCR) and 3 grams of spices in 50 cc of mirin added thereto, and then subjected to vibration treatment with a vacuum massage machine for 30 minutes to impregnate the additives uniformly in the meat and to promote the aging of the meat by gelation while furthering the action of the salt to solubilize the meat tissues.

Then, the pork loin block meats so processed above were inserted into a fibrous casing while rounding the block meat and the both sides of the casing were bundled. The bundled casing was then heated at 35° C. to 45° C. for 30 minutes to have the surface dried, immediately followed by subjecting the meats to smoking with chips of a cherry tree for 60 minutes, then boiling them in a hot water heated at 75° C. for 4 hours, and immersing them in a cold water immediately thereafter, thereby producing a pork loin ham.

As described hereinabove, ham prepared in conventional manner contains decomposed materials of starch and egg white powder, this addition may present the problem that a taste of the resulting ham may be impaired, although depending upon amounts of addition. Further, as a matter of course, the original color of the meat may be discolored to a dark color as time passes. In order to prevent the discoloration, a nitrite or other chemical is employed as a coloring agent for producing ham. The use of such nitrate and chemicals may be hazardous and lacking in safety to the human health, together with impairing a taste of the meat itself.

On the other hand, the ham prepared by the method according to the present invention has a low salt content and does not contain any chemicals, such as a nitrite, hazardous to the human health, providing a higher safety and a favorable and tender taste.

EMBODIMENT 24

Frozen pork loin block was thawed while controlling the temperature and then minced with a chopper with 5 mmφ blades. The minced pork meat of 6,000 grams was placed in a mixer and sprayed with 300 cc of sodium bicarbonate in a 1.0 mole concentration in 100 cc of cooking sake, while operating the mixer at a low speed. After the completion of spraying, the mixer was continued operating for another 5 minutes to further the action of the sodium bicarbonate to gel the meat tissues for furthering the aging of the meat.

Then, the minced pork meat was sprayed with a solution of sodium chloride in a 4.0 mole concentration, with a solution of 240 grams of sucrose, 5 grams of seasoning (trade name: AMIRICH GCR) and 10 grams of a mixture of vitamin C with vitamin E in 100 cc of mirin added thereto, while operating the mixer at a low speed. After the completion of spraying, the mixer was continued operating for another 15 minutes to promote the action of the salt while furthering the action of the alkali for aging the meat by gelling the meat tissues.

The minced pork meat of 1,000 grams was then placed in a cutter mixer and mixed at a high speed for 30 minutes after ice cracked into smaller pieces was added thereto. The resulting processed meat was then mixed with 550 grams of the minced pork meat prepared above, followed by filling the mixture of the minced meats with a stuffer in a sheep intestinal casing yielding Vienna sausages, in a pig intestinal casing yielding Frankfurt sausages, and in a cow intestinal casing yielding Bologna sausages.

The sausages were then placed in a smoking room at 35° C. to 40° C. for 30 minutes to dry them and smoked with chips of a cherry tree at 40° C. to 45° C. for another 30 minutes. Further, the sausages smoked was then boiled in a hot water heated at 75° C. for 20 minutes for the Vienna sausages, for 30 minutes for the Frankfurt sausages, and for 40 minutes for the Bologna sausages, followed by cooling in a cold water and producing the various sausages.

The sausages sustain a firm attachment of the minced meats to each other and are provided with an elastic feeling rich in a texture as a whole upon eating and with a tender taste. Further, the color of the meat is as clear as that of the fresh meat, flavored with the flavorings in a harmony way. Further, the color on the sectional surface of the sausage is as clear as the fresh meat.

The minced pork meat so processed can provide Lyoner sausages by mixing with various cheeses and vegetables.

EMBODIMENT 25

Chilled pork rib block of 3,000 grams was injected in a net-like pattern with 150 cc of a solution of sodium chloride in a 4.3 mole concentration, with a solution of 60 grams of sucrose, 5 grams of sodium glutamate seasonings (trade name: AJINOMOTO), 5 grams of a mixture of vitamin C with vitamin E and 5 grams of spices in 50 cc of sake added thereto, and then subjected to vibration treatment with an electric massage machine for 5 minutes to promote the action of the salt to solubilize the meat tissues and to uniformly impregnate the additives and seasonings in the meat.

Thereafter, the pork rib block was injected in a net-like pattern with 140 cc of a solution of sodium bicarbonate in a 1.0 mole concentration and 60 grams of sorbitol powder in 50 cc mirin, and it was then subjected to vibration treatment with a vacuum massage machine for 30 minutes to age the meat by gelation of the meat tissues while impregnating the additives uniformly in the meat and furthering the action of the salt to solubilize the meat tissues.

The pork rib block so processed was further subjected to natural aging in a refrigerator at 5° C. for 3 days and cut into two slices each about 5 cm thick, about 5 cm wide, and about 25 cm long. One of the two slices was steamed with water steam for 15 minutes, boiled in boiling water for 1 hour and flavored with seasonings, thereby yielding a boiled pork meat product. The other was dipped in a seasoning liquid for 30 minutes and roasted on an oven at 150° C. for 30 minutes, thereby yielding a roasted pork meat product.

Conventional methods for the preparation of boiled pork and roasted pork meat products require a long period of time, for example, about 5 to 6 hours for boiling in boiling water and about 2 to 3 hours for dipping in a seasoning liquid. On the other hand, the method according to the present invention can produce boiled and roasted pork meat products in a very short time which can provide a favorable taste and flavor, for example, because the meats processed by the present invention can be tenderized in a short time, they are previously flavored with seasonings, tasteful materials such as meat juice contained in the meats are little flown out from the meat during thawing and cooking, and they can be harmonized with the flavorings added.

EMBODIMENT 26

Frozen chicken breasts of 1,200 grams were thawed while controlling the temperature and then injected in a net-like pattern with 60 cc of a solution of sodium chloride in a 4.3 mole concentration, with a solution of 2 grams of seasonings (trade name: AMIRICH GCR), 4.8 grams of sorbitol powder and 2 grams of a mixture of vitamin C with vitamin E in 20 cc of mirin added thereto, followed by vibration treatment with an electric massage machine for 5 minutes to promote the action of the salt to solubilize the meat tissues.

Then, the chicken breasts were injected in a net-like pattern with a solution of sodium bicarbonate in a 1.0 mole concentration in 20 cc of sake and it was then subjected to vibration treatment with an electric massage machine for 10 minutes to promote the aging of the meat by gelation of the meat tissues while furthering the action of the salt to solubilize the meat tissues.

Cooking Example 26-1

The processed chicken breast was grilled on their both sides at 170° C. for 13 minutes and cooled, followed by packing them for a cooked chicken food product ready for cooking and serving. This product can be flavored with spices, as requested.

Cooking Example 26-2

The processed chicken breast of 200 grams was frozen rapidly and packaged at vacuo, thereby producing a frozen food product of cooked chicken breast ready for cooking and serving.

The chicken food products so prepared were then subjected to sensory tests and evaluations on the appearance of the chicken food materials.

As a result, it is found that the chicken food products so prepared can be distributed in the market as they are in a chilled state or in a freeze-dried state. It is further found that they can be brought into the market by vacuum packaging in a frozen state. The chicken food products provide a favorably juicy taste and flavor when cooked by grilling and roasting without using any seasoning or flavoring liquid for dipping. On the other hand, chicken breasts processed and cooked in conventional manner often provides a dry taste with less juiciness. Further, when they are grilled or roasted, the chicken meats are caused to shrink making the meat touch and less tender. However, the present invention can rather expand meat, increasing the weight of the cooked product and as a result the cooked yield. Moreover, the chicken food products are so tender that the aged , etc. can eat them readily.

The chicken meat so cooked can demonstrate a remarkable extent of transformation of the meat quality so that it can be stored for a longer period of time, e.g. 10 days, while keeping the freshness of the meat and preventing a drop of pH values to a great extent. Further, they can be produced as "teriyaki" chicken, fried chicken, chicken rolls, fried chicken nuggets, boiled chicken, and any other appropriate chicken food materials.

EMBODIMENT 27

Chilled chicken breasts of 10 pieces, each weighing about 300 grams, were injected in a net-like pattern with 140 cc of an aqueous solution of sodium bicarbonate in a 1.0 mole concentration and then subjected to vibration treatment with an electric massage machine for 5 minutes to promote the aging of the meat by gelation of the meat tissues.

The chicken breasts were then injected in a net-like pattern with 150 cc of a solution of sodium chloride in a 4.3 mole concentration in water and then subjected to vibration treatment with an electric massage machine for 5 minutes to promote the action of the salt to solubilize the meat tissues while furthering the aging of the meat by gelation.

Thereafter, the chicken breasts so processed were further injected in a net-like pattern with a solution of 5 grams of sodium glutamate (trade name: AJINOMOTO) and 5 grams of a mixture of vitamin C with vitamin E in 50 cc of mirin and 50 cc of sake and then subjected to vibration treatment with an electric massage machine for 5 minutes to uniformly impregnate the additives in the meat while promoting the action of the salt to solubilize the meat tissues and furthering the aging of the meat by gelation.

The chicken breasts so processed were then subjected to the sensory tests and evaluations on the appearance of the meat. As a result, it is found that the meats of this embodiment showed substantially the same results as those achieved by Embodiment 26. The processed chicken breasts can demonstrate a remarkable extent of transformation of the meat quality so that it can be stored for a longer period of time, e.g. 10 days, while keeping the freshness of the meat and preventing a drop of pH values to a great extent.

It is further found that the chicken food products so prepared can be distributed in the market as they are in a chilled state or in a freeze-dried state. It is further found that they can also be brought into the market by vacuum packaging in a frozen state.

Cooking Example 27-1

The chicken breast meat of 200 grams prepared in this embodiment was pre-heated at 180° C. for 3 minutes to slightly scorch the both sides and cooled, followed by placing in an airtight container, sealing it and sterilizing it at 115° C. and 2 kg per sq. meter for 35 minutes, thereby producing a retort food product ready for cooking and serving.

Cooking Example 27-2

The chicken breast meat prepared in this embodiment was cut in smaller blocks each 5 mm long and packaged in an airtight container together with vegetables such as chopped onion and carrot and fried egg and a seasoning liquid containing sugar, soya sauce and flavorings. The container was then sterilized by heating under elevated pressure, thereby yielding a retort food product for serving over boiled rice.

The retort food product so prepared was then cooked by heating in a boiling water for 5 minutes. When the container was opened, it was found that the chicken meats sustained their original shapes without being broken in smaller pieces and the cooked yield was high enough. As a result of sensory tests, the cooked food product was found to be tender and rich in a fine texture, providing a favorable taste, when served over boiled warm rice.

EMBODIMENT 28

A frozen mutton block meat stock of 3,000 grams was thawed while controlling the temperature and then injected in a net-like pattern with 150 cc of an aqueous solution of sodium chloride in a 5.0 mole concentration, in which a mixture of 50 cc of mirin with 5 grams of seasoning (trade name: AMIRICH GCR), 60 grams of sorbitol powder and 5 grams of a mixture of vitamin C with vitamin E was dissolved, followed by vibration treatment with an electric massage machine for 5 minutes to promote the action of the salt to solubilize the meat tissues and to impregnate the additives into the meat.

The mutton block meat was then injected in a net-like pattern with 150 cc of a solution of sodium polyphosphate in a 2.0 mole concentration in 50 cc of sake as an alcohol and then subjected to vibration treatment with an electric massage machine for 10 minutes to further the aging of the meat by gelation with the alkali while promoting the action of the salt to solubilize the meat tissues.

Cooking Example 28-1

The mutton meat obtained in Embodiment 28 was cut into slices each 10 mm thick and approximately 150 grams in weight and then grilled on the both sides for 8 minutes at 180° C., followed by refrigerating and vacuum-packing to produce a cooked food product for a mutton steak.

Cooking Example 28-2

The cooked mutton meat obtained in Embodiment 28 was cut into thin slices and vacuum-packed in amounts of 500 grams each, followed by rapidly freezing to produce a frozen and cooked mutton food product ready for serving without additional seasonings.

Cooking Example 28-3

The cooked mutton meat obtained in Embodiment 28 was cut into thin slices and packed in a retort pouch bag in an airtight manner, followed by sterilization at 115° C. and 2 kg per sq. meter for 40 minutes to produce a retort mutton food product ready for serving.

Mutton meat generally has the muscle portions intertwined with the fat portions in the meat tissues, containing particularly collagen in a large amount and making the meat quality rather tough. The present invention can make the meat quality of such mutton meat loosened and tenderized in a short time, while furthering the aging of the meat by gelling the muscle and fat portions in the meat tissues. Further, it can transform the fat portions into gelatin, thereby providing a tender taste and increasing a flavor. Moreover, the method according to the present invention can offer a number of advantages and features, such as assisting in removing a smell or odor originating from the mutton meat itself and further in preventing waxy materials from flowing out onto the meat surface from the meat upon heating because the waxy materials are considered to penetrate into the meat tissues.

EMBODIMENT 29

Frozen horse meat of 3,000 grams was thawed while controlling the temperature and then injected in a net-like pattern with 150 cc of an aqueous solution of sodium chloride in a 5.0 mole concentration, in which a mixture of 5.0 grams of seasoning (trade name: AMIRICH GCR), 60 grams of sorbitol powder and 5.0 grams of a mixture of vitamin C with vitamin E with 50 cc of mirin was dissolved. The horse meat was subjected to vibration treatment with an electrical massage machine for 5 minutes to further the action of the salt to solubilize the meat tissues and to ensure a uniform impregnation of the additive solution into the meat.

The horse meat was further injected in a net-like pattern with 140 cc of a solution of sodium bicarbonate in a 1.0 mole concentration in 50 cc of sake and then subjected to vibration treatment with an electrical massage machine for 10 minutes to promote the aging of the meat by gelation of the meat tissues while furthering the action of the salt to solubilize the meat tissues.

Horse meat generally has the problems that the meat color tends to deteriorate and discolor and a large amount of meat juice flows out at a high purge (drip) rate. In particular, when frozen horse meat is being thawed, meat juice may be prone to flow out in a large amount, thereby impairing a taste. The method according to the present invention can assist in sustaining the color of the meat at a level close to the original color of the fresh meat and decreasing a rate of outflow of the purge (drip) of meat juice from the meat, thereby sustaining a taste and providing the meat with favorable texture. It is further evaluated that even frozen horse meat can have a taste comparable to chilled horse meat. Raw horse meat is said to be rich in tasteful materials and fine texture.

Cooking Example 29-1

The horse meat obtained in Embodiment 29 was cut into thin slices and packed in bags each in an amount of 100 grams, followed by sealing the bags and freezing rapidly to produce frozen food products for cooking with cut vegetables.

Cooking Example 29-2

The horse meat obtained in Embodiment 29 was cut to small sticks and formed into a sheet form, followed by freezing rapidly and vacuum packed to produce meat sticks ready for serving.

EMBODIMENT 30

Frozen beef round block meat was thawed and then cut into smaller cubes each weighing about 5 grams. The beef cubes of about 240 grams were immersed in an aqueous solution consisting of sodium chloride in an amount of 26.0% w/v and in a concentration of 6.0 mole per kg and sodium bicarbonate in an amount of 7.7% w/v and in a concentration of 1.0 mole per kg, with meat juice of beef added at the rate of 15%. As a result, the solution was found to be absorbed in the meat at the rate of 7.2% and the assumed rate of absorption of sodium chloride in the meat was 0.6%. The beef round chops so processed were frozen for storage.

Comparative Example 9

Beef round cubes of about 240 grams, each cube weighing about 5 grams, were immersed for 18 hours in a solution having the same composition of European Patent Application No. 0 209 268 A2. The solution consisted of sodium chloride in an amount of 4.0% w/v (in a concentration of 0.72 mole per kg) as a salt and sodium sesquicarbonate in an amount of 1.0% w/v (in a concentration of 0.13 mole per kg). As a result, the solution was found to be absorbed in the meat at the rate of 32.7% and the assumed rate of absorption of sodium chloride in the meat was 1.3%. The beef round cubes so processed were frozen for storage.

Cooking Example 30-1

Each of the beef round block meat cubes processed in Embodiment 30 and Comparative Example 9 were thawed again and grilled on a hot plate at 160° C. for 6 minutes. In each case, some amounts of meat juice flew out during thawing and grilling. The amounts of the meat juice flown out from the meat varied greatly between the processed meats processed in Embodiment 30 and Comparative Example 9. As a result, the cooked yield varied greatly there-between, too. The processed meat processed in Embodiment 30 has the weight of the cooked meat reduced by 6.8%, while the processed meat processed by Comparative Example 9 has the weight of the cooked meat reduced by 13.8% that is approximately two times the decreased weight of the cooked meat prepared in Embodiment 30.

Experimental Example 30-1

The beef meats processed by Experimental Example 30 and Comparative Example 9 were thawed under natural conditions over 24 hours and the amounts of the meat juice flown out from the meats were measured after thawing.

As a result, it is found that for the beef meat processed by Experimental Example 30-1, the rate of the purge (drip) of beef flown out therefrom was as negligibly low as 0.07%, while for the beef meat processed by Comparative Example 9, the rate of the purge flown out therefrom was 2.38% that was larger by about 30 times that of Experimental Example 30-1.

Cooking Example 30-2

The beef meats processed by Experimental Example 30-1 and Comparative Example 9, cut into small cubes, each weighing 5 grams, were minced with a chopper with 3 mm$\phi$ blades and formed into a disk having a diameter of 80 mm and a thickness of 9 mm. The disk was grilled on a hot plate at 80° C.

As a result, it is found that the beef meat processed by Experimental Example 30-1 had the weight of the beef reduced by about 5% while the beef meats processed by Comparative Example 9 had the weight thereof reduced by about 20% (Experimental Example 30-2). The meat cooked by Cooking Example 30-2 was subjected to folding tests in accordance with the procedures as described above and it is found that the beef meat processed by Experimental Example 30-1 was rated as rating A in which the cooked meat did not cause cracking even when folded in four, while the beef meat processed by Comparative Example 9 was rated as rating D in which the cooked meat was cracked when folded in two. The minced meat of the processed meat of Experimental Example 30-1 was found remarkably higher in adhesion or meat-binding performance and elasticity or tenderness than the minced meat processed by Comparative Example 9. This means that the meat processed by Embodiment 30 has the meat protein gelled to a sufficient extent, while the meat processed by Comparative Example 9 has no meat protein gelled.

Further, it is found that the rate of the sodium chloride content in the meat processed by Comparative Example 9 is higher, i.e. 1.3%, than that of the meat processed by Experimental Example 30-1, i.e. 0.6%. The reason for such higher sodium chloride content in the meat of Comparative Example 9 is because the meat was immersed in the solution for 18 hours in the case of the meat processed by Comparative Example 9, while it was immersed in the solution only for 10 minutes in the case of the meat processed by Experimental Example 30-1. However, it is found as a result of the folding tests that the meats processed by Experimental Example 30-1 was rated as rating A while the meat processed by Comparative Example 9 was rated as rating D. Accordingly, these results reveal that, although the meat processed by Comparative Example 9 undergoes the action with the salt to solubilize the meat tissues due to the higher sodium chloride content in the meat, it causes little gelation to occur in the meat tissues due to the low rating D, while they reveal that the meat of Experimental Example 30-1 underwent the action with the salt to solubilize meat tissues as well as achieved the gelation of the meat tissues to a sufficient extent.

EMBODIMENT 31

Frozen beef round block of about 300 grams was injected with an aqueous solution containing sodium chloride in the amount of 3.85% w/v (in 6.0 mole per kg) and sodium bicarbonate in the amount of 8.60% w/v (in 1.0 mole per kg) so as for the sodium chloride content in the meat to amount to about 1.0%. The solution was injected in the meat at the rate of 11.4%.

Comparative Example 10

Frozen beef round block of about 300 grams was injected with a solution containing sodium chloride in the amount of 7.34% w/v (in 2.7 mole per kg) and sodium sesquicarbonate in the amount of 24.1% w/v (in 0.33 mole per kg), with 15% of meat juice added thereto, so as for the sodium chloride content in the meat to amount to about 1.0%. The solution was injected in the meat at the rate of 21.1%.

Experimental Example 31-1

After the frozen beef round cubes processed by Embodiment 31 and Comparative Example 10 were frozen over 6 hours, they were thawed under natural conditions at room temperature (25° C.) over 3 hours. After thawing, they were placed in a refrigerator at 5° C. for 21 hours.

In each case, the rates and amounts of meat juice (drip) flown out from the meats were determined. As a result, it is found that the rates of the meat juice flown out therefrom are as little as 0.18% for the meat processed by Embodiment 31 and as much as 1.86% for the meat processed by Comparative Example 10, on the one hand, after natural thawing over 3 hours and likewise as little as 0.28% for the meat processed by Embodiment 31 and as much as 2.47% for the meat processed by Comparative Example 10, on the other, after freezing for 21 hours.

Experimental Example 31-2

The beef round cubes processed by Embodiment 31 and Comparative Example 10 were stored in a chilled state for 24 hours in a refrigerator at 5° C.

The rates of the meat juice flown out from the meats were measured after storage for 24 hours. As a result, it is found that the rates of the meat juice flown out therefrom are as little as 0.29% for the meat processed by Embodiment 31 and as much as 13.91% for the meat processed by Comparative Example 10.

EMBODIMENT 32

Chilled beef round block was cut into smaller cubes, each weighing about 5 grams, and the smaller cubes of about 500 grams were immersed for 1 minute in an aqueous solution of sodium chloride in the amount of 26.0% w/v (in 6.0 mole per kg) and sodium bicarbonate in the amount of 7.7% w/v (in 1.0 mole per kg), with meat juice at the rate of 15% added thereto. It is found that the solution was absorbed in the meat at the rate of 7.5% and the assumed sodium chloride content in the meat was 0.6%.

Comparative Example 11

In the same manner as in Embodiment 32, chilled beef round block was cut into smaller cubes, each weighing about 5 grams. Then, the smaller cubes of about 500 grams were immersed for 18 hours in an aqueous solution having the same composition as disclosed in EP PA 0 209 268 A2 (sodium chloride in the amount of 4.0% w/v (in 0.72 mole per kg) and sodium sesquicarbonate in the amount of 1.0% w/v (in 0.13 mole per kg). As a result, it is found that the solution was absorbed in the meat at the rate of 39.5% and the assumed sodium chloride content in the meat was 1.6%.

It can be apparently assumed that the higher rate of absorption of the solution in the meat is based on a much longer immersion of the meat in the solution than in the case of Embodiment 32.

Cooking Example 32-1

The meats processed by Embodiment 32 and by Comparative Example 11 of about 110 grams each were grilled on a hot plate at 160° C. for 6 minutes. After grilling, a decrease of the weight of the cooked meats was determined by comparing the weight of the meat before grilling with the weight thereof after grilling. As a result, it is found that the weight of the cooked meat processed by Embodiment 32 decreased to 87.3% of the initial weight before cooking while the weight of the cooked meat processed by Comparative Example 11 decreased to 70.1%. This means that the cooked meat processed by Embodiment 32 caused a decrease of the weight by as low as about 12%, while the cooked meat processed by Comparative Example 11 caused a considerably great decrease of the weight by as much as about 30%.

Experimental Example 32-1

The chilled meats processed by Embodiment 32 and by Comparative Example 11 of about 130 grams each were thawed at 23° C. over 3 hours under natural conditions, followed by refrigerating at 5° C. for 21 hours.

In each case, the rates and amounts of meat juice (drip) flown out from the meats were determined. As a result, it is found that the rates of the meat juice flown out therefrom are as negligibly little for the meat processed by Embodiment 32 and as much as 2.75% for the meat processed by Comparative Example 11, on the one hand, after natural thawing over 3 hours and likewise as negligibly low as 0.07% for the meat processed by Embodiment 32 and as much as 3.06% for the meat processed by Comparative Example 11, on the other, after freezing for 21 hours.

Cooking Example 32-2

The beef meats processed by Embodiment 32 and Comparative Example 11, each weighing about 60 grams, were minced with a chopper with 3 mm$\phi$ blades and formed into a disk having a diameter of 80 mm and a thickness of 9 mm. The disk was grilled on a hot plate at 80° C. for 20 minutes. After grilling, the weights of the grilled meats were measured to determine a rate of the weight of the meat reduced by grilling.

As a result, it is found that the weight of the cooked beef meat processed by Embodiment 32 reduced to as much as 96.4% while the weight of the beef meat processed by Comparative Example 11 reduced to as small as 94.1%. In this case, no big difference was seen in respect of the reduction of the weight of the cooked meats. This can be said that the meats processed by Embodiment 32 and Comparative Example 11 undergo the action of the salt to solubilize the meat tissues to a comparable extent in both cases. It should be noted, however, that there is seen a remarkable difference in the extent of gelation therebetween, as shown in Experimental Example 32-2 below.

For reference, a control sample where no additives, i.e. neither sodium chloride nor sodium bicarbonate, were contained, caused a decrease in the cooked weight by about 20%.

Experimental Example 32-2

The cooked meats each formed in the disk shape in Cooking Example 32-2 were subjected to folding tests by slicing each of the disks to a thickness of 4 mm.

Each sample was folded in accordance with the procedures for the folding tests as described above. As a result, it is found that the cooked meat prepared from the meat processed by Embodiment 32 was rated as rating A where neither cracks nor fractures were caused even when it was folded in four, while the cooked meat prepared from the meat processed by Comparative Example 11 was rated as rating C where cracks were caused when folded in two and it was broken when folded in four.

As described above, these results reveal that the meat processed by Embodiment 32 demonstrates a remarkably higher extent of gelation of the meat proteins in the meats by the action of the alkali than the meat processed by Comparative Example 11.

For reference, the meat used as the control in Cooking Example 32-2 above was rated as rating D as a result of the folding tests because it was broken when folded in two.

EMBODIMENT 33

Chilled beef round block weighing about 700 grams was injected with an aqueous solution of sodium chloride in the amount of 3.85% w/v (in 6.0 mole per kg) and sodium bicarbonate in the amount of 8.60% w/v (in 1.0 mole per kg) so as for the assumed sodium chloride content to amount to about 1%. As a result, the sodium chloride content in the meat amounted to 0.8%, when calculated, at the injection rate of 10.2%. In this case, the sodium chloride content rate of the meat, when minced, was 0.8% when measured with a salinometer.

Comparative Example 12

Like Embodiment 33, chilled beef round block weighing about 700 grams was injected with an aqueous solution of sodium chloride in the amount of 7.54% w/v (in 2.7 mole per kg) and sodium sesquicarbonate in the amount of 9.04% w/v (in 0.33 mole per kg) so as for the assumed sodium chloride content to amount to about 1%. As a result, the sodium chloride content in the meat amounted to 0.8%, when calculated, at the injection rate of 13.4%. In this case, the sodium chloride content rate of the meat, when minced, was 0.8% when measured with a salinometer.

Experimental Example 33-1

The beef round blocks processed by injection in accordance with Embodiment 33 and Comparative Example 12, each weighing about 100 grams, were rapidly frozen, followed by thawing under natural conditions at 23° C. over 3 hours and thereafter refrigerating at 5° C. for 21 hours.

After the natural thawing and the refrigeration, the rates of meat juice (drip) flown out from the meats were measured in each case. As a result, it is found that the rates of the meat juice flown out therefrom are little as 0.54% for the meat processed by Embodiment 33 and as much as 5.54% for the meat processed by Comparative Example 12, on the one hand, after natural thawing over 3 hours and likewise as low as 1.35% for the meat processed by Embodiment 33 and as much as 6.31% for the meat processed by Comparative Example 12, on the other, after freezing for 21 hours. That is, the meat juice was caused to be flown out from the meat processed by Comparative Example 12 as much as about 5 times the meat juice flown out from the meat processed by Embodiment 33.

Experimental Example 33-2

The beef round blocks processed by injection in accordance with Embodiment 33 and Comparative Example 12, each weighing about 100 grams, were rapidly refrigerated in a chilled state at 5° C. for 24 hours.

After storage in a chilled state for 24 hours, the rates of meat juice (drip) flown out from the meats were measured in each case. As a result, it is found that the rates of the meat juice flown out therefrom are little as 0.4% for the meat processed by Embodiment 33 and as much as 1.1% for the meat processed by Comparative Example 12.

Cooking Example 33

The beef meats processed by Embodiment 33 and Comparative Example 12, each weighing about 60 grams, were minced with a chopper with 3 mmφ blades and formed into a disk having a diameter of 80 mm and a thickness of 9 mm. The disk was grilled on a hot plate at 80° C. for 20 minutes. After grilling, the weights of the grilled meats were measured to determine a rate of the weight of the meat reduced by grilling. As a result, it is found that the weight of the cooked beef meat processed by Embodiment 33 was reduced by as little as about 5% while the weight of the beef meat processed by Comparative Example 11 was reduced by much as 18.5%, that is, the weight of the cooked meat was reduced to about 80% of the original weight before grilling.

Experimental Example 33-3

The cooked meats each formed in the disk shape in Cooking Example 33 were subjected to folding tests by slicing each of the disks to a thickness of 4 mm.

Each sample was tested in accordance with the procedures for the folding tests as described above. As a result, it is found that the cooked meat prepared from the meat processed by Embodiment 33 was rated as rating A where neither cracks nor fractures were caused even when it was folded in four, while the cooked meat prepared from the meat processed by Comparative Example 12 was rated as rating C where cracks were caused when folded in two and it was broken when folded in four.

EMBODIMENT 34

Chilled pork round block were cut in smaller cubes each weighing about 5 grams, and the cubes, weighing about 500 grams, were immersed for about 1 minute in an aqueous solution of sodium chloride in the amount of 26.0% w/v (in 6.0 mole per kg) and sodium bicarbonate in the amount of 7.7% w/v (in 1.0 mole per kg), with meat juice flown out from beef meat at the rate of 15% added. The solution was found to be absorbed in the meat at the rate of 8.8% and the assumed sodium chloride content in the meat amounted to 0.7%. In this case, the sodium chloride content rate of the meat, when minced, was 0.9% as a result of measurement with a salinometer.

Comparative Example 13

Like Embodiment 34, chilled pork round block was cut into small cubes, each weighing about 5 grams, and the cubes, weighing about 500 grams, were immersed in an aqueous solution of sodium chloride in the amount of 4.0% w/v (in 0.72 mole per kg) and sodium sesquicarbonate in the amount of 1.0% w/v (in 0.33 mole per kg), as disclosed in EP No. 0 209 268 A2, for 18 hours. As a result, the assumed sodium chloride content in the meat was found to amount to 1.3%. In this case, the sodium chloride content rate of the meat, when minced, was 1.5% as a result of measurement with a salinometer.

Cooking Example 34-1

The pork round blocks processed by the Embodiment 34 and by Comparative Example 13, each weighing about 110 grams, were grilled on a hot plate at 160° C. for 6 minutes. After grilling, a decrease of the weight of the cooked meats was determined by comparing the weight of the meat before grilling with the weight thereof after grilling. As a result, it is found that the weight of the cooked meat processed by Embodiment 34 decreased to as high as 91.2% of the initial weight before cooking, while the weight of the cooked meat processed by Comparative Example 13 decreased to 78.5%. This means that the cooked meat processed by Embodiment 34 caused a decrease of the weight by as low as about 9%, while the cooked meat processed by Comparative Example 13 caused a decrease of the weight by as much as about 25%.

Experimental Example 34-1

The pork round blocks processed by Embodiment 34 and Comparative Example 13, each weighing about 130 grams, were thawed under natural conditions at 23° C. over 3 hours and thereafter refrigerated at 5° C. for 21 hours.

After the natural thawing and the refrigeration, the rates of meat juice (drip) flown out from the meats were measured in each case. As a result, it is found that the rates of the meat juice flown out therefrom are negligibly low for the meat processed by Embodiment 34 and as much as 3.21% for the meat processed by Comparative Example 13, on the one hand, after natural thawing over 3 hours and likewise as negligibly little as 0.31% for the meat processed by Embodiment 34 and as much as 3.54% for the meat processed by Comparative Example 13, on the other, after freezing for 21 hours. That is, the meat juice was caused to be flown out from the meat processed by Comparative Example 13 as much as more than about 10 times the meat juice flown out from the meat processed by Embodiment 34.

Cooking Example 34-2

The pork round meats processed by Embodiment 34 and Comparative Example 13, each weighing about 60 grams, were minced with a chopper with 3 mm$\phi$ blades and formed into a disk having a diameter of 80 mm and a thickness of 9 mm. The disk was grilled on a hot plate at 80° C. for 20 minutes. After grilling, the weights of the grilled meats were measured to determine a rate of the weight of the meat reduced.

As a result, it is found that the weight of the cooked meat processed by Embodiment 34 was reduced to as much as about 95.2% while the weight of the meat processed by Comparative Example 13 was reduced to as much as 93.5%. Hence, there is seen no big difference between the two cases in respect to the decrease in the weight of the cooked meats.

Experimental Example 34-2

The cooked meats each formed in the disk shape in Cooking Example 34-2 were subjected to folding tests by slicing each of the disks to a thickness of 4 mm.

Each sample was tested in accordance with the procedures for the folding tests as described above. As a result, it is found that the cooked meat prepared from the meat processed by Embodiment 34 was rated as rating A where neither cracks nor fractures were caused even when it was folded in four, while the cooked meat prepared from the meat processed by Comparative Example 13 was rated as rating C where cracks were caused when folded in two and it was broken when folded in four.

EMBODIMENT 35

Chilled pork round block weighing about 700 grams was injected with an aqueous solution of sodium chloride in the amount of 3.85% w/v (in 6.0 mole per kg) and sodium bicarbonate in the amount of 8.60% w/v (in 1.0 mole per kg) so as for the assumed sodium chloride content to amount to about 1%. As a result, the sodium chloride content in the meat amounted to 0.8%, when calculated, at the injection rate of 10.2%. In this case, the sodium chloride content rate of the meat, when minced, was 0.8% as a result of measurement with a salinometer.

Comparative Example 14

Like Embodiment 35, chilled pork round block weighing about 700 grams was injected with an aqueous solution of sodium chloride in the amount of 7.54% w/v (in 2.7 mole per kg) and sodium sesquicarbonate in the amount of 9.04% w/v (in 0.33 mole per kg) so as for the assumed sodium chloride content to amount to about 1%. As a result, the sodium chloride content in the meat amounted to 0.9%, when calculated, at the injection rate of 13.4%. In this case, the sodium chloride content rate of the meat, when minced, was 0.6% as a result of measurement with a salinometer.

Experimental Example 35-1

The pork round blocks processed by injection in accordance with Embodiment 35 and Comparative Example 14, each weighing about 100 grams, were rapidly frozen, followed by thawing under natural conditions at 23° C. over 3 hours and thereafter refrigerating at 5° C. for 21 hours.

After the natural thawing and the refrigeration, the rates of meat juice (drip) flown out from the meats were measured in each case. As a result, it is found that the rates of the meat juice flown out therefrom are little as 0.59% for the meat processed by Embodiment 35 and as much as 6.34% for the meat processed by Comparative Example 14, on the one hand, after natural thawing over 3 hours and likewise as low as 1.31% for the meat processed by Embodiment 35 and as much as 6.60% for the meat processed by Comparative Example 14, on the other, after freezing for 21 hours. That is, the meat juice was caused to be flown out from the meat processed by Comparative Example 14 as much as more than about 5 times the meat juice flown out from the meat processed by Embodiment 35.

Experimental Example 35-2

The pork round blocks processed by injection in accordance with Embodiment 35 and Comparative Example 14, each weighing about 100 grams, were rapidly refrigerated in a chilled state at 5° C. for 24 hours.

After storage in a chilled state for 24 hours, the rates of meat juice (drip) flown out from the meats were measured in each case. As a result, it is found that the rates of the meat juice flown out therefrom are little as 0.5% for the meat processed by Embodiment 35 and as much as 1.8% for the meat processed by Comparative Example 14.

Cooking Example 35

The pork meats processed by Embodiment 35 and Comparative Example 14, each weighing about 60 grams, were minced with a chopper with 3 mm$\phi$ blades and formed into a disk having a diameter of 80 mm and a thickness of 9 mm. The disk was grilled on a hot plate at 80° C. for 20 minutes. After grilling, the weights of the grilled meats were measured to determine a rate of the weight of the meat reduced.

As a result, it is found that the weight of the cooked pork meat processed by Embodiment 35 was reduced by as little as about 5% while the weight of the pork meat processed by Comparative Example 14 was reduced by much as 22.9%, that is, the weight of the cooked meat was reduced to less than 80% of the original weight before grilling.

Experimental Example 35-3

The cooked meats each formed in the disk shape in Cooking Example 35 were subjected to folding tests by slicing each of the disks to a thickness of 4 mm.

Each sample was tested in accordance with the procedures for the folding tests as described above. As a result, it is found that the cooked meat prepared from the meat processed by Embodiment 35 was rated as rating A where neither cracks nor fractures were caused even when it was folded in four, while the cooked meat prepared from the meat processed by Comparative Example 14 was rated as rating D where it was broken even when folded in two. This means that the extent of gelation of the meat tissues in the meat processed by Embodiment 35 is found to be sufficient while the extent of gelation in the meat processed by Comparative Example 14 is lacking.

EMBODIMENT 36

Chilled chicken leg block was cut into smaller cubes, each weighing about 5 grams, and the cubes weighing about 500 grams were immersed for about 1 minute in an aqueous solution of sodium chloride in the amount of 26.0% w/v (in 6.0 mole per kg) and sodium bicarbonate in the amount of 7.7% w/v (in 1.0 mole per kg), with meat juice flown out from beef meat at the rate of 15% added. The solution was found to be absorbed in the meat at the rate of 8.1% and the assumed sodium chloride content in the meat amounted to 0.6%. In this case, the sodium chloride content rate of the meat, when minced, was 0.8% as a result of measurement with a salinometer.

Comparative Example 15

Like Embodiment 36, chilled chicken leg block was cut into small cubes, each weighing about 5 grams, and the cubes, weighing about 500 grams, were immersed in an aqueous solution of sodium chloride in the amount of 4.0% w/v (in 0.72 mole per kg) and sodium sesquicarbonate in the amount of 1.0% w/v (in 0.33 mole per kg), as disclosed in EP No. 0 209 268 A2, for 18 hours. As a result, the solution was found to be absorbed in the meat at the rate of 39.8% and the assumed sodium chloride content in the meat was found to amount to 1.6%. In this case, the sodium chloride content rate of the meat, when minced, was 1.5% as a result of measurement with a salinometer.

Cooking Example 36-1

The chicken leg blocks processed by the Embodiment 36 and by Comparative Example 15, each weighing about 110 grams, were grilled on a hot plate at 160° C. for 6 minutes. After grilling, a decrease of the weight of the cooked meats was determined by comparing the weight of the meat before grilling with the weight thereof after grilling. As a result, it is found that the weight of the cooked meat processed by Embodiment 36 decreased to as high as 92.2% of the initial weight before cooking, while the weight of the cooked meat processed by Comparative Example 15 decreased to 78.5%. This means that the cooked meat processed by Embodiment 34 caused a decrease of the weight by as low as about 7%, while the cooked meat processed by Comparative Example 15 caused a decrease of the weight by as much as more than 20%.

Experimental Example 36-1

The chicken leg blocks processed by the Embodiment 36 and by Comparative Example 15, each weighing about 130 grams, were thawed under natural conditions at 23° C. over 3 hours and then refrigerated at 5° C. for 21 hours.

After the natural thawing and the refrigeration, the rates of meat juice (drip) flown out from the meats were measured in each case. As a result, it is found that the rates of the meat juice flown out therefrom are negligibly little for the meat processed by Embodiment 36 and as much as 2.00% for the meat processed by Comparative Example 15, on the one hand, after natural thawing over 3 hours and likewise as negligibly low as 0.15% for the meat processed by Embodiment 36 and as much as 3.38% for the meat processed by Comparative Example 15, on the other, after freezing for 21 hours.

Cooking Example 36-2

The chicken leg meats processed by Embodiment 36 and Comparative Example 15, each weighing about 60 grams, were minced with a chopper with 3 mmφ blades and formed into a disk having a diameter of 80 mm and a thickness of 9 mm. The disk was grilled on a hot plate at 80° C. for 20 minutes. After grilling, the weights of the grilled meats were measured to determine a rate of the weight of the meat reduced.

As a result, it is found that the cooked yield of the cooked meat processed by Embodiment 36 was as much as 97.3% while the cooked yield of the meat processed by Comparative Example 15 was as much as 96.3%. From these results, it is found that there is no big difference in the cooked yield between the cooked meats processed by the Embodiment 36 and by Comparative Example 15. That is, it can be considered that the cooked meats processed by the Embodiment 36 and by Comparative Example 15 have their meat tissues solubilized by the action of the salt to substantially the same extent.

Experimental Example 36-2

The cooked meats each formed in the disk shape in Cooking Example 36-2 were subjected to folding tests by slicing each of the disks to a thickness of 4 mm.

Each sample was tested in accordance with the procedures for the folding tests as described above. As a result, it is found that the cooked meat prepared from the meat processed by Embodiment 36 was rated as rating A where neither cracks nor fractures were caused even when it was folded in four, while the cooked meat prepared from the meat processed by Comparative Example 15 was rated as rating C where cracks were caused when folded in two and it was broken even when folded in four. This means that the extent of gelation of the meat tissues in the meat processed by Embodiment 36 is found to be higher than the extent of gelation in the meat processed by Comparative Example 15 and further that there is a remarkably great difference in the extent of gelation between the meats processed by Embodiment 36 and by Comparative Example 15 while there is no big difference in the extent of the action by the salt as shown in Cooking Example 36-2.

EMBODIMENT 37

Chilled chicken leg block weighing about 700 grams was injected with an aqueous solution of sodium chloride in the amount of 3.85% w/v (in 6.0 mole per kg) and sodium bicarbonate in the amount of 8.60% w/v (in 1.0 mole per kg) so as for the assumed sodium chloride content to amount to about 1%. As a result, the sodium chloride content in the meat amounted to 0.8%, when calculated, at the injection rate of 10.5%. In this case, the sodium chloride content rate of the meat, when minced, was 0.6% as a result of measurement with a salinometer.

Comparative Example 16

Like Embodiment 37, chilled chicken leg block weighing about 700 grams was injected with an aqueous solution of sodium chloride in the amount of 7.54% w/v (in 2.7 mole per kg) and sodium sesquicarbonate in the amount of 9.04% w/v (in 0.33 mole per kg) so as for the assumed sodium chloride content to amount to about 1%. As a result, the sodium chloride content in the meat amounted to 0.8%, when calculated, at the injection rate of 13.5%. In this case, the sodium chloride content rate of the meat, when minced, was 0.7% as a result of measurement with a salinometer.

Experimental Example 37-1

The chicken leg blocks processed by injection in accordance with Embodiment 37 and Comparative Example 16, each weighing about 100 grams, were rapidly frozen, followed by thawing under natural conditions at 23° C. over 3 hours and thereafter refrigerating at 5° C. for 21 hours.

After the natural thawing and the refrigeration, the rates of meat juice (drip) flown out from the meats were measured in each case. As a result, it is found that the rates of the meat juice flown out therefrom are little as 0.30% for the meat processed by Embodiment 37 and as great as 2.63% for the meat processed by Comparative Example 16, on the one hand, after natural thawing over 3 hours and likewise as low as 0.97% for the meat processed by Embodiment 37 and as much as 2.80% for the meat processed by Comparative Example 16, on the other, after freezing for 21 hours. That is, the meat juice was caused to be flown out from the meat processed by Comparative Example 16 as much as more than about 3 times the meat juice flown out from the meat processed by Embodiment 37.

Experimental Example 37-2

The chicken leg blocks processed by injection in accordance with Embodiment 37 and Comparative Example 16, each weighing about 100 grams, were rapidly refrigerated in a chilled state at 5° C. for 24 hours.

After storage in a chilled state for 24 hours, the rates of meat juice (drip) flown out from the meats were measured in each case. As a result, it is found that the rates of the meat juice flown out therefrom are as negligibly little as 0.4% for the meat processed by Embodiment 37 and as much as 2.0% for the meat processed by Comparative Example 16.

Cooking Example 37

The chicken meats processed by Embodiment 37 and Comparative Example 16, each weighing about 60 grams, were minced with a chopper with 3 mmφ blades and formed into a disk having a diameter of 80 mm and a thickness of 9 mm. The disk was grilled on a hot plate at 80° C. for 20 minutes. After grilling, the weights of the grilled meats were measured to determine a rate of the weight of the meat reduced. As a result, it is found that the weight of the cooked pork meat processed by Embodiment 37 was reduced by as little as about 6% while the weight of the pork meat processed by Comparative Example 16 was reduced by much as 19.2%, that is, the weight of the cooked meat was reduced to about 80% of the original weight before grilling.

Experimental Example 37-3

The cooked meats each formed in the disk shape in Cooking Example 37 were subjected to folding tests by slicing each of the disks to a thickness of 4 mm.

Each sample was folded in accordance with the procedures for the folding tests as described above. As a result, it is found that the cooked meat prepared from the meat processed by Embodiment 37 was rated as rating A where neither cracks nor fractures were caused even when it was folded in four, while the cooked meat prepared from the meat processed by Comparative Example 16 was rated as rating D where it was broken even when folded in two. This means that the extent of gelation of the meat tissues in the meat processed by Embodiment 37 is found to be sufficient while the extent of gelation in the meat processed by Comparative Example 16 is lacking.

EMBODIMENT 38

Frozen chicken breast blocks weighing about 1.3 kilograms were injected with an aqueous solution of sodium chloride in the amount of 3.85% w/v (in 6.0 mole per kg) and sodium bicarbonate in the amount of 8.60% w/v (in 1.0 mole per kg) so as for the assumed sodium chloride content to amount to about 1%. As a result, the assumed sodium chloride content in the meat amounted to about 1% at the injection rate of 14.8%.

Comparative Example 17

Like Embodiment 38, chilled chicken breast blocks weighing about 1 kilogram were injected with an aqueous solution of sodium chloride in the amount of 7.34% w/v (in 2.7 mole per kg) and sodium bicarbonate in the amount of 24.71% w/v (in 0.33 mole per kg) so as for the assumed sodium chloride content to amount to about 1% at the injection rate of 25.9%.

Experimental Example 38-1

The chicken breast blocks processed by injection in accordance with Embodiment 38 and Comparative Example 17, each weighing about 200 grams, were rapidly frozen, followed by thawing under natural conditions at 23° C. over 3 hours and thereafter refrigerating at 5° C. for 21 hours.

After the natural thawing and the refrigeration, the rates of meat juice (drip) flown out from the meats were measured in each case. As a result, it is found that the rates of the meat juice flown out therefrom are little as 0.40% for the meat processed by Embodiment 38 and as great as 5.75% for the meat processed by Comparative Example 17, on the one hand, after natural thawing over 3 hours and likewise as low as 0.89% for the meat processed by Embodiment 38 and as much as 7.52% for the meat processed by Comparative Example 17, on the other, after freezing for 21 hours. That is, the meat juice was caused to be flown out from the meat processed by Comparative Example 17 as much as more than about 10 times the meat juice flown out from the meat processed by Embodiment 38.

Cooking Example 38

The chicken meats processed by injection in Embodiment 38 and Comparative Example 17 were frozen and then thawed. The thawed chicken meats, each weighing about 60 grams, were then minced with a chopper with 3 mmφ blades and formed into a disk having a diameter of 80 mm and a thickness of 9 mm. The disk was grilled on a hot plate at 80° C. for 10 minutes. After grilling, the weights of the grilled meats were measured to determine a rate of the weight of the meat reduced.

As a result, it is found that the cooked yield of the cooked meat processed by Embodiment 38 was as great as 91.6% while the cooked yield of the meat processed by Comparative Example 17 was as much as 88.9%.

Experimental Example 38-2

The cooked meats each tested in the disk shape in Cooking Example 38 were subjected to folding tests by slicing each of the disks to a thickness of 4 mm.

Each sample was folded in accordance with the procedures for the folding tests as described above. As a result, it is found that the cooked meat prepared from the meat processed by Embodiment 38 was rated as rating A where neither cracks nor fractures were caused even when it was folded in four, while the cooked meat prepared from the meat processed by Comparative Example 17 was rated as rating D where it was broken even when folded in two. This means that the extent of gelation of the meat tissues in the meat processed by Embodiment 38 is found to be sufficient while the extent of gelation in the meat processed by Comparative Example 17 is lacking.

EMBODIMENT 39

Frozen pork round block meat weighing about 1,050 grams was thawed and then injected with an aqueous solution of sodium chloride at the rate of 4.0 mole per kg and sodium bicarbonate at the rate of 0.6 mole per kg so as for the sodium chloride to amount to 0.8%. As a result, the solution was injected at the injection rate of 16% and the sodium chloride content in the meat was calculated as 0.79%.

The pork round block meat so processed was then tumbled with a fixed-type massage machine (Model: FRM-40; Futaba Denki K.K., Japan) at reduced pressure of 60 mmHg for 60 minutes.

Comparative Example 18

Frozen pork round block meat weighing about 1,050 grams was thawed and then tumbled in the same manner as in Embodiment 39 above, as a control, without injection.

Experimental Example 39

The frozen pork round block meats processed by tumbling in Embodiment 39 and Comparative Example 18 were then thawed under natural conditions at 23° C. over 3 hours, followed by refrigerating at 5° C. for 21 hours.

After refrigeration, the rates of meat juice (drip) flown out from the meats were measured. As a result, it is found that the rates of the meat juice flown out therefrom are negligibly little for the meat processed by Embodiment 39 and as much as 6.0% for the control meat, on the one hand, after natural thawing over 3 hours and likewise negligibly little for the processed meat and as great as 7.3% for the control meat, on the other, after freezing for 21 hours. That is, the meat juice was caused to be flown out from the control meat as much as more than about 8 times the meat juice flown out from the processed meat.

Cooking Example 39

The pork round block meats processed by tumbling in Embodiment 39 and Comparative Example 18 were then grilled on a hot plate at 160° C. for 15 minutes. After grilling, the weights of the grilled meats were measured to determine a cooked yield of the meats grilled. As a result, it is found that the cooked yield of the processed meat was as great as 93.5% while the cooked yield of the control meat was as low as 78.7%, that is, the weight of the cooked meat, when not processed, was reduced by more than about 20% of the original weight before grilling.

EMBODIMENT 40

Frozen pork round block meat weighing about 800 grams was thawed and then injected with an aqueous solution of sodium chloride at the rate of 4.0 mole and sodium bicarbonate at the rate of 0.6 mole so as for the sodium chloride to amount to 0.8%. As a result, the solution was injected at the injection rate of 16% and the sodium chloride content in the meat was calculated as 0.79%.

The pork round block meat so processed was then tumbled with a fixed-type massage machine (Model: FRM-40; Futaba Denki K.K., Japan) at reduced pressure of 60 mmHg for 60 minutes.

Comparative Example 19

Frozen pork round block meat weighing about 800 grams were thawed and then tumbled in the same manner as in Embodiment 40 above, as a control, without injection.

Experimental Example 40

The frozen pork round block meats processed by tumbling in Embodiment 40 and Comparative Example 19 were then thawed under natural conditions at 23° C. over 3 hours, followed by refrigerating at 5° C. for 21 hours.

After refrigeration, the rates of meat juice (drip) flown out from the meats were measured. As a result, it is found that the rates of the meat juice flown out therefrom are negligibly little for the meat processed by Embodiment 40 and as much as 6.8% for the control meat, on the one hand, after natural thawing over 3 hours and likewise negligibly little for the processed meat and as great as 7.3% for the control meat, on the other, after freezing for 21 hours. That is, the meat juice was caused to be flown out from the control meat as much as more than about 10 times the meat juice flown out from the processed meat.

Cooking Example 40

The pork round block meats processed by tumbling in Embodiment 40 and Comparative Example 19 were then grilled on a hot plate at 160° C. for 15 minutes. After grilling, the weights of the grilled meats were measured to determine a cooked yield of the meats grilled. As a result, it is found that the cooked yield of the processed meat was as great as 95.0% while the cooked yield of the control meat was as low as 76.5%, that is, the weight of the cooked meat, when not processed, was reduced by more than about 25% of the original weight before grilling.

EMBODIMENT 41

Frozen chicken breast block meat weighing about 886 grams was thawed and then injected with an aqueous solution of sodium chloride at the rate of 4.0 mole per kg and sodium bicarbonate at the rate of 0.6 mole per kg so as for the sodium chloride to amount to 1%. As a result, the solution was injected at the injection rate of 15.8% and the sodium chloride content in the meat was calculated as 1.03%.

The chicken breast block meat so processed was then tumbled with a fixed-type massage machine (Model: FRM-40; Futaba Denki K.K., Japan) at reduced pressure of 60 mmHg for 60 minutes.

Comparative Example 20

Frozen chicken breast block meat weighing about 880 grams was thawed and then tumbled in the same manner as in Embodiment 41 above, as a control, without injection.

Experimental Example 41

The frozen chicken breast block meats processed by tumbling in Embodiment 41 and Comparative Example 20 were then thawed under natural conditions at 23° C. over 3 hours, followed by refrigerating at 5° C. for 21 hours.

After refrigeration, the rates of meat juice (drip) flown out from the meats were measured. As a result, it is found that the rates of the meat juice flown out therefrom are as negligibly low as 0.21% for the meat processed by Embodiment 41 and as much as 3.11% for the control meat, on the one hand, after natural thawing over 3 hours and likewise negligibly low as 0.14% for the processed meat and as much as 1.60% for the control meat, on the other, after freezing for 21 hours.

Cooking Example 41

The chicken breast block meats processed by tumbling in Embodiment 41 and Comparative Example 20 were then grilled on a hot plate at 160° C. for 15 minutes. After grilling, the weights of the grilled meats were measured to determine a cooked yield of the meats grilled. As a result, it is found that the cooked yield of the processed meat was as great as 109.0% while the cooked yield of the control meat was as low as 76.2%, that is, the weight of the cooked meat, when not processed, was reduced by about 25% of the original weight before grilling.

EMBODIMENT 42

Frozen chicken breast block meat weighing about 750 grams was thawed and then injected with an aqueous solution of sodium chloride at the rate of 4.0 mole per kg and sodium bicarbonate at the rate of 0.6 mole per kg so as for the sodium chloride to amount to 1%. As a result, the solution was injected at the injection rate of 15.7% and the sodium chloride content in the meat was calculated as 1.02%.

The pork round block meat so processed was then tumbled with a fixed-type massage machine (Model: FRM-40; Futaba Denki K.K., Japan) at ambient pressure for 60 minutes.

Comparative Example 21

Frozen chicken breast block meat weighing about 800 grams were thawed and then tumbled in the same manner as in Embodiment 42 above, as a control, without injection.

Experimental Example 42

The frozen chicken breast block meats processed by tumbling in Embodiment 42 and Comparative Example 21 were then thawed under natural conditions at 23° C. over 3 hours, followed by refrigerating at 5° C. for 21 hours.

After refrigeration, the rates of meat juice (drip) flown out from the meats were measured. As a result, it is found that the rates of the meat juice flown out therefrom are as negligibly low as 0.24% for the meat processed by Embodiment 42 and as much as 3.11% for the control meat, on the one hand, after natural thawing over 3 hours and likewise as negligibly low as 0.14% for the processed meat and as much as 1.60% for the control meat, on the other, after freezing for 21 hours. That is, the meat juice was caused to be flown out from the control meat as much as more than about 10 times the meat juice flown out from the processed meat.

Cooking Example 42

The chicken breast block meats processed by tumbling in Embodiment 42 and Comparative Example 21 were then grilled on a hot plate at 160° C. for 15 minutes. After grilling, the weights of the grilled meats were measured to determine a cooked yield of the meats grilled. As a result, it is found that the cooked yield of the processed meat was as great as 104.2% while the cooked yield of the control meat was as low as 76.2%, that is, the weight of the cooked meat, when not processed, was reduced by more than about 25% of the original weight before grilling.

EMBODIMENT 43

Frozen pork round meat was thawed under natural conditions and the thawed pork round meat weighing about 3.5 kg was injected with an aqueous solution of sodium chloride at the rate of 4.0 mole and sodium bicarbonate at the rate of 0.6 mole so as for the sodium chloride to amount to 0.8%. As a result, the solution was injected at the injection rate of 16.0% and the sodium chloride content in the meat was calculated as 0.79%, followed by vacuum oscillation with a vacuum oscillator for 20 minutes and then aging for 24 hours.

As a result, it is found that the processed meat produces substantially the same results as achieved by tumbling the meat under reduced pressure.

EMBODIMENT 44

Frozen pork round meat was thawed under natural conditions and the thawed pork round meat weighing about 4 kg was vacuum oscillated for 30 minutes with a vacuum oscillator in an aqueous solution of sodium chloride at the rate of 4.0 mole and sodium bicarbonate at the rate of 0.6 mole so as for the sodium chloride to amount to 0.8%. As a result, it is found that the processed meat produces substantially the same results as achieved by tumbling the meat under reduced pressure.

It will be readily appreciated that the description made herein on the embodiments, the experimental examples, the comparative examples, and the cooking examples, which correspond to those of the U.S. patent application Ser. No. 08/690,977 as a parent application of this application, is substantially the same as the U.S. patent application Ser. No. 08/690,977 and that it is made simply for the purpose to clarify and define the previously description, without any intention to make any modifications and changes of the corresponding description in respect of the substantial contents. For ready reference, European Patent Application EP 0 743 011 A1 is incorporated herein for reference, which is the EP counterpart of the U.S. patent application Ser. No. 08/669,540 corresponding to the U.S. national stage of PCT/JP95/00118. It will be readily appreciated that Embodiments 1 to 5 and the experimetal examples, the comparative examples and cooking examples involved with the corresponding thereto, described herein, correspond to Embodiments 1 to 5 of EP 0 743 011 A1, respectively, and that, likewise, Embodiments 7 to 29 and the relating examples described herein correspond to Embodiments 6 to 28 of EP 0 743 011 A1, respectively.

It should be noted herein that the embodiments and examples as described above are illustrated merely for the purposes to describe the specific examples of the present invention and in no respect whatsoever for the purposes to restrict the scope of the present invention to those illustrated above. It is thus to be obviously understood that the present invention encompasses any modifications and variations departing from the spirit of the present invention within the scope thereof.

EFFECTS OF INVENTION

The animal meats processed in accordance with the present invention can offer advantages and merits as will be described below.

The processed animal meats are so rich in meat juice that they can provide a taste and flavor that the meats provide in themselves, because the treatment in accordance with the present invention can prevent the meat juice from flowing out from the meats so that they can hold the meat juice at a much higher level than meats non-processed or processed in conventional manner.

As the processed animal meats are very high in a cooked yield and in an expansion rate, when cooked, they can produce meat products with a high product quality.

The processed animal meats are very elastic and tender with an excellent savor, when roasted, grilled, boiled or cooked by any other means.

Further, the processed animal meats can be matched well with various seasonings and flavorings, thereby providing the processed animal meats with a taste and flavor different from those of meats processed in conventional manner.

Moreover, the processed animal meats are very high in storage performance because they are less prone to undergo deterioration in the meat quality during freezing and refrigerating as well as during thawing. In addition, as the outflow of the meat juice can be prevented or controlled to a very low level, the loss of low-molecular nourishing and tasteful materials in meat juice, which may otherwise be removed together with the meat juice flown out from the meats can be controlled and lowered. Hence, the animal meats so processed are so rich in such nourishing and tasteful materials, thereby sustaining their original taste and flavor.

As described above, the processed animal meats are so high in a cooked yield that the cooked meat products can provide a remarkably high product quality such as appearance upon cooking and serving and they can also be produced at low costs.

As the processed animal meats can be impregnated in the salt and/or alkali solutions/solution containing various seasonings and/or flavorings and/or nourishing materials and matched well therewith, they readily can be further processed so as to adapt to various uses.

Further, the processed animal meats can hold their original meat colors for a long period of time without discoloration or improve their meat colors discolored to some extent to clearer or more fresh colors, thereby improving meat quality and providing addition of value to the processed meat products.

Frozen animal meats and animal meats immediately after slaughter can be processed to the processed animal meats which can in turn be aged for a short period of time, thereby facilitating the production of the processed meats and meat products and improving productivity of the production thereof to a great extent.

Moreover, the processed animal meats are very safe to the human health because the amounts of the additives are very small and the amounts of chemicals for use as preventing deterioration in the meat product, even if added, can be decreased to a level remarkably lesser than conventionally processed animal meats. Additionally, as the sodium contents of the processed animal meats deriving from sodium chloride can be lowered than meats processed in a conventional way, due to a high degree of substitution of sodium bicarbonate or other alkalis for the sodium chloride, they are so less salty that they are more healthy.

In addition, as the processed animal meats can be produced by processing in a very short time, they undergo deterioration in meat quality to a lesser extent than animal meats processed in conventional manner, thereby sustaining and maintaining the fresh meat quality for a long period of time.

The meat products prepared in accordance with the present invention from the processed animal meats can offer advantages and merits as will be described below, in addition to the advantages and merits provided by the processed animal meats as described above.

The meat products produced in accordance with the present invention can be ready for cooking and serving without further processing the meat products before cooking because they are flavored with seasonings and/or flavorings and aged appropriately so as to adapt to any use as food ready for cooking.

As the meat products so produced does not flow or little flows meat juice out therefrom upon thawing and cooking as well as during storage so that no or little tasteful and nourishing materials contained in the meat juice can be lost together with the outflow of the meat juice, they can be cooked and served with a pleasant taste and flavor.

Further, the processed animal meats can be produced to meat food products so as to readily adapt to the aged, patients, infants, children and any persons, and to be readily cooked and served, because the meat products may contain functional materials, animal and/or vegetable fibers and/or fats and oils, splices and/or any other appropriate seasonings and/or flavorings, as needed, so as to adapt to every use.

As the meat products can hold elasticity and tenderness of the meats themselves and clear and fresh colors of the meats for a long period of time and be stored in a chilled, frozen or freeze-dried state or in any other appropriate state without causing deterioration in such elasticity, tenderness, colors and other properties, they can be distributed in the market in the such states so that they are superior in distributability as products.

The meat products can be savored with seasonings and/or flavorings and/or any other additives in Japanese, Chinese, European, American or any other appropriate way, ready for cooking and serving, and processed in any appropriate way, such as, by canning or treated by microwave treatment or as retort food products.

Moreover, as the meat products can hold the additives with a high degree of adhesion to the meat tissues and in a homogenized manner in the meat, they are so adapted to dry-freezing that they can be suitable for freeze-dried food products ready for cooking and serving.

As the processed animal meats and the meat products according to the present invention have the advantages and merits as described above, the method for the production of the such processed animal meats and such animal meat products in accordance with the present invention can offer advantages and merits as will be described below.

The production method according to the present invention can readily provide processed animal meats having varying degrees of tenderness by appropriately changing amounts of the salt and the alkali and times required for processing.

As the production method according to the present invention can prevent meat juice from flowing out from the meats during storing, thawing or cooking and tenderize the meats, it can produce the processed meats sustaining their own taste and tenderness and further may convert a tough meat quality of the meats into a more tender meat quality.

Further, as the production method can assist in transforming the meat tissues of the meats, such as perimysium, myofibril, sarcolemma and the like, into fine net-like structures in the meats, that is, gelling the such meat tissues, thereby preventing the meat juice from flowing out the meats, it can provide the processed animal meats and the meat products, each holding favorable savor and having remarkably high in storing performance.

Moreover, the production method can provide the processed animal meats and the meat products with high productivity and high production yield.

Additionally, as the processed animal meats can be produced using the solution containing the salt and/or the alkali, with seasonings, flavorings and/or any other additives added thereto, the production method according to the present invention can produce meat food products with high values added.

As the production method according to the present invention allows the use of vitamin C and/or vitamin E added in the solution containing the salt and/or the alkali, with seasonings, flavorings and/or any other additives added thereto, as requested, it can produce processed meats having improved meat color and juiciness. Further, the production method can improve oxidation of the processed animal meats. In addition, the production method can improve the meat colors of the meats, even when discolored to some extent due to deterioration in the meat quality, to clearer and more fresh colors, thereby adding higher product values to the meat products produced using such meats.

Further, the production method can improve elasticity and tenderness of the meats by the addition of an alcohol to the solution containing the salt and/or the alkali in a harmonized way.

The production method according to the present invention can age thawed meats and meats immediately after slaughter to a sufficient extent in a short period of time, thereby improving productivity.

As the production method requires the use of extremely small amounts of the additives and chemicals for preventing deterioration in the meat quality, if needed, the processed animal meats and the meat products produced therefrom are very safe to the human health.

What is claimed is:

1. A processed meat comprising a meat product containing a salt content of from 0.2 part to 5.0 parts by weight and an alkali content of from 0.1 part to 6 parts by weight, each with respect to 100 parts by weight of meat, said salt is sodium chloride, potassium chloride, calcium chloride, magnesium chloride or a mixture thereof and said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof, said salt being added in a concentration ranging from 1.0 mole to 7.0 mole and said alkali being added in a concentration ranging from 1.0 mole to 4.0 mole.

2. The processed meat as claimed in claim 1, wherein said alkali is added in a concentration ranging from 1.0 mole to 3.0 mole.

3. The processed meat as claimed in claim 1, wherein said alkali is sodium bicarbonate, sodium carbonate, potassium bicarbonate, potassium carbonate, ammonium bicarbonate or a mixture thereof.

4. The processed meat as claimed in claim 1, wherein said salt is sodium chloride and said alkali is sodium bicarbonate, sodium carbonate, potassium bicarbonate, potassium carbonate, ammonium bicarbonate or a mixture thereof.

5. The processed meat as claimed in claim 1, wherein said salt is sodium chloride and said alkali is sodium bicarbonate, sodium carbonate or a mixture of sodium bicarbonate with sodium carbonate.

6. The processed meat as claimed in claim 1, wherein said salt is sodium chloride and said alkali is sodium bicarbonate.

7. The processed meat as claimed in claim 1, wherein said salt is sodium chloride and said alkali is sodium carbonate.

8. The processed meat as claimed in claim 1, wherein said salt is added at a rate of from 0.2 part to 2.0 parts by dry weight and said alkali is added at a rate of from 0.1 part to 1.5 parts by dry weight.

9. The processed meat as claimed in claim 8, wherein said alkali is sodium bicarbonate, sodium carbonate, potassium bicarbonate, potassium carbonate, ammonium bicarbonate or a mixture thereof.

10. The processed meat as claimed in claim 8, wherein said salt is sodium chloride and said alkali is sodium bicarbonate, sodium carbonate, potassium bicarbonate, potassium carbonate, ammonium bicarbonate or a mixture thereof.

11. The processed meat as claimed in claim 8, wherein said salt is sodium chloride and said alkali is sodium bicarbonate, sodium carbonate or a mixture of sodium bicarbonate with sodium carbonate.

12. The processed meat as claimed in claim 8, wherein said salt is sodium chloride and said alkali is sodium bicarbonate.

13. The processed meat as claimed in claim 8, wherein said salt is sodium chloride and said alkali is sodium carbonate.

14. The processed meat as claimed in claim 1, wherein said salt is added at a rate of from 0.2 part to 1.5 parts by dry weight and said alkali is added at a rate of from 0.1 part to 1.0 part by dry weight.

15. The processed meat as claimed in claim 14, wherein said alkali is sodium bicarbonate, sodium carbonate, potassium bicarbonate, potassium carbonate, ammonium bicarbonate or a mixture thereof.

16. The processed meat as claimed in claim 14, wherein said salt is sodium chloride and said alkali is sodium bicarbonate, sodium carbonate, potassium bicarbonate, potassium carbonate or ammonium bicarbonate.

17. The processed meat as claimed in claim 14, wherein said salt is sodium chloride and said alkali is sodium bicarbonate, sodium carbonate or a mixture of sodium bicarbonate with sodium carbonate.

18. The processed meat as claimed in claim 14, wherein said salt is sodium chloride and said alkali is sodium bicarbonate.

19. The processed meat as claimed in claim 14, wherein said salt is sodium chloride and said alkali is sodium carbonate.

20. The processed meat as claimed in claim 1, wherein sodium chloride is added at a rate of from 0.2 part to 1.5 parts by dry weight and sodium bicarbonate and/or sodium carbonate are/is added at a rate of from 0.1 part to 1.0 part by dry weight, each with respect to 100 parts by weight of meat.

21. The processed meat as claimed in claim 1, wherein said salt is added at a rate of from 0.3 part to 4.0 parts by weight and said alkali is added at a rate of from 0.3 part to 4.0 part by dry weight, each with respect to 100 parts by weight of meat.

22. The processed meat as claimed in claim 21, wherein said salt is sodium chloride and said alkali is sodium bicarbonate, sodium carbonate or a mixture of sodium bicarbonate with sodium carbonate.

23. The processed meat as claimed in claim 1, wherein said salt is added at a rate of from 0.5 part to 2.5 parts by weight and said alkali is added at a rate of from 0.5 part to 2.0 part by dry weight, each with respect to 100 parts by weight of meat.

24. The processed meat as claimed in claim 23, wherein said salt is sodium chloride and said alkali is sodium bicarbonate, sodium carbonate or a mixture of sodium bicarbonate with sodium carbonate.

25. The processed meat as claimed in claim 1, further comprising an alcohol at a rate of 0.5 part to 12 parts by weight, vitamin E at a rate of 1 to 300 mg, vitamin C at a rate of 6 to 500 mg, a saccharide at a rate of 1 part to 20 parts by weight, egg white at a rate of 0.1 part to 5 parts by weight and/or an anti-oxidant at a rate of 0.01 to 5 parts by weight.

26. The processed meat as claimed in claim 1, wherein said salt and/or alkali and/or salt/alkali solution contain or contains meat juice flown out from the meat or from different meat.

27. A meat product comprising said processed meat as claimed in claim 1 to which a bond reinforcing agent, an emulsifying agent, a functional agent, an adhesion enforcing agent, animal or vegetable fiber, a preservation agent, an anti-oxidant, a deodorant, animal or vegetable fat or oil, a condiment and/or a spice are/is added.

28. A method for producing processed meat comprising:
   a salt addition step of adding solution of a salt to the meat, said salt being added at a rate of from 2 parts to 15 parts by weight with respect to 100 parts by weight of meat in a concentration ranging from 1.0 mole to 7.0 mole and said salt is sodium chloride, potassium chloride, calcium chloride, magnesium chloride or a mixture thereof; and
   an alkali addition step of adding a solution of an alkali to the meat, said alkali being added at a rate of from 0.5 part to 12 parts by weight with respect to 100 parts by weight of meat in a concentration ranging from 1.0 mole to 4.0 mole and said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof;
   wherein said salt addition step is carried out before or after said alkali addition step.

29. A method for producing processed meat comprising a salt/alkali addition step of adding a solution containing a salt and an alkali to the meat, said salt being contained at a rate of from 0.2 part to 5.0 parts by weight with respect to 100 parts by weight of meat in a concentration ranging from 1.0 mole to 7.0 mole and said salt is sodium chloride, potassium chloride, calcium chloride, magnesium chloride or a mixture thereof and said alkali being contained at a rate of from 0.1 part to 6.0 parts by weight with respect to 100 parts by weight of meat in a concentration ranging from 1.0 mole to 4.0 mole and said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof.

30. The method as claimed in claim 28 or 29, further comprising an additive addition step for adding an additive, said additive being a saccharide, a vitamin, animal or vegetable protein powder, an anti-oxidant or a mixture thereof.

31. The method as claimed in claim 28 or 29, wherein a saccharide, a vitamin, animal or vegetable protein powder, an anti-oxidant or a mixture thereof is added in the solution containing said salt, said alkali or a mixture of said salt with said alkali.

32. The method as claimed in claim 28 or 29, further comprising an aging step for aging said processed meat after said salt addition step or said alkali addition salt to promote an action of said salt to solubilize meat tissues in the meat or to further gelation in the meat tissues in the meat.

33. The method as claimed in claim 28 or 29, wherein said salt addition step or said alkali addition step is carried out at temperature of 20° C. or lower, lower than temperature of processing raw protein material, and/or at a pH range of from pH5 to pH10.

34. The method as claimed in claim 32, wherein said aging step is carried out at temperature of 20° C. or lower, lower than temperature of processing raw protein material, and/or at a pH range of from pH5 to pH10.

35. The method as claimed in claim 28 or 29, wherein said salt addition step or said alkali addition step or said salt/alkali addition step is carried out by a method selected from the group consisting of injecting, spraying, immersing, coating, kneading and combination thereof.

36. The method as claimed in claim 30, wherein said additive addition step is carried out by a method selected from the group consisting of injecting, spraying, immersing, coating, kneading and combination thereof.

37. The method as claimed in claim 32, wherein said aging step is carried out by a method selected from the group consisting of massaging, vibrating, supersonic treating and combination thereof.

38. A method for gelling meat comprising:
   a salt addition step of adding solution of a salt to the meat, said salt being added at a rate of from 2 parts to 15 parts by weight with respect to 100 parts by weight of meat in a concentration ranging from 1.0 mole to 7.0 mole and said salt is sodium chloride, potassium chloride, calcium chloride, magnesium chloride or a mixture thereof; and
   an alkali addition step of adding a solution of an alkali to meat, said alkali being added at a rate of from 0.5 part to 12 parts by weight with respect to 100 parts by weight of meat in a concentration ranging from 1.0 mole to 4.0 mole and said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof;
   wherein said salt addition step is carried out before or after said alkali addition step; or
   a salt/alkali addition step of adding a solution containing a salt and an alkali to the meat, said salt being contained at a rate of from 2 parts to 15 parts by weight with respect to 100 parts by weight of meat in a concentration ranging from 1.0 mole to 7.0 mole and said salt is sodium chloride, potassium chloride, calcium chloride, magnesium chloride or a mixture thereof and said alkali being contained at a rate of from 0.5 part to 12 parts by weight with respect to 100 parts by weight of meat in a concentration ranging from 1.0 mole to 4.0 mole and said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof.

39. A method for preventing outflow of meat juice from meat, comprising:
   a salt addition step of adding solution of a salt to the meat, said salt being added at a rate of from 2 parts to 15 parts by weight with respect to 100 parts by weight of meat in a concentration ranging from 1.0 mole to 7.0 mole and said salt is sodium chloride, potassium chloride, calcium chloride, magnesium chloride or a mixture thereof; and
   an alkali addition step of adding a solution of an alkali to meat, said alkali being added at a rate of from 0.5 part to 12 parts by weight with respect to 100 parts by weight of meat in a concentration ranging from 1.0 mole to 4.0 mole and said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof;

wherein said salt addition step is carried out before or after said alkali addition step; or a salt/alkali addition step of adding a solution containing a salt and an alkali to the meat, said salt being contained at a rate of from 2 parts to 15 parts by weight with respect to 100 parts by weight of meat in a concentration ranging from 1.0 mole to 7.0 mole and said salt is sodium chloride, potassium chloride, calcium chloride, magnesium chloride or a mixture thereof and said alkali being contained at a rate of from 0.5 part to 12 parts by weight with respect to 100 parts by weight of meat in a concentration ranging from 1.0 mole to 4.0 mole and said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof.

40. A processed meat comprising a meat product containing a salt content of from 0.2 part to 5.0 parts by weight with respect to 100 parts by weight of meat and an alkali content of from 0.1 part to 6 parts by weight, each with respect to 100 parts by weight of meat, with said salt injected into the meat in a concentration ranging from 1.0 mole to 7.0 mole, said salt is sodium chloride, potassium chloride, calcium chloride, magnesium chloride or a mixture thereof and with said alkali injected into the meat in a concentration ranging from 0.1 mole to 4.0 mole, said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof; and the meat injected with said salt and/or said alkali being processed by physical application of external force under ambient or reduced pressure.

41. The processed meat as claimed in claim 40, wherein said alkali is added in a concentration ranging from 0.3 mole to 1.5 mole.

42. The processed meat as claimed in claim 40, wherein said alkali is sodium bicarbonate, sodium carbonate, potassium bicarbonate, potassium carbonate, ammonium bicarbonate or a mixture thereof.

43. The processed meat as claimed in claim 40, wherein said salt is sodium chloride and said alkali is sodium bicarbonate, sodium carbonate, potassium bicarbonate, potassium carbonate, ammonium bicarbonate or a mixture thereof.

44. The processed meat as claimed in claim 40, wherein said salt is sodium chloride and said alkali is sodium bicarbonate, sodium carbonate or a mixture of sodium bicarbonate with sodium carbonate.

45. The processed meat as claimed in claim 40, wherein said salt is sodium chloride and said alkali is sodium bicarbonate.

46. The processed meat as claimed in claim 40, wherein said salt is sodium chloride and said alkali is sodium carbonate.

47. A method for preparing processed meat comprising:

a salt injection step for injecting meat with a solution containing a salt at a rate of from 2 parts to 15 parts by weight with respect to 100 parts by weight of meat and in a concentration ranging from 1.0 mole to 7.0 mole, said salt is sodium chloride, potassium chloride, calcium chloride, magnesium chloride or a mixture thereof; and an alkali injection step for injecting meat with a solution an alkali at a rate of from 0.5 part to 12 parts by weight with respect to 100 parts by weight of meat and in a concentration ranging from 0.1 mole to 4.0 mole, aid alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof; or a salt/alkali injection step of injecting the meat with a solution containing said salt and said alkali at the same rate and in the same concentration; and a force application step for physically applying external force to the meat under ambient or reduced pressure.

48. A method for preparing processed meat comprising:

a force application step for physically applying external force to the meat under ambient or reduced pressure in the presence of a salt solution containing a salt at a rate of from 2 parts to 15 parts by weight with respect to 100 parts by weight of meat and in a concentration ranging from 1.0 mole to 7.0 mole, said salt is sodium chloride, potassium chloride, calcium chloride, magnesium chloride or a mixture thereof; an alkali solution an alkali at a rate of from 0.5 part to 12 parts by weight with respect to 100 parts by weight of meat and in a concentration ranging from 0.1 mole to 4.0 mole, said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof; or in a salt/alkali solution containing said salt and said alkali at the same rates and in the same concentration.

49. The method as claimed in claim 47 or 48, wherein said force application step is carried out by tumbling or oscillating the meat.

50. The method as claimed in claim 47 or 48, wherein said alkali is added in a concentration of from 0.3 mole to 1.5 mole.

51. The method as claimed in claim 47 or 48, wherein said alkali is sodium bicarbonate, sodium carbonate, potassium bicarbonate, potassium carbonate, ammonium bicarbonate or a mixture thereof.

52. The method as claimed in claim 47 or 48, wherein said salt is sodium chloride and said alkali is sodium bicarbonate, sodium carbonate, potassium bicarbonate, potassium carbonate, ammonium bicarbonate or a mixture thereof.

53. The method as claimed in claim 47 or 48, wherein said salt is sodium chloride and said alkali is sodium bicarbonate, sodium carbonate or a mixture of sodium bicarbonate with sodium carbonate.

54. The method as claimed in claim 47 or 48, wherein said salt is sodium chloride and said alkali is sodium bicarbonate.

55. The method as claimed in claim 47 or 48, wherein said salt is sodium chloride and said alkali is sodium carbonate.

56. A solution for use in cooking animal meat comprising a salt having a salt content of from 0.2 part to 5.0 parts by weight and an alkali having an alkali content of from 0.1 part to 6 parts by weight, each with respect to 100 parts by weight of meat, said salt is sodium chloride, potassium chloride, calcium chloride, magnesium chloride or a mixture thereof and said alkali is sodium bicarbonate, sodium carbonate, potassium bicarbonate, potassium carbonate, ammonium bicarbonate, monosodium phosphate, disodium phosphate, trisodium phosphate, sodium pyrophosphate, sodium polyphosphate, potassium pyrophosphate, sodium hexamethaphosphate, potassium methaphosphate, sodium methaphosphate or a mixture thereof, said salt being added in a concentration ranging from 1.0 mole to 7.0 mole and said alkali being added in a concentration ranging from 1.0 mole to 4.0 mole.

57. The solution as claimed in claim 56, wherein the conentration of said alkali ranges from 1.0 mole to 3.0 mole.

\* \* \* \* \*